US009858531B1

(12) United States Patent
Monroe et al.

(10) Patent No.: US 9,858,531 B1
(45) Date of Patent: Jan. 2, 2018

(54) FAULT TOLERANT SCALABLE MODULAR QUANTUM COMPUTER ARCHITECTURE WITH AN ENHANCED CONTROL OF MULTI-MODE COUPLINGS BETWEEN TRAPPED ION QUBITS

(71) Applicants: UNIVERSITY OF MARYLAND, College Park, MD (US); DUKE UNIVERSITY, Durham, NC (US); UNIVERSITY OF BRITISH COLUMBIA, Vancouver (CA)

(72) Inventors: Christopher Monroe, Ellicott City, MD (US); Jungsang Kim, Chapel Hill, NC (US); Robert Raussendorf, Vancouver (CA)

(73) Assignees: University of Maryland, College Park, MD (US); Duke University, Durham, NC (US); University of British Columbia, Vancouver, British Columbia (CA)

( * ) Notice: Subject to any disclaimer, the term of this patent is extended or adjusted under 35 U.S.C. 154(b) by 435 days.

(21) Appl. No.: 14/449,477

(22) Filed: Aug. 1, 2014

Related U.S. Application Data

(60) Provisional application No. 61/861,455, filed on Aug. 2, 2013.

(51) Int. Cl.
*G06N 99/00* (2010.01)
*G06F 15/76* (2006.01)
*G02F 1/11* (2006.01)

(52) U.S. Cl.
CPC .......... *G06N 99/002* (2013.01); *G06F 15/76* (2013.01); *G02F 1/113* (2013.01); *G06F 2015/768* (2013.01)

(58) Field of Classification Search
None
See application file for complete search history.

(56) References Cited

U.S. PATENT DOCUMENTS 7,875,876 B1   1/2011   Wandzura et al.

OTHER PUBLICATIONS

Mark Oskin, Frederic T. Chong, Isaac L. Chuang, "A Practical Architecture for Reliable Quantum Computers", Journal Computer archive, vol. 35 Issue 1, Jan. 2002, pp. 79-87.*

(Continued)

*Primary Examiner* — Kakali Chaki
*Assistant Examiner* — Walter Hanchak
(74) *Attorney, Agent, or Firm* — Kaplan Breyer Schwarz, LLP

(57) ABSTRACT

A modular quantum computer architecture is developed with a hierarchy of interactions that can scale to very large numbers of qubits. Local entangling quantum gates between qubit memories within a single modular register are accomplished using natural interactions between the qubits, and entanglement between separate modular registers is completed via a probabilistic photonic interface between qubits in different registers, even over large distances. This architecture is suitable for the implementation of complex quantum circuits utilizing the flexible connectivity provided by a reconfigurable photonic interconnect network. The subject architecture is made fault-tolerant which is a prerequisite for scalability. An optimal quantum control of multimode couplings between qubits is accomplished via individual addressing the qubits with segmented optical pulses to suppress crosstalk in each register, thus enabling high-fidelity gates that can be scaled to larger qubit registers for quantum computation and simulation.

24 Claims, 17 Drawing Sheets

(56) References Cited

OTHER PUBLICATIONS

Jungsang Kim, Peter Maunz, Taehyun Kim, Jeffrey Hussman, Rachel Noek, Abhijit Mehta, and Christopher Monroe, "Modular Universal Scalable Ion-trap Quantum Computer (MUSIQC)", American Institute of Physics Conference Proceedings 1363, 2011, pp. 190-193.*
C. Monroe and J. Kim, "Scaling the Ion Trap Quantum Processor", Science, vol. 339, Mar. 8, 2013, pp. 1164-1169.*
C. Monroe, R. Raussendorf, A. Ruthven, K. R. Brown, P. Maunz, L.-M. Duan, and J. Kim, "Large Scale Modular Quantum Computer Architecture with Atomic Memory and Photonic Interconnects", published on line Arixv.org, Aug. 2, 2012, pp. 1-16.*
Acton et al., Near-perfect simultaneous measurement of a qubit register. Quantum Inf. Comput. 6, 465 (2006).
Barrett & Stace, Fault tolerant quantum computation with very high threshold for loss errors. Phys. Rev. Lett. 105, 200502 (2010).
Beals et al., Efficient distributed quantum computing. Proc. R. Soc. A 469 (2013).
Benhelm et al., Towards fault-tolerant quantum computing with trapped ions. Nature Physics 4, 463 (2008).
Benjamin et al., Brokered graph-state quantum computation. New J. Phys. 8, 141 (2006).
Blatt & Wineland, Entangled states of trapped atomic ions. Nature 453, 1008 (2008).
Blinov et al., Observation of entanglement between a single trapped atom and a single photon. Nature 428, 153 (2004).
Briegel et al., Quantum repeaters: The role of imperfect local operations in quantum communication. Phys. Rev. Lett. 81, 5932 (1998).
Brown et al., Single-qubit-gate error below 10-4 in a trapped ion. Phys. Rev. A 84, 030303 (2011).
Cabrillo et al., Creation of entangled states of distant atoms by interference. Phys. Rev. A 59, 1025 (1999).
Campbell & Benjamin, Measurement-based entanglement under conditions of extreme photon loss. Phys. Rev. Lett. 101, 130502 (2008).
Campbell et al., Ultrafast gates for single atomic qubits. Phys. Rev. Lett. 105, 090502 (2010).
Chiaverini et al., Surface-electrode architecture for ion-trap quantum information processing. Quant. Inf. Comp. 5, 419 (2005).
Cirac & Zoller, Quantum computations with cold trapped ions. Phys. Rev. Lett. 74, 4091 (1995).
Clark et al., Resource requirements for fault-tolerant quantum simulation: The ground state of the transverse Ising model. Phys. Rev. A 79, 062314 (2009).
Cuccaro et al., A new quantum ripple-carry addition circuit. arXiv:quant-ph/0410184v1 (2004).
De Greve et al., Quantum-dot spin-photon entanglement via frequency downconversion to telecom wavelength. Nature 491, 421 (2012).
Dennis et al., Topological quantum memory. J. Math. Phys. 43, 4452 (2002).
Deslauriers et al., Scaling and suppression of anomalous heating in ion traps. Phys. Rev. Lett. 97, 103007 (2006).
Devoret & Schoelkopf, Superconducting circuits for quantum information: an outlook. Science 339, 1169 (2013).
DiCarlo et al., Preparation and measurement of three-qubit entanglement in a superconducting circuit. Nature 467, 574 (2010).
DiVincenzo & Aliferis, Effective fault-tolerant quantum computation with slow measurements. Phys. Rev. Lett. 98, 020501 (2007).
Draper et al., A logarithmic-depth quantum carry-lookahead adder. Quant. Inf. Comp. 6, 351 (2006).
Duan & Kimble, Efficient engineering of multiatom entanglement through single-photon detections. Phys. Rev. Lett. 90, 253601 (2003).
Duan & Monroe, Colloquium: Quantum networks with trapped ions. Rev. Mod. Phys. 82, 1209 (2010).
Duan et al., Scalable trapped ion quantum computation with a probabilistic ion-photon mapping. Quant. Inf. Comp. 4, 165 (2004).
Dür et al., Quantum repeaters based on entanglement purification. Phys. Rev. A 59, 169 (1999).
Dür et al., Separability and distillability of multiparticle quantum systems. Phys. Rev. Lett. 83, 3562 (1999).
Feynman, Simulating physics with computers. Int. J. Theor. Phys. 21, 467 (1982).
Fujii & Tokunaga, Fault-tolerant topological one-way quantum computation with probabilistic two-qubit gates. Phys. Rev. Lett. 105, 250503 (2010).
Fujii et al., A distributed architecture for scalable quantum computation with realistically noisy devices. arXiv:quant-ph/1202.6588 (2012).
Gao et al., Observation of entanglement between a quantum dot spin and a single photon. Nature 491, 426 (2012).
Gottesman & Chuang, Demonstrating the viability of universal quantum computation using teleportation and single-qubit operations. Nature 402, 390 (1999).
Häffner et al., Quantum computing with trapped ions. Phys. Rep. 469, 155 (2008).
Hayes et al., Coherent error suppression in multiqubit entangling gates. Phys. Rev. Lett, 109, 020503 (2012).
Hayes et al., Entanglement of atomic qubits using an optical frequency comb. Phys. Rev. Lett. 104, 140501 (2010).
Helmer et al., Cavity grid for scalable quantum computation with superconducting circuits. Europhys. Lett. 85, 50007 (2009).
Hensinger et al., T-junction ion trap array for two-dimensional ion shuttling, storage and manipulation. Appl. Phys. Lett. 88, 034101 (2006).
James, Quantum dynamics of cold trapped ions with application to quantum computation. Appl. Phys. B 66, 181 (1998).
Jiang et al., Distributed quantum computation based on small quantum registers. Phys. Rev. A 76, 062323 (2007).
Jiang et al., Quantum repeater with encoding. Phys. Rev. A 79, 032325 (2009).
Kielpinski et al., Architecture for a large-scale ion-trap quantum computer. Nature 417, 709 (2002).
Kim & Kim, Integrated optical approach to trapped ion quantum computation. Quant. Inf. Comput. 9, 181 (2009).
Kim et al., 1100 x 1100 port MEMS-based optical crossconnect with 4-dB maximum loss. IEEE Photon. Tech. Lett. 15, 1537 (2003).
Kim et al., Efficient collection of single photons emitted from a trapped ion into a single-mode fiber for scalable quantum-information processing. Phys. Rev. A 84, 063423 (2011).
Kim et al., Entanglement and tunable spin-spin couplings between trapped ions using multiple transverse modes. Phys. Rev. Lett. 103, 120502 (2009).
Kim et al., System design for large-scale ion trap quantum information processor. Quant. Inf. Comp. 5, 515 (2005).
Kirchmair et al., Deterministic entanglement of ions in thermal states of motion. New J. Phys. 11, 023002 (2009).
Kitaev, Fault-tolerant quantum computation by anyons. Ann. Phys. 303 (2003).
Knill, Quantum computing with realistically noisy devices. Nature 434, 39 (2005).
Knoernschild et al., Independent individual addressing of multiple neutral atom qubits with a micromirror-based beam steering system. Appl. Phys. Lett. 97, 134101 (2010).
Korenblit et al., Quantum simulation of spin models on an arbitrary lattice with trapped ions. New J. Phys. 14, 095024 (2012).
Labaziewicz et al., Suppression of heating rates in cryogenic surface-electrode ion traps. Phys. Rev. Lett. 100, 013001 (2008).
Labaziewicz et al., Temperature dependence of electric field noise above gold surfaces. Phys. Rev. Lett. 101, 180602 (2008).
Ladd et al., Quantum computers, Nature 464, 45 (2010).
Langer et al., Long-lived qubit memory using atomic ions. Phys. Rev. Lett. 95, 060502 (2005).
Lee et al., Phase control of trapped ion quantum gates. J. Opt. B: Quantum Semiclass. Opt. 7, S371 (2005).
Leibrandt et al., Demonstration of a scalable, multiplexed ion trap for quantum information processing. Quant. Inf. Comp. 9, 901 (2009).

(56) References Cited

OTHER PUBLICATIONS

Li et al., Fault tolerant quantum computation with nondeterministic gates. Phys. Rev. Lett. 105, 250502 (2010).
Li et al., High threshold distributed quantum computing with three-qubit nodes. New J. Phys. 14, 093008 (2012).
Lin & Duan, Equilibration and temperature distribution in a driven ion chain. New J. Phys. 13, 075015 (2011).
Lin et al., Large-scale quantum computation in an anharmonic linear ion trap. Europhys. Lett. 86, 60004 (2009).
Lucas et al., A long-lived memory qubit on a low-decoherence quantum bus. arXiv:0710.4421v1 (2007).
Matsukevich et al., Bell inequality violation with two remote atomic qubits. Phys. Rev. Lett. 100, 150404 (2008).
Maunz et al., Heralded quantum gate between remote quantum memories. Phys. Rev. Lett. 102, 250502, arXiv:0902.2136 (2009).
Merrill et al., Demonstration of integrated microscale optics in surface-electrode ion traps. New J. Phys. 13, 103005 (2011).
Metodi et al., High-level interconnect model for the quantum logic array architecture. ACM Journal on Emerging Technologies in Computing Systems (JETC) 4 (2008).
Metodi et al., A quantum logic array microarchitecture: scalable quantum data movement and computation. Proc. 38th Annual IEEE/ACM Int. Symp. on Microarchitecture (MICRO'05) 12 (2005).
Moehring et al., Design, fabrication and experimental demonstration of junction surface ion traps. New J. Phys. 13, 075018(2011).
Moehring et al., Quantum networking with photons and trapped atoms. J. Opt. Soc. Am. B 24, 300 (2007).
Moehring et al., Entanglement of single-atom quantum bits at a distance. Nature 449, 68 (2007).
Mølmer et al., Multiparticle entanglement of hot trapped ions. Phys. Rev. Lett. 82, 1835 (1999).
Monroe & Kim, Scaling the ion trap quantum processor. Science 339, 1164 (2013).
Monz et al., Realization of the quantum Toffoli gate with trapped ions. Phys. Rev. Lett. 102, 040501 (2009).
Moore, Cramming more components onto integrated circuits. Electronics 38 (1965).
Mount et al., Single qubit manipulation in a microfabricated surface electrode ion trap, New J. Phys. 15, 093018 (2013).
Myerson et al., High-fidelity readout of trapped-ion qubits. Phys. Rev. Lett. 100, 200502 (2008).
Neeley et al., Generation of three-qubit entangled states using superconducting phase qubits, Nature 467, 570 (2010).
Neilson et al., 256 x 256 port optical cross-connect subsystem. J. Lightwave Tech. 22, 1499 (2004).
Nickerson et al., Topological quantum computing with a very noisy network and local error rates approaching one percent. Nature Comm. 4, 1756 (2013).
Nielsen & Chuang, Quantum Computation and Quantum Information (Cambridge University Press, 2000).
Noek et al., High speed, high fidelity detection of an atomic hyperfine qubit. arXiv:1304.3511v1 (2013).
Olmschenk et al., Manipulation and detection of a trapped Yb+ hyperfine qubit. Phys. Rev. A 76, 052314 (2007).
Olmschenk et al., Quantum teleportation between distant matter qubits. Science 323, 486 (2009).
Ospelkaus et al., Trapped-ion quantum logic gates based on oscillating magnetic fields. Phys. Rev. Lett. 101, 090502 (2008).
Raussendorf & Briegel, A one-way quantum computer. Phys. Rev. Lett. 86, 5188 (2001).
Raussendorf et al., A fault-tolerant one-way quantum computer. Ann. Phys. 321, 2242 (2006).
Raussendorf et al., Topological fault-tolerance in cluster state quantum computation. New J. Phys. 9, 199 (2007).
Sackett et al., Experimental entanglement of four particles. Nature (London) 404, 256 (2000).
Schiffer, Phase transitions in anisotropically confined ionic crystals. Phys. Rev. Lett. 70, 818 (1993).
Schmidt et al., Spectroscopy using quantum logic. Science 309, 749 (2005).
Schmidt-Kaler et al., Realization of the Cirac-Zoller controlled-NOT quantum gate. Nature 422, 408 (2003).
Seidelin et al., Microfabricated surface-electrode ion trap for scalable quantum information processing. Phys. Rev. Lett. 96, 253003 (2006).
Shen et al., Individual addressing in quantum computation through spatial refocusing. Phys. Rev. A 88, 052325 (2013).
Simon & Irvine, Robust long-distance entanglement and a loophole-free Bell test with ions and photons. Phys. Rev. Lett. 91, 110405 (2003).
Solano et al., Deterministic Bell states and measurement of the motional state of two trapped ions. Phys. Rev. A 59, R2539 (1999).
Sørensen et al., Quantum computation with ions in thermal motion. Phys. Rev. Lett. 82, 1971-1974 (1999).
Steane et al., Pulsed force sequences for fast phase-insensitive quantum gates in trapped ions. arXiv:1312.5645 (2013).
Steane, Error correcting codes in quantum theory. Phys. Rev. Lett. 77, 793 (1996).
Stick et al., Ion trap in a semiconductor chip. Nature Physics 2, 36 (2006).
Thaker et al., A realizable distributed ion-trap quantum computer. In High Performance Computing—HiPC 2006, 13th International Conference, Bangalore, India, Dec. 18-21, 2006, Proceedings, 111-122 (2006).
Togan et al., Quantum entanglement between an optical photon and a solid-state spin qubit. Nature 466, 730 (2010).
Turchette et al., Heating of trapped ions from the quantum ground state. Phys. Rev. A 61, 063418 (2000).
Van Meter & Itoh, Fast quantum modular exponentiation. Phys. Rev. A 71, 052320 (2005).
Vedral et al., Quantum networks for elementary arithmetic operations. Phys. Rev. A 54, 147 (1996).
Walther et al., Cavity quantum electrodynamics. Rep. Prog. Phys. 69, 1325 (2006).
Wang et al., Confinement-Higgs transition in a disordered gauge theory and the accuracy threshold for quantum memory. Ann. Phys. 303, 31 (2003).
Wang et al., Demonstration of a quantum logic gate in a cryogenic surface-electrode ion trap. Phys. Rev. A 81, 062332 (2010).
Wineland et al., Experimental issues in coherent quantum-stste manipulation of trapped atomic ions. J. Res. Nat. Inst. Stand. Tech. 103, 259 (1998).
Yao et al., Scalable architecture for a room temperature solid-state quantum information processor. Nature Communications 3, 800 (2012).
Zhou et al., Methodology for quantum logic gate construction. Phys. Rev. A 62, 052316 (2000).
Zhu & Wang, Unconventional geometric quantum computation. Phys. Rev. Lett. 91, 187902 (2003).
Zhu et al., Arbitrary-speed quantum gates within large ion crystals through minimum control of laser beams. Europhys. Lett. 73, 485 (2006).
Zhu et al., Trapped ion quantum computation with transverse phonon modes. Phys. Rev. Lett. 97, 050505 (2006).
Meter et al., Architecture-dependent execution time of Shor's algorithm. arXiv:quant-ph/0507023v2 (2005).
Milburn et al., Ion trap quantum computing with warm ions. Fortschr. Phys. 48, 801 (2000).
Tomita et al., Multi-qubit compensation sequences. New J. Phys. 12, 015002 (2010).

\* cited by examiner

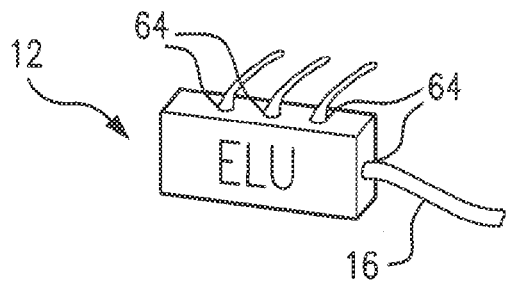

ELU with 100 physical qubits
& 6 communication ports
4 logical qubits (28)
Communicator qubits (60)
Ancilla qubits (12)
12 parallel operations

FIG. 5A

Logic Unit with 42 physical qubits
in 7x7 square format
4 logical qubits (28)
Ancilla qubits (20), 1 spare qubit
12 parallel operations

FIG. 5B

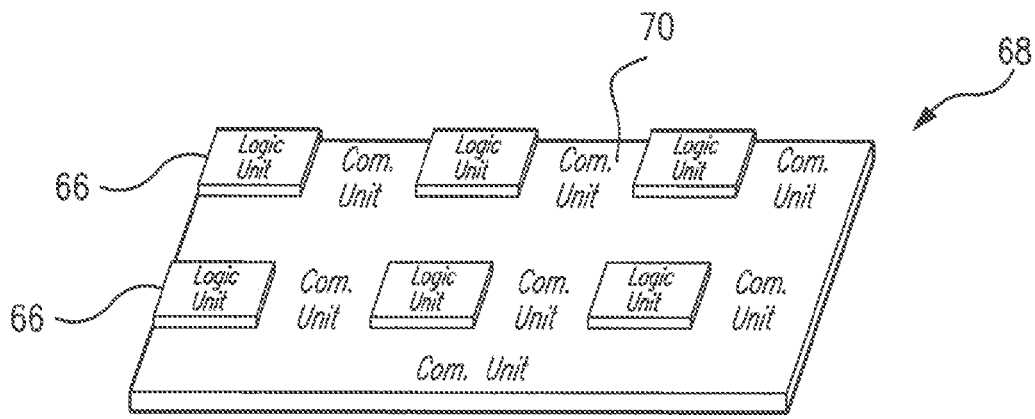

Logic Block with 6 logic units embedded in
communication units
24 logical qubits
882 communication qubits (7x7x18)
441 parallel operations

FIG. 5C

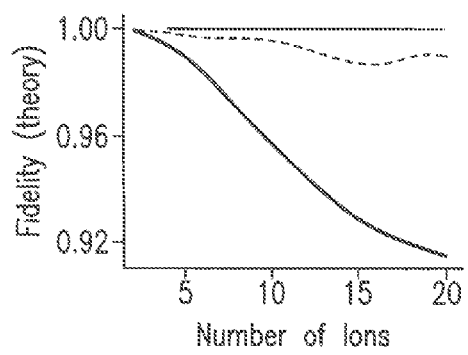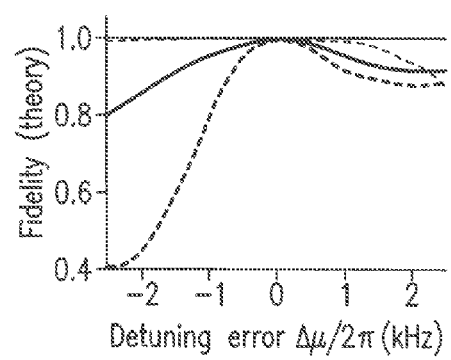
FIG. 12A
FIG. 12B

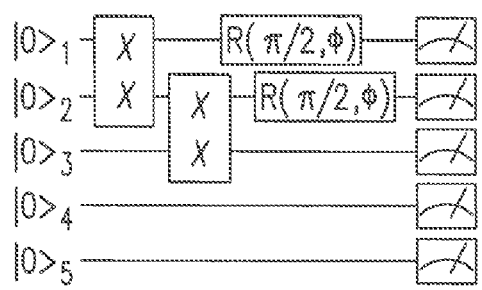 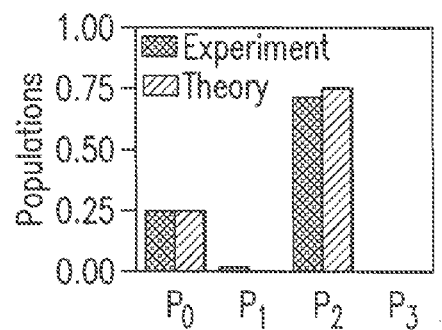
FIG. 13A                FIG. 13B
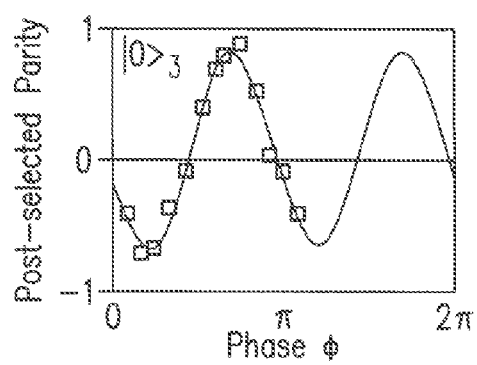 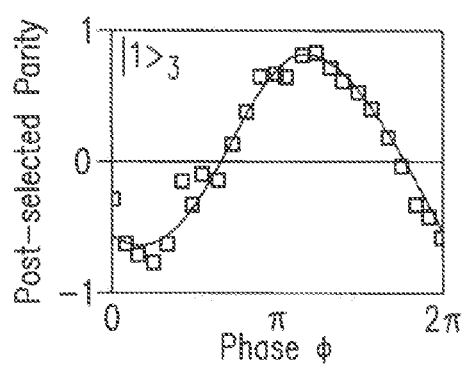
FIG. 13C

FAULT TOLERANT SCALABLE MODULAR QUANTUM COMPUTER ARCHITECTURE WITH AN ENHANCED CONTROL OF MULTI-MODE COUPLINGS BETWEEN TRAPPED ION QUBITS

STATEMENT REGARDING FEDERAL SPONSORED RESEARCH OR DEVELOPMENT

The development of the invention described herein was funded by IARPA under contract number W911NF1010231. The U.S. Government has certain rights in this invention.

REFERENCE TO THE RELATED APPLICATIONS

This Utility Patent Application is based on a Provisional Patent Application No. 61/861,455 filed on 2 Aug. 2013.

FIELD OF THE INVENTION

The present invention is directed to quantum computers, and more in particular to a large scale modular quantum computer architecture employing a number of modular quantum registers which may be dynamically interconnected in accordance with the requirements of a quantum algorithm and under control of a CPU to form a dynamically reconfigurable computational circuit composed of predetermined types of quantum gates, where local high fidelity quantum gates between qubit memories within the same quantum register module are accomplished using controlled interactions between the local qubits, and where quantum gates between distant quantum register modules are obtained via a probabilistic photonic interface between qubits in different (distant) quantum registers.

More in particular, the present invention is further directed to a large scale modular quantum computer architecture composed of a number of modular elementary logic units (ELUs), each of which represents a collection of stationary matter qubit memories, including trapped ions, quantum dots, neutral atoms, nitrogen-vacancy (NV) color centers in diamond, etc., with local interactions through the qubits' external collective modes of quantum harmonic motion (such as phonons) which are manipulated through the application of qubit-state-depending optical (or microwave) dipole forces to mediate entangling gates, and where distant modular ELUs are probabilistically linked when two (or more) qubits (also referred to herein as communication qubits) from a pair of distant ELUs are entangled by emitting the photons that interfere each with the other. The entanglement generated between the communication qubits residing in the distant ELU modules is utilized as a resource to obtain a multi-qubit quantum gate between any pair of ELUs.

Furthermore, the present invention is directed to a large scale modular quantum computer architecture built with a number of modular elementary logic units (ELUs), where the process of generation of ion-ion entanglement uses the photon interference requiring resonant excitation of the communication qubits, and where the communication qubits are isolated from other memory qubits in each ELU module with the purpose of eliminating disturbance of the memory qubits with the scattered light from an excitation laser and the emitted photons. This eliminates the crosstalk between the memory qubits and communication qubits in each ELU module, and attains an optimized multi-mode couplings between trapped ion qubits in modular ELUs for an efficient scaling of the computer architecture.

In addition, the present invention is directed to a large scale modular quantum computer architecture employing quantum memory modules, each housing a plurality of memory qubits, where the quantum memory modules are interlinked by photonic interconnects into dynamically reconfigurable multi-dimensional hypercells for forming 3-dimensional cluster states of multiple qubits for fault-tolerant quantum computations capable of an enhanced operation supported through the suppression of crosstalk between qubits in a quantum memory module of interest.

More in particular, the present invention is directed to a modular quantum computer architecture with hierarchy of interactions between qubits that supports the scaling of a very large number of qubits and is capable of forming quantum computational circuits realizable as multi-dimensional hypercells which are dynamically reconfigurable through a scheduled entanglement of both nearby and non-local qubits for an efficient fault-tolerant execution of computations in accordance with a prescribed algorithm and under control of a control processor unit (CPU), where an efficient error correction mechanism and intelligent coding schemes are implemented for an enhanced fault-tolerance of operation.

Furthermore, the present invention is directed to large scale modular quantum computer architecture composed of a number of reliable quantum memory modules (also referred to herein as quantum registers) such as, for example, trapped ion qubits, for hosting and manipulating quantum superpositions of trapped ion qubits, and a quantum dynamically reconfigurable photonic interconnect network for conveyance of quantum information between quantum gates realized either within a single modular quantum register or between distant modular quantum registers, as well as within and between multi-dimensional hypercells built with the quantum registers, independent of the distances therebetween in accordance with a predetermined schedule of controlled interactions between the qubits.

BACKGROUND OF THE INVENTION

A quantum computer is a computational system which uses quantum-mechanical phenomena, such as superposition and entanglement, to process data. Unlike digital computers in which data is encoded into binary digits (bits) in one of two definite states ("0" or "1"), the quantum computation requires data to be encoded into qubits (quantum bits), where a single qubit can represent a "1", a "0", or any quantum superposition of the two qubit states. In general, a quantum computer with N qubits can be in an arbitrary superposition of up to $2^N$ different states simultaneously, i.e., a pair of qubits can be in any quantum superposition of four states, and three qubits in any superposition of eight states.

Large-scale quantum computers are able to solve certain problems much more quickly than digital computers. In the operation of a quantum computer, the computations are initialized by setting the qubits in a controlled initial state. By manipulating those qubits, predetermined sequences of quantum logic gates are realized that represent the problem to be solved, called a quantum algorithm. Quantum algorithms, such as Shor's algorithm, Simon's algorithm, etc., run faster than any possible probabilistic classical algorithm. Quantum algorithms are often non-deterministic, as they provide the correct solution only with a certain known probability.

The computation is finalized with a measurement, which collapses the system of qubits into one of the $2^N$ pure states, where each qubit is purely "0" or "1".

An example of an implementation of qubits for a quantum computer could start with the use of particles with two spin states, such as "down" and "up", typically written $|\downarrow\rangle$ and $|\uparrow\rangle$, or $|0\rangle$ and $|1\rangle$. But in fact, any system possessing an observable quantity A, which is conserved under time evolution such that A has at least two discrete and sufficiently spaced consecutive eigenvalues, is a suitable candidate for implementing a qubit. Any such system can be mapped onto an effective spin—½ system.

In quantum computing, and specifically in the quantum circuit model of computation, a quantum gate (or a quantum logic gate) is a building block of quantum circuits. The quantum gates operate on a small number of qubits, and are represented by unitary matrices. The action of the quantum gate is found by multiplying the matrix representing the gate with the vector which represents the quantum state.

A gate which acts on k qubits is represented by a $2^k \times 2^k$ unitary matrix. The number of qubits in the input and output of the gate has to be equal. For example, the quantum gates operating on spaces of one or two qubits, can be described by 2×2 or 4×4 unitary matrices, respectively.

A quantum computer is composed of at least two quantum systems that serve critical functions: a reliable quantum memory for hosting and manipulating coherent quantum superpositions, and a quantum bus for the conveyance of quantum information between memories.

Quantum memories are typically formed out of matter such as individual atoms, spins localized at quantum dots or impurities in solids, or superconducting junctions (Ladd, T. D. et al. Quantum computers. *Nature* 464, 45 (2010)). On the other hand, the quantum bus typically involves propagating quantum degrees of freedom such as electromagnetic fields (photons) or lattice vibrations (phonons). A suitable and controllable interaction between the memory and the bus is necessary to efficiently execute a prescribed quantum algorithm.

A number of different types of quantum computers have been developed. For example, a trapped ion quantum computer is a type of quantum computer in which ions, or charged atomic particles, can be confined and suspended in free space using electromagnetic fields. Qubits are stored in stable electronic states of each ion, and quantum information can be processed and transferred through the collective quantized motion of the ions in the trap (interacting through the Coulomb force).

Lasers are usually applied to induce coupling between the qubit states (for single qubit operations), or coupling between the internal qubit states and the external motional states (for entanglement between qubits).

Trapped atomic ion crystals are considered the leading architecture for quantum information processing, with their unsurpassed level of qubit coherence and near perfect initialization and detection efficiency. Moreover, trapped ion qubits can be controllably entangled through their Coulomb-coupled motion by applying external fields that provide a qubit state-dependent force.

In the past two decades, trapped ion experiments have featured high quality qubits, and have demonstrated high quality quantum logic operations. Hyperfine qubits utilizing two ground states of an atom have been shown to routinely exhibit long coherence times of a few seconds, and more than an order of magnitude longer when operated in the "field-independent" regime where the energy splitting of the two qubit states is independent of the magnetic field fluctuations to a first order.

High fidelity qubit preparation with near-unity fidelity is routinely achieved by optical pumping, although the experimental characterization is typically limited by the qubit state detection process. This is commonly referred to as state preparation and measurement (SPAM) errors. High fidelity qubit state detection with errors in the $10^{-4}$ range are available in the optical qubit with an average detection time of 150 μs, while a direct detection of hyperfine qubits can be performed with $10^{-3}$ errors range with an average detection time of 50 μs. Single qubit gates on hyperfine qubits driven by microwave sources show the lowest level of error, in the $10^{-5}$ to $10^{-6}$ range.

The best performance of two-qubit gate demonstrated to date features errors in the $7 \times 10^{-3}$ range.

The current challenge in any quantum computer architecture is the scaling of the system to very large sizes due to possible errors which are typically caused by speed limitations and decoherence of the quantum bus or its interaction with the memory. The most advanced quantum bit (qubit) networks have been established only in very small systems, such as individual atomic ions bussed by the local Coulomb interaction, or superconducting Josephson junctions coupled capacitively, or through microwave striplines.

Scaling to large number of ions N within a single crystal is complicated by the many collective modes of motion, which can cause gate errors from the mode crosstalk. Such errors can be mitigated by coupling to a single motional mode, at a cost of significantly slowing the gate operation. The gate time $\tau_g$ must generally be much longer than the inverse of the frequency splitting of the motional modes, which for axial motion in a linear chain implies $\tau_g \gg 1/\omega_z \gg N^{0.86}/\omega_x$, where $\omega_z$ and $\omega_x$ are the center-of-mass axial and transverse mode frequencies. For gates using transverse motion in a linear chain, it is found that $\tau_g \gg \omega_x/\omega_z^2 \gg N^{1.72}/\omega_x$. In either case, the slowdown with qubit number N can severely limit the practical size of trapped ion qubit crystals.

There have been successful demonstrations of controlled entanglement of several-ion quantum registers in the past decade involving the use of qubit state-dependent forces supplied by laser beams. These experiments exploit the collective motion of a small number of trapped ion qubits, but, as the size of the ion chain grows, such operations are more susceptible to external noise, decoherence, or speed limitations.

A promising approach to the scaling of the trapped ion qubits is the use of a quantum charge-coupled device (QCCD), where physical shuttling of ions between trapping zones in a multiplexed trap is used to transfer qubits between short chains of ions. This approach was first suggested in D. Kielpinski, et al., Nature (London) 417, 709 (2002), but even in that architecture it is desirable to increase the number of qubits per zone. The QCCD approach is expected to enable a quantum information processing platform where basic quantum error correction and quantum algorithms can be realized.

The QCCD approach, however, careful control of the time-varying trapping potential to manipulate the position of the atomic ion and involves advanced ion trap structures, perhaps with many times more discrete electrodes than trapped ion qubits, and therefore requires the use of micrometer-scale surface traps. Novel fabrication techniques would be needed to support the implementation of the QCCD approach. Furthermore, this approach cannot easily be extended over large distances for quantum communications applications.

Further scaling in the near future will likely be limited by the complexity of the trap design, diffraction of optical beams (Kim, J. & Kim, C., Integrated optical approach to trapped ion quantum computation. *Quant. Inf. Comput.* 9, 181-202 (2009), and the hardware controllers to operate the system.

Among numerous attempts to overcome the challenges facing quantum computer scaling, the scalable quantum computer architecture framework has been developed which is presented in U.S. Pat. No. 7,875,876 issued to Wandzura, et al. This system includes components necessary for computer computations, such as local computer computations, distributed quantum computation, classical control electronics, classical control software, and error-correction. Specifically, Wandzura, et al., employs at least a pair of classical to quantum interface devices, each connected to a distinct quantum processing unit (QPU). An Einstein-Podolski-Rosen (EPR) pair generator is included for generating an entangled EPR pair that is sent to the quantum processing units (QPUs). Each QPU is quantumly connected with the EPR pair generator (EPRPG) and is configured to receive a mobile qubit from the ERRPG and perform a sequence of operations such that the mobile qubit interacts with a source qubit where a teleportation algorithm is initiated, leaving a second mobile qubit in the original quantum state of the source qubit.

The Wandzura design does not suggest truly modular quantum computer architecture which would be built with a plurality of modular quantum memory registers dynamically configurable and reconfigurable into multi-dimensional computational hypercells for fault-tolerant operation capable of mapping to 3-dimensional cluster states of ion qubits in accordance with the predetermined quantum algorithms. Moreover, Wandzura's system is silent on any mechanism for the crosstalk suppression, and it is not believed to be capable of scalability to large numbers of qubits.

Thus, a quantum computer architecture scalable to a large number of ions and free of the shortcomings of the existing approaches is still a long-lasting challenge in the field of quantum computers.

SUMMARY OF THE INVENTION

It is therefore an object of the present invention to provide a fault-tolerant modular universal scalable quantum computer (MUSIQC) architecture that may enable construction of quantum processors with a large number of stationary matter qubits, such as, for example, trapped ions, quantum dots, neutral atoms, NV color centers, etc., utilizing component technologies that have already been demonstrated as reliable and effective.

It is an additional object of the present invention to provide a large scale modular quantum computer architecture with atomic memories and photonic interconnects enhanced by a quantum control of multimode couplings between trapped ion qubits for reliable scalable entanglement through optimally shaping optical fields that couple to multiple collective modes of motion. This approach enables high-fidelity gates that can be scaled to large qubit registers for quantum computations and simulation.

It is another object of the present invention to provide a large scale modular quantum computer architecture featuring modular multi-qubit registers that may be combined with ion shuttling, and scalable photonic interconnects that can dynamically link the modular multi-qubit registers in reconfigurable flexible configurations, such as, for example, multi-dimensional hypercells of the modular multi-qubit registers supporting the controllable mapping to 3D cluster states of multiple qubits independent of distances between the modular registers, and capable of implementation of complex quantum computational circuits prescribed by quantum algorithms via the reconfigurable photonic interconnect network.

It is a still further object of the present invention to provide a large scale modular quantum computer architecture that attains significant processing speed and effective resource (qubits required for computations) reduction in quantum circuit execution over other hardware architectures enabled by the ability to realize quantum gates throughout the entire computational process regardless of qubits relative location.

It is still an object of the present invention to provide a large scale modular quantum computer architecture supporting fault-tolerant error correction even in the face of probabilistic and slow interconnects.

It is a further object of the present invention to provide a scalable quantum computer hardware capable of executing non-trivial quantum algorithms which require the juxtaposition of different types of quantum systems where quantum registers may be implemented as composed of trapped atom ions, as well as other qubit platforms that feature strong optical transitions, such as quantum dots, neutral atoms, and nitrogen-vacancy (NV) color centers in diamond.

A hierarchy of quantum information processing units in the subject modular quantum computer architecture may provide the scaling of high performance quantum memories to useful sizes. This architecture is compatible with the "multicore" classical information processor, and is suitable for the implementation of complex quantum circuits utilizing the flexible connectivity provided by a reconfigurable photonic interconnect network.

All of the rudiments of the present quantum computer architecture have been experimentally demonstrated in small-scale trapped ion systems. It has also been demonstrated that the subject reconfigurable architecture can be made fault-tolerant over a wide range of system parameters, using a variety of fault-tolerant mechanisms and schemes.

Although being applicable to various types of quantum systems featuring stationary matter qubits with strong optical transitions, such as trapped ions, quantum dots, neutral atoms, NV (Nitrogen-Vacancy) color centers in diamond, etc., the subject system as described herein may use the atomic ion qubit memories which have the advantageous qubit properties demonstrated to date. Qubits stored in ions exhibit a level of coherence that is unmatched in any other physical system, underlying the reason such states are also used as high performance atomic clocks. Moreover, atomic ions can be initialized and detected with nearly perfect accuracy using conventional optical pumping and state-dependent fluorescence techniques.

In one aspect, the present invention is directed to a large scale modular quantum computer architecture with atomic memory and photonic interconnects which includes:

a processor unit configured to initiate, schedule and control quantum computations in accordance with a quantum algorithm, a plurality of $N_{ELU}$ modular elementary logic units (ELUs), each modular ELU housing a plurality of $N_q$ of stationary matter qubits (for example, ion qubits) and constituting a high performance quantum memory register, and a photonic interconnect network operatively coupled to the plurality of modular ELUs and configured to propagate quantum degrees of freedom of the qubits.

The photonic interconnect network provides entanglement generation between the distant ELUs in a respective pair with up to $N_{ELU}/2$ entanglement operations performed in parallel.

The photonic interconnect network includes an optical cross-connect (OXC) switch having $N_{ELU}$ input ports and $N_{ELU}$ output ports, a plurality of optical fibers, each coupled between a respective communication port of a respective ELU and a respective input port of the OXC switch, a plurality $N_{ELU}$ of the beam splitters coupled, at an input line thereof, by the first and second optic fibers to a respective one of the output ports of the OXC switch, and, at an output end thereof, to a respective one of the first and second detectors.

The OXC switch is configured to establish a non-blocking connectivity between the plurality $N_{ELU}$ of the ELUs.

The photonic interconnect network is adapted to operatively multiplex respective modular ELUs in a dynamically reconfigurable at least one quantum computational circuit through realization, under control of the processor unit, of at least a first quantum gate between qubits housed in the respective distant modular ELUs in accordance with a schedule determined by the quantum algorithm, and of at least a second quantum gate between a predetermined set of qubits housed in a respective at least one modular ELUs in accordance with a schedule determined by the quantum algorithm. The first and second quantum gates may be executed through the application of qubit-state-dependent forces to respective qubits (either in the same modular ELU residing in distant ELUs) in a highly parallel fashion.

Preferably, the quantum computational circuit is built through the dynamical interlinking of the modular ELUs in multi-dimensional hypercells in which scheduled realization of quantum gates is performed for quantum computations in a fault-tolerant manner.

A control sub-system in the subject quantum computer architecture is operatively coupled to the respective modular ELU for controlling the qubit-state-dependent forces with the purpose of applying optimal control parameters to multiple modes of motion of the qubits housed in the module ELU in question, in order to suppress a mode crosstalk within the ELU, thereby enabling high fidelity operation of the quantum gate realized in the ELU for enhanced scalability of the subject quantum computer.

A photon detection sub-system is operatively coupled to a respective at least one of the first and second quantum gates via the photonic interconnect network to detect a successful realization of the first and/or second gates in question.

Upon detection of the photon(s) manifesting the successful realization of the quantum gates, a measurement sub-system (which is operatively coupled to the detection sub-system), measures the state of the qubits output by the quantum gates.

The subject large-scale modular quantum computer architecture further includes a laser sub-system configured for generating laser beams with predetermined characteristics to be operatively coupled to the ELUs in a controlled manner in accordance with the quantum algorithm to form, in a dynamical fashion, the computational circuit(s) needed for computations through realization of first and second quantum gates as scheduled by the prescribed quantum algorithms.

The control sub-system in question is operatively coupled to the laser sub-system for optimally shaping at least one of the laser beams to apply qubit state-dependent optical forces to a respective subset of the ion qubits of interest housed within an ELU of interest.

The optimal control parameters include a predetermined pulse shape of the second laser beam designed for disentanglement of the $N_q$ modes of motion of the ion qubits housed within the same modular ELU. The optimal control parameters may also include spectral phase, amplitude, and spatial addressing of the ion qubits of interest.

Preferably, the laser sub-system operates with a first laser configured for initialization of the ion qubits to set the qubits of interest in a controlled initial state which represents the computational problem to be solved.

A mode-locked laser (or a sufficient ensemble of continuous-wave lasers) may be provided in the laser sub-system which is configured to simulate Raman transitions between the ion qubits with purpose of producing qubit state-dependent optical forces to manipulate the ion qubits of interest.

The laser may be adapted for generation of a first laser beam, illuminating the plurality of ion qubits in the modular ELU, and a second laser beam for manipulating the subset of adjacent ion qubits of interest the interaction between which is desired. The multiple modes of motion of the $N_q$ ion qubits are caused by application of the first laser beam of the Raman laser. Alternatively, in the ensemble of continuous-wave high-power lasers, each laser may be responsible for a respective one of the first and second laser beams.

The pulse shape of the second laser beam for manipulating the subset of the qubits of interest is evenly partitioned into $(2N_q+1)$ segments, wherein $N_q$ is the number of the ion qubits in each modular ELU.

Another resonant laser may be presented in the laser sub-system which is configured to participate in the ion qubits states measurements by applying the laser beam to the ion qubits states, resulting in a state-dependent fluorescence where the state-dependent fluorence technique is used in ion qubit states measurements.

Alternatively, or in addition to the state-dependent fluorence technique, the measurement sub-system may use a polarizer, i.e., the optical system of lenses to determine the polarization (horizontal or vertical, diagonal or anti-diagonal, right- or left-circular polarization) of the photons, the intensity (energy), and the phase or frequency of the photon.

The computational quantum circuit is formed through the scheduled realization of the quantum gates, in each respective ELU and/or through a probabilistic connection which is realized between distant modular ELUs by generation of entangled Bell pairs of communication ion qubits in accordance with the quantum algorithm, where each communication ion qubit resides in a respective one of the distant modular ELUs to perform measurement-based quantum computations.

A time division multiplexing (TDM) mechanism may be applied to the communication ports of the distant ELUs to reduce entanglement generation time therebetween.

As a part of the enhanced fault-tolerance provided in the subject system, an error-correction mechanism may be applied to the quantum gates. The error-correction mechanism is configured to reduce a mismatch between the entanglement generation time for the distant modular ELUs and the entanglement generation time within a respective modular ELU.

The error-correction mechanism is preferably based on application of a Steane quantum error correction code to multiple levels of concatenation of the Steane code followed by the quantum gates realization.

As an alternative approach to ensure fault-tolerance, the computational quantum circuit may be configured and dynamically reconfigured through the controlled multiplexing of the modular ELUs into one or a plurality of multi-dimensional hypercells where each hypercell may have a storage capacity for quantum information as each of the modular ELUs, and the ability of deterministical entanglement with other hypercells.

There are different implementations of the multi-dimentional hypercells applicable in the subject system. As an example, the hypercell may have the shape of a snowflake with the connectivity tree where each said ELU is positioned at a respective node of the snowflake's connectivity tree.

The ELUs in the snowflake's connectivity tree are interconnected through the photonic interconnect network to have a root ELU, multiple layers of ELU branches coupled to the root ELU forming an extended surface area with a number of external ELU's communication ports.

At least two of the snowflake hypercells may be entangled at their surface areas via the external communication ports thereby attaining a photonic link, and each Bell pair created between the snowflake hypercells may be teleported to a Bell pair between the root ELUs of the hypercells.

Preferably, such a snowflake hypercell is formed in stages, initiating with the external ELUs at the surface area, and iteratively coupling underlying layers of ELUs to the superposed layers of ELUs.

In another exemplary implementation, the multi-dimensional hypercell may be represented by a three-dimensional (3D) structure. The 3-dimensional (3D) hypercell is formed as a 3D grid with ELUs on the edges and on the faces of the 3D grid. For each ELU containing, for example, four qubits and linked to four neighboring ELUs, the 3D grid probabilistically creates a 4-valent 3D cluster state by generating Bell pairs between these ELUs. In this case, the qubits in each ELU form near deterministic links between different 3D cluster states, and each 3D cluster state transforms into a fault-tolerant star-shaped graph state via Pauli measurements.

The modular ELUs in the subject system may be formed with at least one chain of physical ion qubits. Some of the physical qubits may serve as refrigerator ion qubits interposed between respective physical ion qubit to diminish motional excitations between the quantum gates. The refrigerator ion qubits may be chosen from different ion species than the physical ion qubits.

Communication ion qubits are coupled to the dynamically reconfigurable photonic interconnect network to realize quantum gate between the distant ELUs. An isolating mechanism may be applied for isolating the communication ion qubits from the physical ion qubits. The isolating mechanism may be carried out either through shuttling of the communication ion qubits away from the physical ion qubits, or by utilizing different ion species for the communication ion qubits than the physical ion qubits.

Logical ion qubits are formed in a controlled fashion with a plurality of physical ion qubits residing in the same ELU or in different ELUs.

The photon detection sub-system is adapted to detect a coincidence event for the photons emitted from communication qubits of the distant ELUs which indicates the entanglement of the communication qubits.

The photon detection sub-system includes an array of $N_{ELU}/2$ Bell state detectors, each comprising a first and second optic fibers and a first and a second photon counting detectors. Each of the optic fibers interferes, at one end thereof, with a respective output end of a beam splitter, and at another end with a respective one of the first and second photon detectors.

The photon detector sub-system further may include a charge-coupled-device (CCD) operating in parallel with the Bell state detectors, where pairs of regions in the CCD are associated with respective pairs of output ports of the beam splitter.

The subject quantum computer is configured to apply, when needed, entanglement swapping protocols to coordinate the entanglement generation time with communication times scaling poly-logarithmically (or independent of the communication distance) by employing quantum buses formed by qubits interpositioned between the distant ELUs.

The principles of the subject system, are applicable to formation of a variety of computational circuits, for example, an adder circuit configured to compute a sum of two n-bit integers. The adder circuit may be formed with 6n logical qubits distributed on several ELUs at a first concatenation level of Steane code encoding, and may be implemented through realization of X, CNOT, and Toffoli quantum gates, wherein Toffoli quantum gate is realized between the distant ELUs, and X and CNOT gates are realized within respective modular ELUs.

In the adder circuit each of the distant ELUs includes at least three logical qubits, at least seven-qubit cat state, and a sufficient number of ancilla qubits to support qubit state preparation. Each of the logical qubits includes at least four ancilla qubits to provide realization of four-qubit cat states.

The Toffoli gate in the adder circuit may be realized by allocating at least one fresh ELU, preparing the initial $|\phi_+\rangle_L$ state, and teleporting the three logical qubits in at least one distant ELU into the $|\phi_+\rangle_L$ state via photon interference. Finally, the logical qubits are freed and logical qubits from other ELUs are used for realization of another Toffoli gate.

In an alternative aspect, the present invention is directed to a method of quantum computing carried out through:

inputting data for being computed by the subject quantum computer in a processing unit;

linking a plurality $N_{ELU}$ of modular elementary logic units (ELUs) into a multi-dimentional computational structure through a dynamically reconfigurable photonic interconnect network, wherein each modular ELU hosts a plurality $N_q$ of stationary matter qubits (such as, for example, trapped ion qubits);

applying laser pulses to ion qubits in a respective modular ELU to set the qubits in a controlled initial state which represents the computational problem to be solved;

shaping a laser beam; and illuminating, by the shaped first laser beam, a subset of qubits of interest in at least one of the plurality of modular ELUs to realize at least one first quantum gate between the subset of qubits in question in at least one modular ELU. The application of the shaped first laser beam causes a disentanglement of modes of motion of the ion qubits in the modular ELU, thereby suppressing modes crosstalk in the modular ELU, and thereby obtaining a high fidelity first quantum gate.

Substantially in parallel with realizing the first quantum gate in the same modular ELU, the method provides illumination, by a second laser beam, of at least a pair of qubits housed in distant ELUs to realize at least one second quantum gate between the distant modular ELUs.

Upon obtaining the first and/or second quantum gates in accordance with a predetermined schedule, the method continues with forming of at least one quantum circuit supported by the multi-dimensional computational structure under control of the processor unit as requested by the prescribed quantum algorithm adapted for the solution of the computational problem of interest.

Subsequently, the states of qubits produced by the first and/or second gates are measured and forwarded to the processing unit for further processing and output as the result of the computational problem in question.

In the subject method, prior to the qubits' states measurement, the detection of the obtaining of first and/or second quantum gates is carried out through registering corresponding photon events heralding the entangled quantum gates between the illuminated qubits.

The subject method uses a plurality of physical qubits residing in each modular ELU in accordance with a predetermined schedule determined by the quantum algorithm, and executed through controlling the photonic interconnect network by the processing unit. A group of the physical qubits, residing in the same or different ELUs can be manipulated to form a logic qubit for addressing logical operations as requested by the quantum algorithm.

In the subject method, qubits initialization stage is performed through:
applying a Steane code to the physical qubits of interest in at least one modular ELU,
multiple time measuring six stabilizers of the Steane code using 4-qubit cat state, wherein each subsequent measurement of the six stabilizers is performed by re-using of four ancilla qubits for each logical qubit, and
measuring the logical operator $Z_L$ (in the Pauli group) using a 3-qubit cat state to finalize the qubit initializing.

The subject method is applicable to formation of different types of quantum gates including X gates, CNOT gates, Toffoli gates, etc., and forming different computational structures, such as, for example, arithmetic circuits, using the quantum gates.

For example, for constructing a CNOT quantum gate between the qubits in the distant modular ELUs, the teleportation of a pair of minimally entangled qubits is carried out to a vicinity of this pair of ion qubits, and
upon the CNOT gate's realization, the constructed CNOT gate is teleported.

For construction of an arithmetic circuit, such as, for example, a quantum adder circuit, X, CNOT, and Toffoli gates are realized. For the adder circuit formed as a quantum ripple-carry adder (QRCA), the gates may be realized in the same ELU, while for the adder circuit formed as a quantum carry-look ahead adder (QCLA), the gates may be realized between distant ELUs.

A dedicated photonic communication bus is executed between the distant ELUs, wherein each of the distant ELUs hosts at least three logical qubits, at least 7-qubit cat state, and each of the distant ELUs accommodates the generation of the $|\phi_+\rangle$ initial state corresponding to the computational problem in question, and a number of ancilla qubits to support the $|\phi_+\rangle$ state preparation.

The Toffoli gate for the adder circuit is prepared through:
allocating a fresh ELU,
preparing the initial $|\phi_+\rangle$ state,
generating entangled states $|\phi_+\rangle$ in the distant ELUs via photonic interference,
providing at least three optical ports in a cross connect switch of the dynamically reconfigurable photonic interconnect network to connect to the distant ELUs in parallel and operating at least three optical ports in a multiplexing regime,
teleporting three logical qubits from the distant ELU in the $|\phi_+\rangle$ state, thus realizing the Toffoli gate, and
freeing the three logical qubits from the distant ELU for availability for subsequent realization of another Toffoli gate as needed.

The subject method permits dynamical multiplexing of the modular ELUs into one or a number of multi-dimensional hypercell(s) with the ELUs located on the faces and edges of a multi-dimensional lattice. Each ELU in the multi-dimensional lattice may contain at least four qubits and be linked to four neighboring ELUs.

Upon creation of the hypercell(s), the subject method is implemented through scheduling of the realization of the quantum gates in a respective at least one ELU and between distant ELUs in the multi-dimensional hypercell(s) by:
creating 4-valent 3D cluster state by probabilistically generating Bell pairs between the distant ELUs via the dynamically reconfigurable photonic interconnect network,
realizing CNOT gates within each said ELU, and
performing local measurements of three out of four qubits in each ELU.

The subject method supports the operation of reconfiguring the computational quantum circuits, and multi-dimensional hypercells as dynamically requested by the quantum algorithm.

Each hypercell may have a storage capacity for quantum information as each of said ELUs, and the ability of deterministical entanglement with a number of other hypercells.

The multi-dimensional hypercell may be formed as a 3D grid or, alternatively, with a snowflake connectivity tree, where each ELU is positioned at a respective node of the snowflake's connectivity tree. The multi-dimensional hypercells may be entangled, required by computational process, in superstructures.

For example, a plurality of ELUs in the snowflake connectivity tree are interconnected to form a root ELU, followed by multiple layers of ELU branches coupled to the root ELU forming an extended surface area with a number of external ELU's communication ports. The subject method assumes entangling of at least two of the snowflake hypercells at the surface areas via the external communication ports thereby attaining a photons link, and teleportation of a Bell pair created between two hypercells as to a Bell pair between the root ELUs of two hypercells in question.

The snowflake hypercell may preferably be formed in stages, starting with the external ELUs at the surface area, and iteratively coupling underlying layers of ELUs to superposed layer of ELUs.

These and other features and advantages of the present invention will become apparent when taken in view of the patent drawings and detailed description of the preferred embodiment.

BRIEF DESCRIPTION OF THE DRAWINGS

FIG. 2A is representative of classical laser fields which impart qubit state-dependent forces on one or more ions, affecting entangling quantum gates between the memory qubits in the same ELU; and FIG. 2B is representative of one or more of the ions in distant ELUs which are coupled through a photonic interface, where a classical laser pulse maps the state of the communication qubits onto the states of single photons which then propagate along an optical fiber to be interfaced with other ELUs;

FIG. 4A is representative of fault-tolerant Toffoli gate, where the initial state $|\phi_+\rangle_L$ is prepared by measuring the $X_1$ and $CNOT_{12}$ of 3-qubit state $|0\rangle_1 (|0\rangle_2 + |1\rangle_2)|0\rangle_3/\sqrt{2}$; and FIG. 4B is a representation of the Toffoli gate prepared using the state of FIG. 4A, where the Toffoli gate can be realized using only measurement, Clifford group gates, and classical communication, all of which can be implemented fault tolerantly in the Steane code;

FIG. 5A is a schematic representation of the modular ELU capable of 12 parallel operations;

FIG. 5B is a representation of a Logic Unit;

FIG. 5C is a logic block with six logic units (LUs) embedded in communication units;

FIG. 10A is a diagram of comparison of Bell state entanglement fidelity for a constant pulse vs. a five-segment pulse over a range of detuning μ;

FIG. 10B illustrates a segmented pulse pattern parameterized by the Rabi frequency;

FIG. 10C illustrates phase space trajectories subject to pulse sequence (in FIG. 10B);

FIG. 11A is representative of applied pulses pattern and measured parity oscillations for a constant pulse used to entangle ions 1 and 2;

FIG. 11B is similar to FIG. 11A but for a nine-segment pulse;

FIG. 11C is representative of another nine-segment pulse pattern used to entangle ions 2 and 3;

FIG. 11D is representative of phase space trajectories for the pulse pattern applied to the ion pair 1 and 2;

FIG. 12A is a diagram of a theoretical entanglement gate fidelity for ions 1 and 2 as a function of total number of ions for constant, five-segment and nine-segment pulses;

FIG. 12B is a diagram of a theoretical entanglement gate fidelity for the ions 1 and 2 as a function of detuning error;

FIG. 13A is a circuit for concatenated XX gates between ions 1 and 2, 2 and 3, and π//2 analysis rotation with phase;

FIG. 13B is a diagram of measured population after XX gates between ions 1-2 and 2-3;

FIG. 13C is a diagram of parity oscillations of ions 1 and 2;

DETAILED DESCRIPTION OF THE PREFERRED EMBODIMENTS OF THE PRESENT INVENTION

Figure 1:
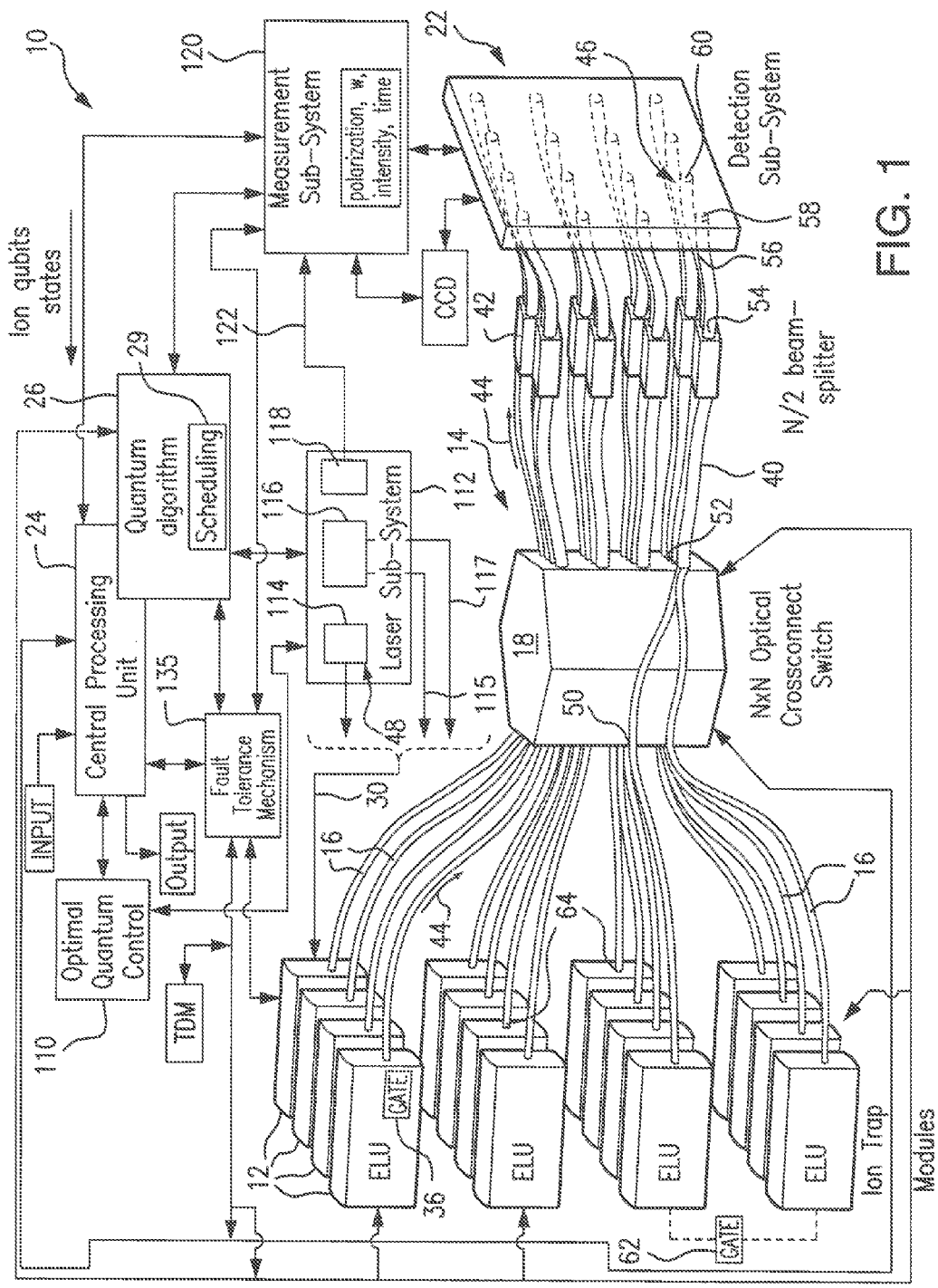
FIG. 1 is a schematic representation of the scalable large modular quantum computer architecture of the present invention.

The subject Modular Universal Scalable Ion-Trap Quantum Computer (MUSIQC) is a hierarchical design for a quantum computer (QC) that uses a new approach to entangle both nearby and non-local qubits in a dynamically reconfigurable fashion as required by a computational problem to be solved. In executing large quantum algorithms supported by a Central Processor Unit, an interconnect architecture for moving quantum information (QI) within the QC has a large impact on the system scalability. MUSIQC presents a novel concept for achieving such scalability with technologies that are either already available or within an experimental reach.

Although the principles underlying the design and operation of the subject quantum computer are applicable to different types of memory qubits, such as stationary matter qubits including trapped ions, quantum dots, cold atoms, NV color centers in diamonds, and other quantum systems featuring strong optical transitions, as an example of one of many possible implementations, the subject quantum computer architecture is described as being based on a set of modular high performance quantum memory registers (each also being referred to herein as an "elementary logic unit", or ELU) of trapped ions where high fidelity gates via Coulomb interaction can be realized via photonic qubits through the dynamic and reconfigurable photonic interconnect network.

The MUSIQC architecture offers significant advantages over more traditional ion trap architectures, e.g., segmented traps and the shuttling of ions, by relaxing the required technical complexity and suppressing conventional crosstalk issues, while providing a higher level of connectivity between the qubits for an efficient algorithm implementation.

Scaling up to multi-qubit operation is attained through application of necessary control mechanisms adapted to efficiently prepare and manipulate the large quantum system.

A versatile general purpose 80-qubits QC has been proposed with the capability of complex quantum algorithms execution.

MUSIQC is a hierarchical processor architecture that may enable construction of quantum processors with thousands or more qubits utilizing component technologies that have already been demonstrated. This architecture features (inter alia): (1) simple and compact trapped ion qubit registers (ELUs) that do not necessarily require ion shuttling, multi-electrode structures and are relatively insensitive to ion heating, and (2) the linking of individual modular registers using scalable photonic interconnects that incorporate a fully non-blocking N×N optical crossconnect (OXC) switch.

The flexibility of this approach provides the tailoring of the subject architecture (e.g., how many ions per ELU, how many ion/photonic interfaces per ELU, how many ELUs) to the actual noise sources or crosstalk issues that may emerge, which is an important large-scale design criterion. Substantial architectural advantages of the subject modular approach are enabled by the ability to operate quantum gates between qubits throughout the entire quantum computer regardless of their relative location. Such an architectural advantage provides a substantial speedup of quantum circuit execution over other hardware architectures.

MUSIQC employs new methods for extending stationary ion registers up to about a hundred ions, involving simple extensions to existing ion trap designs to form the ELU register without employing ion shuttling. An anharmonic axial trap provided by static electrode potentials is proposed in the subject system intended to stabilize a single linear crystal containing a large number of ions ($\leq 100$). Tightly-confined and closely-spaced transverse phonon modes can mediate quantum gate operations in this architecture, while eliminating the need for single-mode resolution and multi-mode side-band cooling and reducing the sensitivity to ion motion heating.

Gate operations in the large ion array exploit the local character of the laser-induced dipole interaction that is only dominated by nearby ions. As a result, the complexity of the quantum gate does not necessarily increase with the size of the quantum register. Such gates can be realized through amplitude and spectral shaping of the laser pulses with gate fidelities expected to be beyond conventional error thresholds, even in a large quantum register consisting of up to a hundred ions. Effectively, the difficulty with complex ion trap structures is transferred in the subject quantum computer to the complexity of the applied laser pulse properties which can be addressed leveraging known optical and laser technology.

A photonic interface between the trapped ions is accomplished by interfering and detecting single photons emitted from the respective ion qubits. Appropriate photon detection events herald the entanglement of the ions, or the successful operation of an entangling quantum gate between the ions.

Simple versions of the ion/photon link have been demonstrated in a series of experiments with the Yb$^+$ system, and has recently been exploited to teleport an atomic qubit through a photonic channel and to operate a quantum gate between remote ions. This type of ion/photon link is inherently probabilistic, but it does not necessarily affect the fidelity of the resulting entangled states of the ions and only limits the speed of the connection.

The experiments performed used free space optics that limits the net two-photon success probability of only $p=3\times 10^{-8}$, and the connection speed is on the order of $R=0.001$ Hz. The overarching factor in small success probability is a low light collection efficiency from a single ion into an optical fiber (which is squared for the two independent photons). By integrating novel optical structures with ion traps, success probabilities approaching $p\sim 10^{-3}$ are expected, significantly enhancing the entanglement rate. A substantial research effort throughout the development of the subject quantum computer has been dedicated to improving the success rate of the photonic interface, and the connection rate of R=4.5 Hz, well beyond typical decoherence rates in the Yb$^+$ qubit has been achieved (D. Hucul, et al., Modular Entanglement of Atomic Qubits using both Photons and Phonons, arXiv:1403.3696v1, 2014).

Many individual trapped ion ELU registers can be further multiplexed by linking them in a superstructure using a reconfigurable optical interconnect network. The availability of a scalable, fully non-blocking N×N optical crossconnect (OXC) switch enables the construction of a globally connected distributed QC with $N_{ELU}$ registers each connected to an input port of the OXC switch, as depicted in FIG. 1. The output ports are grouped into N/2 pairs each connected a photonic Bell-state detector (two-photon interferometer).

By connecting any two ELUs to the output ports corresponding to a Bell-State detector, entangled ion pairs can be generated between these ELUs in parallel. The configuration of the ELU connection may be dynamically modified via the OXC switch.

A distributed quantum information processor constructed in this manner can support N×m physical qubits (where m is the number of ions per quantum register). The construction of the MUSIQC with up to 100,000 ion qubits may be feasible by connecting N=1000 ELUs, each containing m=100 ions.

Referring to FIG. 1, the present quantum computer system 10 includes a number $N_{ELU}$ of modular stable trapped ion multi-qubit registers, also referred to herein as elementary logic units (ELUs) 12, which are interconnected through scalable photonic interconnect network 14 linking the registers (intermittently referred to herein as ELUs) 12 in a flexible configuration over large distances.

The hierarchical modular quantum computer architecture 10 hosts $N=N_{ELU}\times N_q$ qubits, where each elementary logic unit ELU 12 constitutes a modular register of $N_q$ trapped atomic ion qubits, and where entangling quantum logic gates are mediated through the local Coulomb interactions between qubits. One or more atomic qubits within each of the $N_{ELU}$ registers are coupled to photonic quantum channels 16, and through a reconfigurable optical cross-connect (OXC) switch 18, fiber beam splitters 20, and position sensitive imager 22, the qubits between different registers 12 may be entangled.

A central processor unit (CPU) 24 receives INPUT data to be processed and computed, and controls the operation of the quantum computer system 10 for execution of scheduled 29 operations in accordance with a prescribed quantum algorithm 26 for realization of dynamically reconfigurable circuit schemes for quantum computing of the INPUT data with the purpose of producing the results of the computation, depicted as OUTPUT in FIG. 1.

The Modular Elementary Logic Unit (ELU)

The base unit of the subject Modular Universal Scalable ion trap quantum computer (MUSIQC) 10 may be a collection of $N_q$ modular Elementary Logic Units (ELUs) 12 which are qubit memories with local interactions. Quantum logic operations within each modular ELU are ideally fast and deterministic, with error rates sufficiently small that fault-tolerant error correction within each ELU 12 is possible.

Figure 2A:
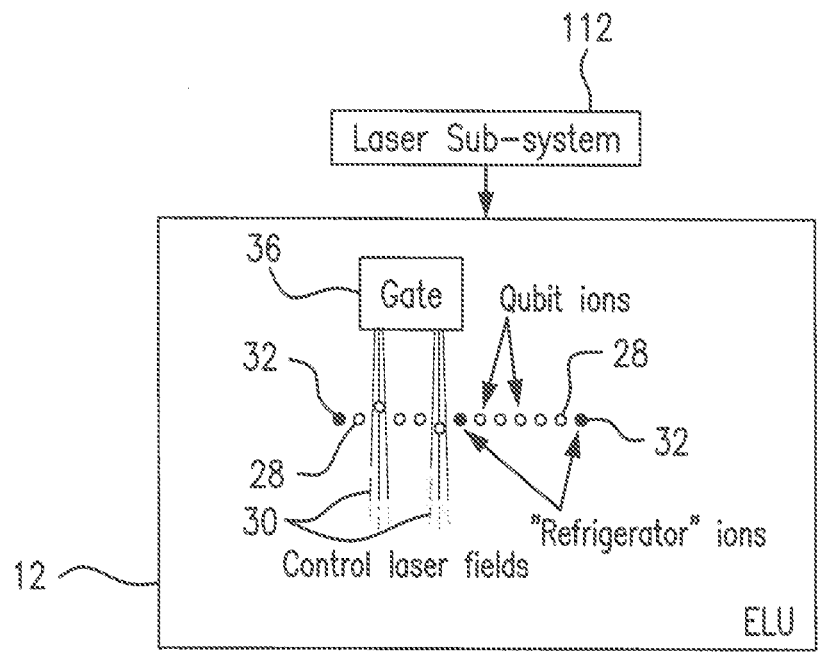
FIGS. 2A-2B represent schematically the modular Elementary Logic Unit (ELU) composed of a single crystal of $N_q$ trapped ion qubits coupled through their collecting motion, where

Each ELU 12 is represented with a crystal of $N_q \gg 1$ trapped atomic ions 28, also referred to herein as physical qubits, as shown in FIG. 2A, with each qubit comprised of internal energy levels of each ion, labeled as $|\uparrow\rangle$ and $|\downarrow\rangle$, and separated by frequency $\omega_0$.

In the present description, the term "physical qubits" refers to individual ions in each ELU, to which quantum logic operations are applied individually in accordance with a scheduling mechanism 29 (depicted in FIG. 1) supported by the quantum algorithm 26. A group of physical qubits 28 may form a logical qubit (encoded logical qubit), and logical qubit operations are performed on logical qubits as will be detailed further herein.

Some physical qubits also may be used as communication qubits 34 (shown in FIG. 2B) serving for photonically coupling to a photonic interface for mapping the states of the communication qubits residing in distant ELUs onto the states of single photons which propagate along an optical fiber to be interfaced with distant ELUs.

In addition, the physical qubits may serve as "refrigerator" qubits 32 used to remove motional excitations between gates. Physical qubits also may serve as ancilla qubits which may be used to support the initial state preparation, as well as other logical operations, as needed.

The roles of the physical qubits, as well as grouping into logical qubits, in the overall computational process supported by the subject quantum computer architecture dynamically change as required by a computational problem to be solved in accordance with instructions issued by the CPU 24 in agreement with the algorithm 26.

As shown in FIG. 2A, the trapped atomic ion qubits 28 in the same ELU 12 are coupled through their collective motion. Laser fields produced by controllably shaped and timed laser pulses 30 impart qubit state-dependent forces on one or more ions, effecting entangling quantum gates 36 (shown in FIGS. 1 and 2A between the memory qubits 28 in the same ELU.

The qubit levels are assumed to be coupled through an atomic dipole operator $$\hat{\mu} = \mu(|\uparrow\rangle\langle\downarrow| + |\downarrow\rangle\langle\uparrow|). \tag{Eq. 1}$$

The ions interact through their external collective modes of quantum harmonic motion, and when entangled, i.e., realizing a quantum gate, can produce a photon. Such photons can be used to mediate entangling gates through application of qubit-state-dependent optical or microwave dipole forces.

There are a number of protocols existing for phonon-based gates between ions. The main points relevant to the size of the ELU and the larger architecture will be summarized in the following paragraphs.

An externally applied near-resonant running wave field 30 with amplitude $$E(\hat{x}) = E_0 e^{ik\hat{x}} \tag{Eq. 2}$$

and wavenumber k couples to the atomic dipole through the interaction Hamiltonian $\hat{H} = -\hat{\mu} E(\hat{x})$.

By suitably tuning the field near sidebands induced by the harmonic motion of the ions, a qubit state dependent force results. In this manner, qubits can be mapped onto phonon states and subsequently onto other qubits for entangling operations with characteristic speed $$R_{gate} = \eta \Omega, \tag{Eq. 3}$$

$$\text{where } \eta = \sqrt{\hbar k^2/(2m_0 N_q \omega)} \tag{Eq. 4}$$

is the Lamb Dicke parameter, $m_0$ is the mass of each ion, $\omega$ the frequency of harmonic oscillation of the collective phonon mode, and $$\Omega = \mu E_0 / 2\hbar \tag{Eq. 5}$$

is the Rabi frequency of the atomic dipole independent of motion.

For optical Raman transitions between qubit states (e.g., atomic hyperfine ground states), two fields are each detuned by $\Delta$ from an excited state of linewidth $\gamma \ll \Delta$, and when their difference frequency is near resonant with the qubit frequency splitting $\omega_0$, $$\Omega = (\mu E_0)^2 / (2\hbar^2 \Delta). \tag{Eq. 6}$$

is used instead the frequency in Eq. 5.

The typical gate speed $R_{gate}$ within an ELU therefore slows down with the number of qubits $N_q$ as $$R_{gate} \sim N_q^{-1/2} \tag{Eq. 7}$$

As the size of the ELU grows, so will the coupling between the modes of collective motion that could lead to crosstalk. However, through the use of pulse-shaping techniques, as will be detailed in the following paragraphs, the crosstalk errors need not be debilitating, although the effective speed of a gate will slow down with size $N_q$.

It is estimated that implementation of ELUs 12 with the $N_q$ ranging from 10 to 100 may be possible in the subject system.

Changes of the ions' motional states during the gate realization arising from sources like heating of the motional modes or fluctuating fields, may degrade the quality of the gates, leading to practical limits on the size of the ELU on which high performance gates can be realized.

It is likely that long chains of ions will require periodic "refrigerator" ions 32 (shown in FIGS. 2A-2B) to remove motional excitations between gates. Since cooling is a dissipative process, these "refrigerator" ions 32 may be chosen to be different isotope or species of ions and quench motional heating through sympathetic cooling.

More than one chain of the physical ions may be contemplated to be integrated into a single ELU 12 by employing ion shuttling through more complex ion trap structures. Such Extended ELUs (EELUs) consisting of $N_E$ ELU chains can contain a total of $N_q \times N_E = 20$-$1,000$ physical qubits. As an example only, and not in any way to limit the scope of the present inventive concept, as well as for the sake of simplicity of description, systems with one ELU per chip ($N_E = 1$) will be addressed herein. However, any number of ELUs per chip is contemplated in the present system.

Probabilistic Linking of ELUs

Figure 2B:
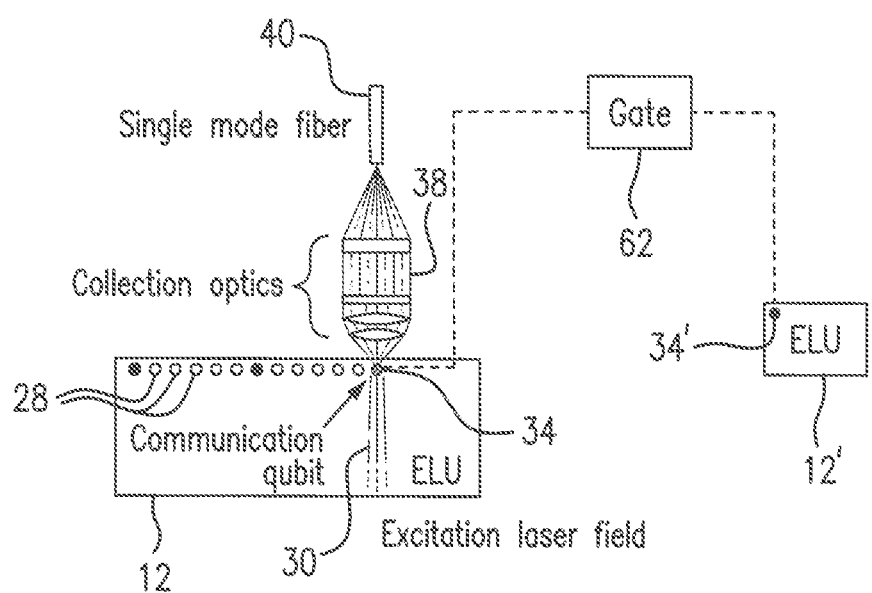

As presented in FIG. 2B, by properly manipulating two qubits (communication qubits) from a pair of distant ELUs (or EELUs) 12 and 12', respectively, the pair of communication qubits 34 and 34' can be entangled by each communication qubit 34 and 34' emitting photons that interfere with each other. Entanglement generated between the "communication qubits" 34 and 34' can be utilized as a resource to perform a two-qubit gate between any pair of qubits, one from each ELU 12 and 12', using local qubit gates, measurements, and classical communication between the ELUs.

In the scheme presented in FIG. 2B, the communication qubit 34 in the ELU 12 is driven to an excited state with fast laser pulses 30 whose duration $\tau_e \ll 1/\gamma$, so that no more than one photon is emitted from each qubit per excitation cycle following the atomic radiative selection rules. The communication qubit 34' is similarly driven to the excited state in the ELU 12' for realization of the gate 62 (also depicted in FIGS. 1, 2B, and 4A) between qubits 34 and 34' residing in different (distant) ELUs 12 and 12'.

One or more of the ions (communication qubits) 34, 34' are coupled to a photonic interface, where a classical laser pulse 30 maps the state of these communication qubits 34 and 34' onto the states of single photons (e.g., polarization or frequency), which then propagate through the collection optics 38 along an optical fiber 40 to be interfaced with other ELUs.

When the photons from two communication qubits are mode-matched and interfere on a 50/50 beam splitter 42 (shown in FIGS. 1, and 3A-3C), detectors 46 on the output ports 54 of the beam splitter can herald the creation of entanglement between the communication qubits in question.

The photon can be post-selected so that one of its status, also referred to herein as degrees of freedom (polarization, frequency, etc.) is entangled with the state of the communication qubit.

Two types of photonic connections are considered, characterized by the number of total photons used in the entanglement protocol between two communication qubits.

Figure 3A:
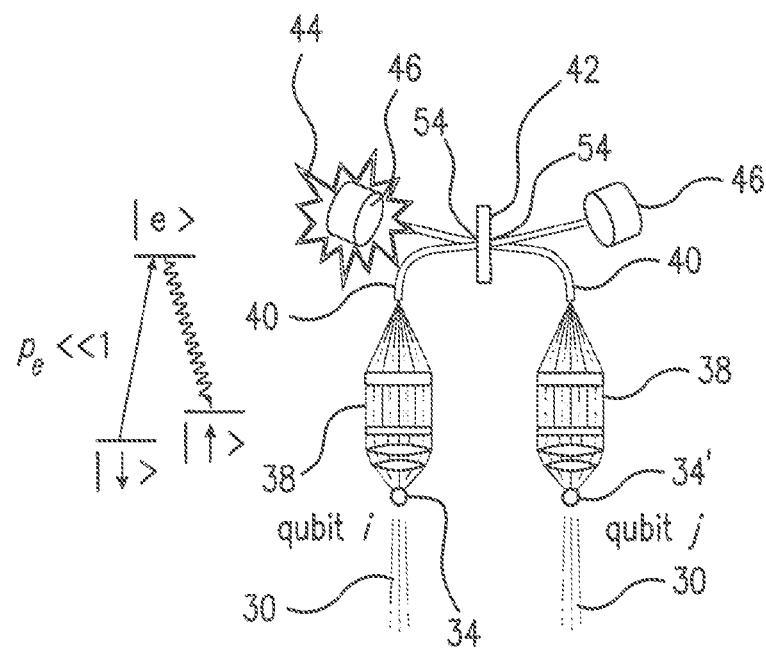
FIG. 3A is a schematic representation of Type I interference from photons emitted from two communication qubits.

FIG. 3A illustrates Type I interference between photons emitted from two communication qubits 34 and 34'. Each communication qubit 34 and 34' is weakly excited, so that a single photon emission has a very small probability yet is correlated with the final qubit state. The output photonic channels 40 are mode-matched with a 50/50 beam splitter 42, and a subsequent detection of a photon 44 at the detector 46 from either output port 54 of the beam splitter heralds the entanglement of the communication qubits 34 and 34'. The probability of two photons present in the system is much smaller than that of detecting a single photon.

In Type I connections, each communication qubit 34 or 34' (with an index i or j) is weakly excited with probability $p_e \ll 1$ and the state of the ion+photon qubit pair is approximately written (ignoring the higher-order excitation probabilities) as $$\sim \sqrt{1-p_e} |\downarrow\rangle_i |0\rangle_i + e^{ikx_i}\sqrt{p_e} |\uparrow\rangle_i |1\rangle_i \quad \text{(Eq. 8)}$$

where $|n\rangle_i$ denotes the state of n photons radiating from the communication qubit into an optical mode i, $x_i$ is the path length from the emitter i to a beam splitter 42, and k the optical wavenumber.

When two communication qubits (i and j) are excited in this way and the photons interfere at the beam splitter 42, the detection of a single photon 44 in either detector 46 placed at the two output ports 54 of the beam splitter 42 heralds the creation of the state $$[e^{ikx_j}|\downarrow\rangle_i|\uparrow\rangle_j \pm e^{ikx_i}|\uparrow\rangle_i|\downarrow\rangle_j]/\sqrt{2} \quad \text{(Eq. 9)}$$

with success probability $$p = p_e F \eta_D, \quad \text{(Eq. 10)}$$

where F is the fractional solid angle of emission collected, $\eta_D$ is the detection efficiency including any losses between the emitter and the detector, and the sign in this state is determined by which one of the two detectors 46 "fires".

Following the heralding of a single photon 44, the (small) probability of errors from double excitation and the detector "dark" counts are given respectively by $p_e^2$ and $R_{dark}/\gamma$, where $R_{dark}$ is the rate of the detector "dark" counts.

For Type I connections to be useful in quantum computing, the relative optical path length $x_i$-$x_j$ must be stable to a value greater than the optical wavelength $\sim 2\pi/k$.

Figure 3B:
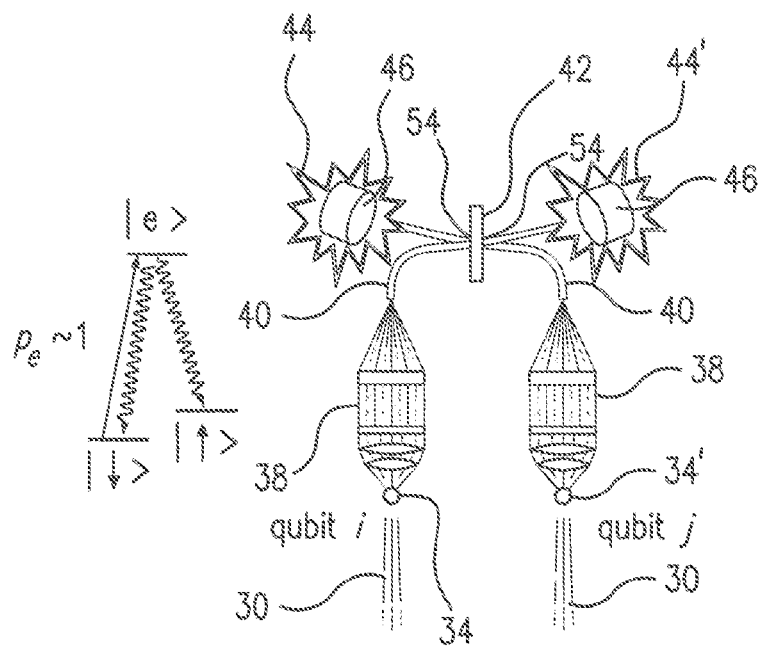
FIG. 3B is representative of Type II interference involving the emission of one photon from each communication qubit.
Figure 3C:
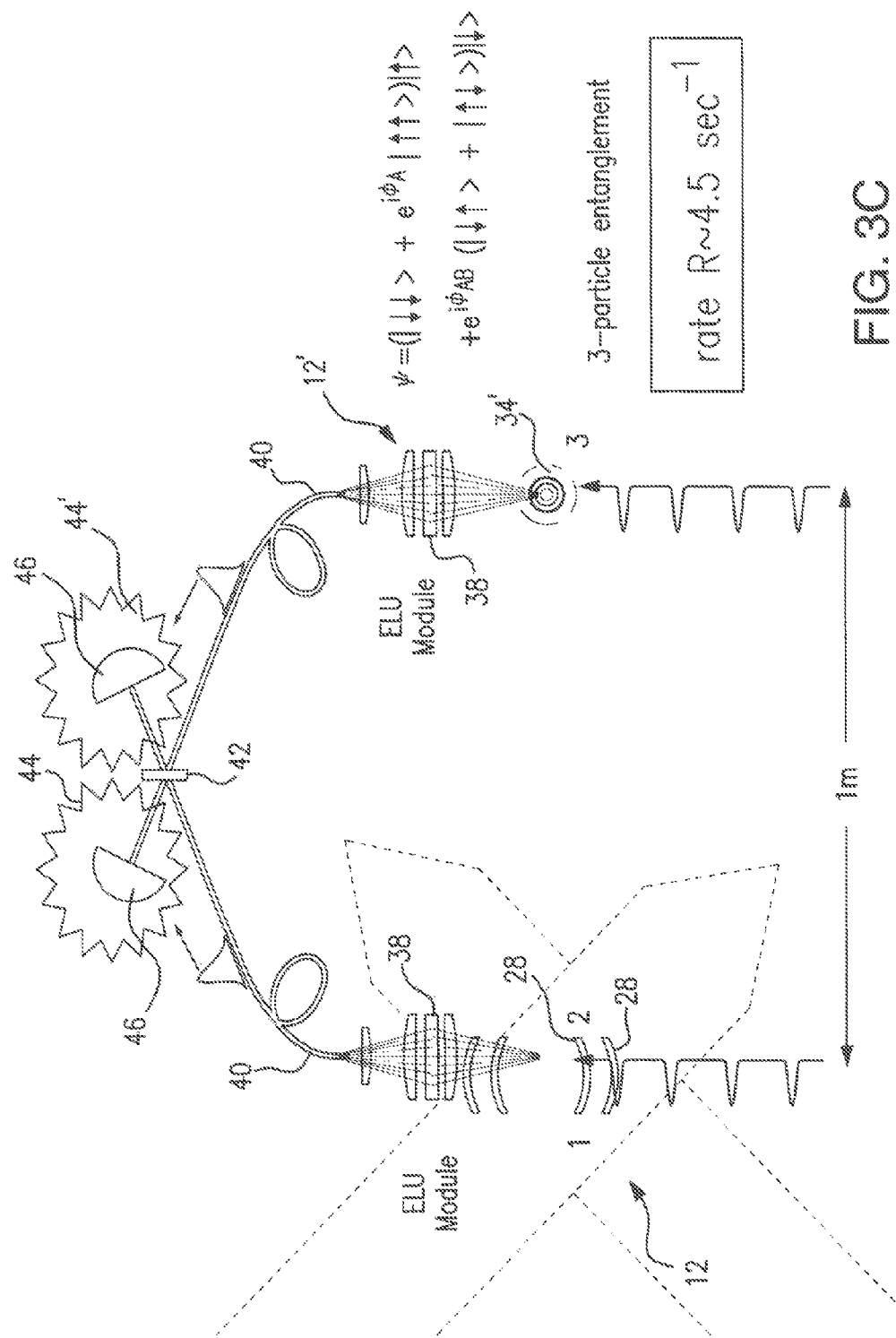
FIG. 3C is representative of 3-particle entanglement in the present systems.

Referring to FIG. 3B, Type II interference involves the emission of one photon 44 and 44' from each communication qubit 34 and 34' (i and j), respectively, where the internal state of the photon (e.g., its color) is correlated with the qubit state. After two photon interference at the beam splitter 42, the coincidence detection of photons 44 and 44' at the two detectors 46 heralds the entanglement of the communication qubits 34 and 34'.

For the Type II connections, each communication qubit (i and j) is excited with near unit probability $p_e \sim 1$, and the single photon 44 (or 44') carries its qubit through two distinguishable internal photonic states (e.g., polarization or optical frequency). For example, the state of the system containing both communication and photonic qubits is written as $$[e^{ik_\downarrow x_i}|\downarrow\rangle_i|v_\downarrow\rangle_i + e^{ik_\uparrow x_i}|\uparrow\rangle_i|v_\uparrow\rangle_i]/\sqrt{2} \quad \text{(Eq. 11)}$$

where $|v_\downarrow\rangle_i$ and $v_\uparrow\rangle_i$ denote the frequency qubit states of a single-photon emitted by the i-th communication qubit with wavenumbers $k_\downarrow$ and $k_\uparrow$ associated with optical frequencies $v_\uparrow$ and $v_\downarrow$ respectively.

Here, $$|v_\uparrow - v_\downarrow| = \omega_0 \gg \gamma \quad \text{(Eq. 12)}$$

so that these two frequency qubit states are distinguishable. The coincidence detection of photons 44 and 44' from two such communication qubits 34 and 34' (i and j) after interfering at the 50/50 beam splitter 42 provide the successful entanglement of the communication qubits, creating the state $$[e^{i(k_\downarrow x_i + k_\uparrow x_j)}|\downarrow\rangle_i|\uparrow\rangle_j - e^{i(k_\uparrow x_i + k_\downarrow x_j)}|\uparrow\rangle_i|\downarrow\rangle_j]/\sqrt{2} \quad \text{(eq. 13)}$$

with success probability $$p = (p_e F \eta_D)^2/\sqrt{2} \quad \text{(Eq. 14)}$$

Other schemes can also be used in the present system that scale similar to Type II connections. For example, the 3-particle entanglement illustrated in FIG. 3C, may be accomplished in the present quantum computation. In this scheme, two qubits 28 (one of which may be considered a communication qubit) in the ELU 12 are entangled to produce a photon 44 which further passes to the beam splitter 42 and interferes with a photon 44' produced by the excited communication qubit 34' in the ELU 12'.

The success probability of the 2-photon type II connection may be lower than that of the Type I connection when the light collection efficiency is low, but Type II connections are much less sensitive to optical path length fluctuations. The stability requirement of the relative path length $x_i$-$x_j$ is only at the level of the wavelength associated with the difference frequency $2\pi c/\omega_0$ of the photonic frequency qubit, which is typically at the centimeter scale for hyperfine-encoded communication qubits.

In both cases, the mean connection time is given by $$\tau_E = 1/(Rp) \quad \text{(Eq. 15)}$$

where R is the repetition rate of the initialization/excitation process and p is the success probability of generating the entanglement. For atomic transitions, $R \sim 0.1$ ($\gamma/2\pi$), and for typical free-space light collection ($F \sim 10^{-2}$) and taking $\eta_D \sim 0.2$, the mean connection time is found for the type I connection as $\tau_E \sim 5$ msec ($p_e = 0.05$).

For the Type II connection, $\tau_E \sim 250$ msec where it is assumed $\gamma/2\pi = 20$ MHz. Type II connections eventually outperform that of Type I connections with more efficient light collection, which can be accomplished by integrating optical elements with the ion trap structure without any fundamental loss in fidelity. Eventually, $\tau_E \sim 1$ msec should be possible in both types of connections.

The process to generate ion-ion entanglement using photon interference requires resonant excitation of the communication qubits, and steps must be taken to isolate the communication qubit from other memory qubits so that scattered light from the excitation laser 48 and the emitted photons do not disturb the spectator memory qubits.

It may be necessary to physically separate or shuttle the communication qubit away from the others, invoking some of the techniques from the QCCD approach. This crosstalk can also be eliminated by utilizing a different atomic species for the communication qubit so that the excitation and emitted light is sufficiently far from the memory qubit optical resonance to avoid causing decoherence. The communication qubits do not require excellent quantum memory characteristics, because once the entanglement is established between the communication qubits in different (distant) ELUs, they can immediately be swapped with neighboring memory qubits in each ELU.

Reconfigurable Connection Network in MUSIQC

The MUSIQC architecture 10 allows a large number $N_{ELU}$ of ELUs (or EELUs) 12 to be connected with each other using the photonic channels 16, as shown in FIG. 1. The connection is made through an optical crossconnect (OXC) switch 18 with $N_{ELU}$ input ports 50 and output ports 52. The photon 44 emitted from the communication qubit in each ELU is collected into a single-mode fiber 16 and directed to a corresponding input port 50 of the OXC switch 18.

OXC switches that support 200-1,100 ports utilizing micro-electromechanical systems (MEMS) technology have been described in the literature, for example, in Kim, J., et al., 1100×1100 port mems-based optical crossconnect with 4-db maximum loss. *IEEE Photon. Technol. Lett.* 15, 1537-1539 (2003). For the purposes of the present system the OXC switch should be capable of a full non-blocking connectivity with uniform optical path lengths. This optical network 14 provides fully reconfigurable interconnect network for the photonic qubits, allowing entanglement generation between any pair of ELUs 12 in the processor with up to $N_{ELU}/2$ with such operations running in parallel.

In practice, the photon detection can be accomplished in parallel with a conventional charge-coupled-device (CCD) imager or an array of photon-counting detectors, with pairs of regions on the CCD or the array elements associated with particular pairs of output ports from the fiber beam splitters 42, as shown in FIG. 1.

Up to $N_{ELU}/2$ Bell state detectors 46, each comprised of two fibers 54, 56 interfering on a beam splitter 42 and two detectors 58, 60, are connected to the respective output ports 52 of the OXC switch 18. The OXC switch 18 is capable of providing an optical path between any input fiber 16 to any output fiber 54, 56 that is not already connected to another input fiber.

Computation Model in MUSIQC

The subject MUSIQC architecture 10 follows the circuit model of computation within each ELU, but the probabilistic connection between ELUs is carried out by generation of entangled Bell pairs. In this fashion, the MUSIQC architecture may accommodate the cluster-state computation model. Thus, MUSIQC realizes a hybrid model of quantum computation, driven by the generation rate and burn (measurement) rate of entanglement between the ELUs.

In the circuit model of quantum computation, execution of two-qubit gates creates the entanglement necessary to exploit the power of quantum physics in computation. In an alternate model of the measurement-based cluster-state quantum computation, all entanglements are generated at the beginning of the computation, followed by conditional measurements of the qubits.

In the event that the generation rate of entangled Bell pairs between ELUs is lower than the burn (measurement) rate, each ELU would require the capacity to store enough initial entanglement so that the end of the computation can be reached at the given generation and burn rates of entanglement. The hybrid nature of MUSIQC provides a unique hardware platform with three distinct advantages: (1) fully reconfigurable connectivity to dynamically adjust the connectivity graph, (2) constant timescale to perform operations between distant qubits, and (3) moderate ELU size adequate for practical implementation.

The entanglement generation time may be further reduced in the subject system by time-division multiplexing (TDM) of the communication ports of the OXC switch at the expense of added qubits. Moreover, the temporal mismatch between the remote entanglement generation and local gates is reduced as the requirement of error correction increases the logical gate time.

For a complex quantum algorithm associated with a problem size of n bits, logical operations between spatially distant qubit pairs are necessary. In hardware architecture where only local gate operations are allowed (e.g., nearest neighbor gates), gate operations between two (logical) qubits separated by long distances can be implemented with resource overhead (number of qubits, parallel operations, and/or communication time) polynomial in the distance between qubits, $O(n^k)$. When a large number of parallel operations is available, one can employ entanglement swapping protocols to efficiently distribute entanglement with communication times scaling either poly-logarithmically, or independent of the communication distance.

This procedure requires extra qubits that are used to construct quantum buses for long-distance entanglement distribution, and the architecture adopting such buses was referred to as Quantum Logic Array (QLA).

A simple model has been constructed that provides a direct comparison between the QLA and MUSIQC architectures in terms of the resources required to execute.

The performance of the MUSIQC architecture has been studied under the assumption of large ELUs and low errors. This permits direct comparison of the subject results to previous studies on ion traps using the Steane code.

It was found that the performance of MUSIQC architecture is comparable to QLA (and its variations), with substantial advantage in required resources and feasibility for implementation.

In the simplified model presented herein, hardware is considered which is capable of implementing a Steane quantum error correction code to multiple levels of concatenation, and where all gate operations are performed following fault-tolerant procedures. The concatenated error-correction mechanism addresses the fault-tolerant procedures where logical qubits distributed across various ELUs are used to encode another logical qubit. In this case, the lowest-level logical qubits are treated as physical qubits with respect to higher-level logical qubits.

The simplified model addressed herein as an example is designed to estimate the execution time of the circuits in select exemplary architectures, and is not intended to provide the complete fault-tolerant analysis of the quantum circuit. For this model, it is required that the physical error levels are sufficiently low ($\sim 10^{-7}$) to produce the correct answer with order-unity probability using only up to three levels of concatenation of the Steane code.

It is also assumed that the quality of entangled pairs that are generated in MUSIQC architecture is high enough that error correction schemes can improve its fidelity sufficient to achieve fault-tolerance.

The hardware is based on trapped ion quantum computing with the assumptions for the timescales for quantum operation primitives summarized in Table 1. The details of fault-tolerant implementation of universal gate set utilized in this analysis will be presented in the following paragraphs.

Assumptions on the Timescales of Quantum Operation Primitives Used in the Model

TABLE I

| Quantum Primitive | Single-Qubit Gate | Two-Qubit Gate | Toffoli Gate | Qubit Measurement | Remote Entanglement Generation |
|---|---|---|---|---|---|
| Operation Time (µs) | 1 | 10 | 10 | 30 | 3000 |

Returning to FIG. 1, a fault-tolerance mechanism 135 is contemplated in the subject quantum computer, which is operatively coupled to the ELUs 12, as well as to the switch 18, and CPU 24, and the scheduling scheme 29 supported by the Quantum Algorithm 24. The fault-tolerance mechanism 135 in the subject system is implemented in several fashions, depending on the size of ELUs, ratios between the entanglement time between ELUs to survival coherence time of memory qubits, specific computation circuits required by the quantum algorithm, available resources (number of ELUs, number of qubits, number of interconnects, etc.), as well as other provisions of the system in question.

The fault tolerance mechanism may be implemented through the error-correction approach by the application of Steane Code as will be presented infra herein. Alternatively, the fault-tolerance mechanism can be implemented through construction of fault-tolerant multi-dimensional hypercells for dynamically linking the ELUs, and scheduling of the gates realization and measurements of qubit states with the result of 3D cluster states mapping, as will be detailed in the following paragraphs.

Universal Fault-Tolerant Quantum Computer Using Steane Code

The basic operational primitives of universal quantum computation using Steane code are presented in Jiang, L., et al., Distributed quantum computation based on small quantum registers. *Phys. Rev. A* 76, 062323 (2007); Ladd, T. D. et al., Quantum computers. *Nature* 464, 45 (2010); and Neeley, M., et al., Generation of three-qubit entangled states using superconducting phase qubits. *Nature* 467, 570-573 (2010).

The application of these concepts in the subject system is summarized in the following paragraphs:

1. The preparation of a logical qubit $|0\rangle_L$ is performed by measuring the six stabilizers of the code using four-qubit Schrodinger cat state, further referred to herein as "cat state", $|cat\rangle_4 \equiv (|0000\rangle + |1111\rangle)/\sqrt{2}$, a following the procedure that minimizes the use of ancilla qubits as outlined in DiVincenzo, D. P., et al., Effective fault-tolerant quantum computation with slow measurements. *Phys. Rev. Lett.* 98, 020501 (2007). The stabilizer measurement is performed up to three times to ensure that the error arising from the measurement process itself can be corrected.

A sequential measurement of the six stabilizers is performed through re-using the four ancilla qubits for each logical memory qubit, which reduces the number of physical qubits and parallel operations necessary for the state preparation at the expense of the execution time.

Once all the stabilizers are measured, a three-qubit cat state is used to measure the logical $Z_L$ operator to finalize the qubit initialization process. This procedure requires eleven physical qubits to complete preparation of logical qubit $|0\rangle_L$.

2. In the Steane code considered in the present system, all operators in the Pauli group $\{X_L, Y_L, Z_L\}$ and the Clifford group $\{H_L, S_L, CNOT_L\}$ can be performed transversally (i.e., in a bit-wise fashion). It is assumed that seven parallel operations are available, so that these logical operations can be executed in one time step corresponding to the single- or two-qubit operation. The transversal $CNOT_L$, considered is between two qubits that are close, so the operation can be performed locally (in a single ELU) without further need for qubit communication.

3. In order to construct effective arithmetic circuits, Toffoli gate (a.k.a. $CCNOT_L$) is needed which is not in the Clifford group.

Toffoli gate is a 3-qubit gate. If the first two qubits are in the same state, it applies to Pauli-X on the third qubit or else it does nothing. Since a transversal implementation of this gate is not possible in Steane code, fault-tolerant implementation requires preparation of a special three (logical) qubit state $$|\phi_+\rangle_L = \frac{1}{2}(|000\rangle_L + |010\rangle_L + |100\rangle_L + |111\rangle_L, \quad \text{(Eq. 16)}$$

and "teleport" the gate into this state.

Figure 4A:
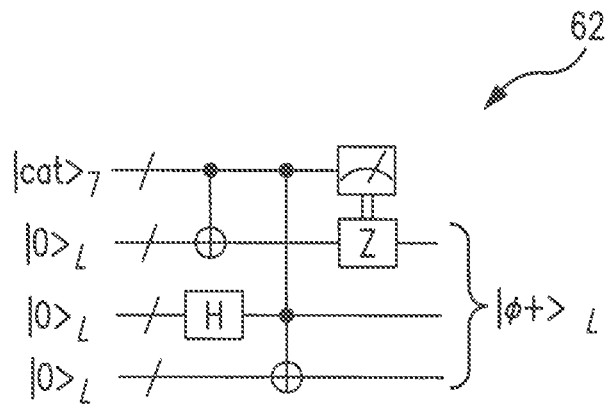
FIGS. 4A-4B represent circuit diagrams for realizing fault-tolerant Toffoli gate using Steane code, where

This state can be prepared by measuring its stabilizer operator using a 7-qubit cat state on three logical qubits $|0\rangle_L$, as shown in FIG. 4A representing a circuit diagram for realizing fault-tolerant Toffoli gate 62 using Steane code. The initial state $|\phi_+\rangle_L$ is prepared by measuring the $X_1$ and $CNOT_{12}$ of three qubit state $|0\rangle_1 (|0\rangle_2 + |1\rangle_2)|0\rangle_3/\sqrt{2}$. The Toffoli gate shown in FIG. 4A is a bit-wise Toffoli between the 7-qubit cat state and the two logical qubit states.

Figure 4B:
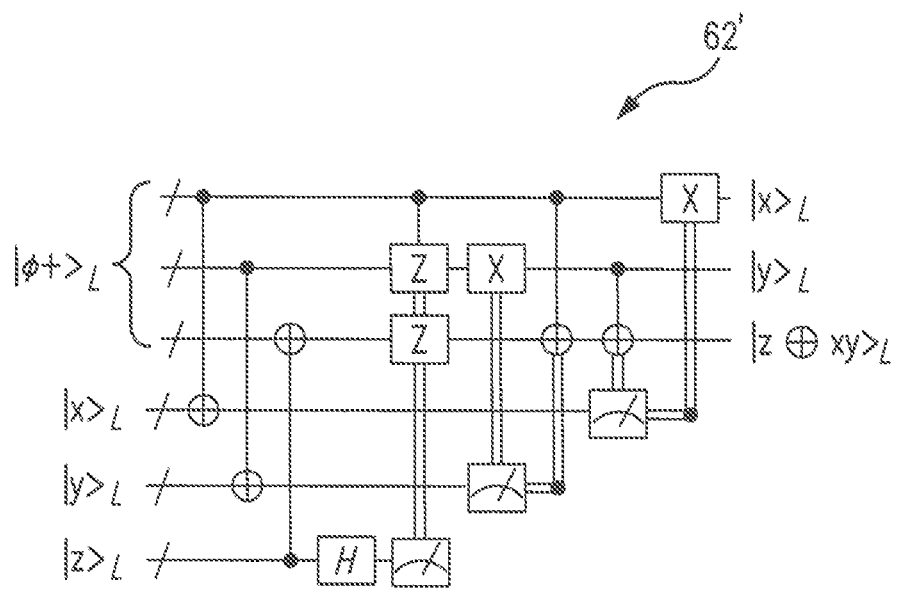

Successful preparation of this state requires a bit-wise Toffoli gate (at the physical level), which is assumed to only be performed locally among qubits that are close to one another. Once this state is prepared, the three qubits $|x\rangle_L, |y\rangle_L$ and $|z\rangle_L$ participating in the Toffoli gate can be teleported to execute the gate 62', as shown in FIG. 4B. Using the state prepared in FIG. 4A, Toffoli gate can be implemented using only one measurement, Clifford group gates and classical communication, all of which can be implemented fault-tolerantly in the Steane code.

A successful Toffoli gate operation requires 3 logical qubits (which in turn require extra ancilla qubits for the initialization) and 7 physical qubits as ancillary qubits, in addition to the three logical qubits on which the gate operates on.

4. When a CNOT gate is formed between two qubits that are separated by large distances, the approach is taken where each of the two qubits of a maximally-entangled state is distributed to the vicinity of the two qubits, and then the gate is teleported using the protocol described in Gottesman, D., et al., Demonstrating the viability of universal quantum computation using teleportation and single-qubit operations. *Nature* 402, 390-393 (1999). Efficient distribution of the entangled states makes this approach much more effective than where the qubits themselves are transported directly.

Construction of Efficient Arithmetic Circuits

The example quantum circuit which was analyzed is an adder circuit that computes the sum of two n-bit numbers. Simple adder circuits form the basis of more complex arithmetic circuits, such as the modular exponentiation circuit that dominates the execution time of Shor's factoring algorithm.

Quantum adder circuits can be constructed using X, CNOT and Toffoli gates. When only local interactions are available without dedicated buses for entanglement distribution, a quantum ripple-carry adder (QRCA) is the adequate adder of choice for which the execution time is O(n).

For QLA and MUSIQC architectures, one can implement quantum carry-lookahead adder (QCLA) that is capable of reducing the runtime to O(log n), at the expense of extra qubits and parallel operations. QCLA dramatically outperforms the QRCA for n above ~100 in terms of execution time.

Practical implementation of large-scale QCLAs are hindered by the requirement of executing Toffoli gates among qubits that are separated by large distances within the quantum computer. MUSIQC architecture flattens the communication cost between qubits in different ELUs, providing a suitable platform for implementing QCLAs.

Alternatively, QLA architecture can also efficiently execute QCLAs using dedicated communication bus that reduces the connection time between two qubits (defined as the time it takes to generate entangled qubit pairs that can be used to teleport one of the qubits or the gate itself) to increase only as a logarithmic function of the separation between them.

MUSIQC Implementation

In order to implement the QCLA circuit in MUSIQC architecture, each ELU should be large enough to accommodate the generation of the $|\phi_+\rangle_L$ state shown in FIG. 4A. This requires a minimum of 3 logical qubits and a 7-qubit cat state, and sufficient ancilla qubits to support the state preparation. The qubit resource requirements are balanced with computation time by requiring four ancilla qubits per logical qubit, so that the 4-qubit cat states necessary for the stabilizer measurement can be created in parallel.

Implementation of each Toffoli gate is realized by allocating a fresh ELU and preparing the $|\phi_+\rangle_L$ state, then teleporting the three qubits from other ELUs into this state. Once the gate is performed, the original logical qubits from the other ELUs are freed up and become available for another Toffoli gate. It has been found that 6n logical qubits placed on 6n/4=1.5n ELUs are sufficient to compute the sum of two n-bit integers using the QCLA circuit at the first concatenation level of Steane code encoding.

Teleportation of qubits into the ELU containing the prepared $|\phi_+\rangle_L$ state requires generation of entangled states via photon interference. In order to minimize the entanglement generation time, at least three optical ports are provided to connect to these ELUs in parallel. In order to successfully teleport the gate, seven entangled pairs need to be created to each ELU holding the input qubits.

The entanglement generation time can be reduced by running multiple optical ports to other ELUs in parallel (this is called the port multiplexity $m_p$), as will be presented in detail in the following paragraphs.

In a typical entanglement generation procedure, the ion is prepared in an initial state, and then excited using a short pulse laser (~5 ps). The ion emits a photon over a spontaneous emission lifetime (~10 ns), and the photon detection process will determine whether the entanglement generation from a pair of such ions is successful.

If the entanglement generation is successful, the pair is ready for use in the computation. If entanglement is not successful, the ions will be re-initialized (~1 μs) and the process is repeated. Since the initialization time of the ion is ~100 times longer than the time a photon is propagating in the optical port, multiple ions can be used per optical port and "pipeline" the photon emission process.

In this time-division-multiplex (TDM) scheme, another ion is brought into the optical port to make another entanglement generation attempt while the initialization process is proceeding for the unsuccessful ion. This process can be repeated $m_T$ times using as many extra ions, before the first ion can be brought back ($m_T$ is called the TDM multiplexity). Using the port and TDM multiplexity, the entanglement generation time can be reduced by a factor of $m_p m_T$.

In this example, multiplexities $m_p=2$ and $m_T=10$ are assumed that require 100 physical qubits including (4×7=28) logical qubits, +(3×4=12) ancilla qubits, and (3×2×10=60) communication qubits, and 12 parallel operations per ELU as shown in FIG. 5A. This choice adequately speeds up the communication time between ELUs to balance out other operation times in the hardware. Each ELU in MUSIQC is made up of 6 communication ports 64 (FIG. 1) where 60 communication qubits are used to increase the bandwidth of the remote entanglement generation.

Multiple ELUs 12 are connected by the optical switch 18 to complete the MUSIQC hardware, as shown in FIG. 1. With these resources, an efficient implementation of QCLA circuit can be realized by executing all necessary logic gates in parallel. Under these circumstances, the depth of the n-bit in-place adder circuit is given by $$\lfloor \log_2 n \rfloor + \lfloor \log_2(n-1) \rfloor + \left\lfloor \log_2 \frac{n}{3} \right\rfloor + \left\lfloor \log_2 \frac{n-1}{3} \right\rfloor + 14 \quad \text{(Eq. 17)}$$

for sufficiently large n (n>6) where $\lfloor x \rfloor$ denotes the largest integer not greater than x, where two time steps contain X gates, four contain CNOT gates, and the rest contain Toffoli gates which dominate the execution time of the circuit. An error correction step is performed on all qubits after each time step, by measuring all stabilizers of the Steane code and making necessary corrections based on the measurement outcome.

Once the basic operational primitives (gates, qubit measurements, remake entanglement generation) outlined in the previous paragraph are modeled at the first level of code concatenation, all of these primitives can be constructed at the second level of concatenation using the primitives at the first level. The primitives can be recursively constructed at higher levels of code concatenation. Since the cost of remote CNOT gates between ELUs are independent of the distance between them, recursive estimation of circuit execution at higher levels of code concatenation is straightforward on MUSIQC hardware.

QLA Implementation

A concrete layout of a QLA device optimized for n-bit adder with one level of Steane encoding is formed, which can be used to construct circuits at higher levels of code concatenation. In order to implement the fault-tolerant Toffoli gate described in FIG. 4A-4B, four logical qubits are assembled into a single unit, as is done for the ELUs in the MUSIQC architecture.

In the QLA implementation, a Logic Unit (LU) 66 shown in FIG. 5B includes a square of 49 (7×7) qubits, where a block of 12 (3×4) qubits forms a logical qubit with 7 physical qubits and 5 ancilla qubits. Similar to the MUSIQC example, 6n logical qubits placed on 1.5n LUs are necessary for performing the adding of two n bit numbers.

As shown in FIG. 5C, six LUs 66 are arranged into a logical block (LB) 68, capable of adding two 4 bit numbers. Each LU 66 in the LB 68 is surrounded by eight blocks of 7×7 communication units 70 dedicated for distributing entanglement using the quantum repeater protocol.

It is assumed that the communication of the qubits within each LU 66 is "free". The time it takes for such communication is not considered. This simplified assumption is justified as the communication time between LUs utilizing the qubits in the communication units dominate the computation time, and therefore does not change the qualitative conclusion of this estimate.

Similar to the MUSIQC hardware example, a Toffoli gate execution involves the preparation of the $|\phi_+\rangle_L$ state in an "empty" LU, then teleporting three qubits onto this LU to complete the gate operation. The execution time of the Toffoli gate therefore is comprised of (1) the time it takes to prepare the $|\phi_+\rangle_L$ state, (2) the time it takes to distribute entanglement between adequate pairs of LUs, and then (3) utilizing the distributed entanglement to teleport the gate operation. Among these, the distribution time for the entanglement is a function of the distance between the two LUs involved, while the other two LUs are independent of the distance.

The Quantum Carry-Lookahead Adder (QCLA) Logic Block circuit 68 shown in FIG. 5C involves various stages of Toffoli gates characterized by the "distance" between qubits that is described as $2^t$, where $1 \leq t \leq \lfloor \log_2 n \rfloor$.

In a 2D layout, as considered in FIG. 5C, the linear distance between these two qubits is presented as $2^{t/2}$, in units of the number of communication units 70 that the entanglement must be generated over.

A more careful analysis shows that the linear distance is approximately given by $d(t) \approx 3 \cdot 2^{t/2} + 1$ when t is even, and $d(t) \approx 2^{(t+1)/2} + 1$ when t is odd.

Since each communication unit has 7 qubits along a length, the actual teleportation distance is $L(t) = 7d(t)$ in units of the length of ion chain. The nested entanglement swapping protocol can create entanglement between the two end ions in $\lfloor \log_2 L(t) \rfloor$ time steps, where each time step consists of one CNOT gate, two single qubit gates, and one qubit measurement process. Using the expression for d(t), $\log_2 L(t) \approx t/2 + 4$ is approximate for both even and odd t, without loss of accuracy.

Unlike the case of MUSIQC, the entanglement generation time is now dependent on the distance between the qubits (although only in a logarithmic way), and the resulting time steps needed for entanglement distribution within the QCLA 70 is (approximately) given by $$\lfloor \log_2 n \rfloor (\lfloor \log_2 n \rfloor + 17)/4 + \lfloor \log_2(n-1) \rfloor (\lfloor \log_2(n-1) \rfloor + 17)/4 + \quad \text{Eq. 18}$$
$$\left\lfloor \log_2 \frac{n}{3} \right\rfloor \left( \left\lfloor \log_2 \frac{n}{3} \right\rfloor + 17 \right)/4 + \left\lfloor \log_2 \frac{n-1}{3} \right\rfloor \left( \left\lfloor \log_2 \frac{n-1}{3} \right\rfloor + 17 \right)/4$$

It should be noted that in order to achieve this logarithmic time, one has to have the ability to perform two qubit gates between every pair of qubits in the entire communication unit 70 in parallel. The addition of two n qubit numbers requires n/4 LBs 68. Since each LB 68 has 18 communication units, there are a total of 7×7×18=882 communication qubits in the LB.

The number of parallel operations necessary is therefore 441 simultaneous CNOT operations per LB, or 441n/4≈110n parallel operations for n-bit QCLA. The number of X, CNOT and Toffoli gates that have to be performed remains identical to the MUSIQC case since an identical circuit is executed. The error correction is performed after every logic gate. The entanglement distribution process has a high enough fidelity so that no further distillation process is necessary.

Similar to the MUSIQC design, basic operational primitives can be generated at higher levels of code concatenation in the QLA model. Unlike the first encoding level, communication channels for the second level of code concatenation do not have to be explicitly provided if the quality of the distributed entanglement is sufficiently high so that neither entanglement purification (Dür, W., et al., Quantum repeaters based on entanglement purification. *Phys. Rev. A* 59, 169-181 (1999)) nor error correction of the entangled pairs (Jiang, L. et al. Quantum repeater with encoding. *Phys. Rev. A* 79, 032325 (2009)) is needed. This type of "inter-level optimization" can be justified since the remote interaction between two logical qubits at second level of code concatenation occurs rarely, and the communication units at the first level can be used to accommodate this communication at higher level without significant time overhead.

If dedicated communication qubits were additionally provided, these qubits might remain idle most of the time leading to inefficient use of the qubit resources. The number of physical qubits therefore scales much more favorably at higher levels of code concatenation than in the first level of the QLA architecture. The distance-dependent gate operation at higher levels of code concatenation is somewhat difficult to predict accurately, but the logarithmic scaling of communication time permits effective estimation of the gate operation time with only small errors.

Results and Comparison

Figure 6A:
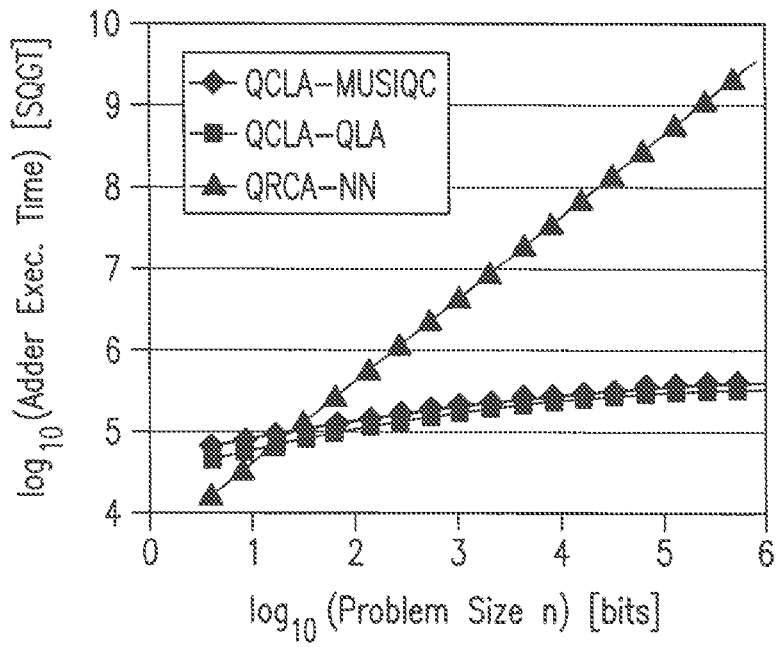
FIG. 6A is a diagram representative of execution time comparison of quantum ripple-carry (QRCA) adder on a nearest-neighbor architecture, and quantum carry-look-ahead (QCLA) adder on quantum logic array (QLA) and MUSIQC architectures as a function of the problem size n.
Figure 6B:
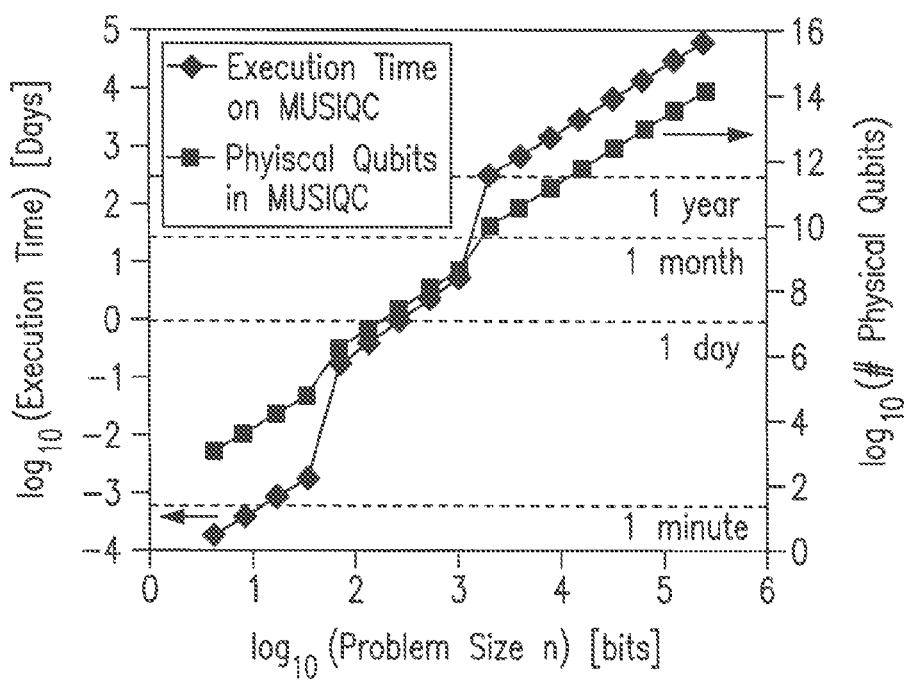
FIG. 6B is a diagram of the execution time and number of required physical qubits of running full-tolerant modular exponentiation circuit, representative of executing the Shor algorithm.

The resource requirements and performance of the QCLA circuit on MUSIQC and QLA architecture, as well as the QRCA circuit on a nearest neighbor (NN) quantum hardware, where multi-qubit gates can only operate on qubits positioned adjacent one to another are summarized in FIGS. 6A-6B and Table II.

Summary of the Resource Estimation and Execution Times of Various Adders in MUSIQC and QLA Architecture.

TABLE II

| Performance Metrics | QCLA on MUSIQC | QCLA on QLA | QRCA on NN |
|---|---|---|---|
| Physical Qubits | 150n | 1,176n | 20(n + 1) |
| # Parallel Operations | 18n | 110n | 8n + 43 |
| Logical Toffoli (μs) | 3,250 | 2,327[a] | 2,159 |
| 128-bit addition | 0.16 s | 0.13 s | 0.56 s |
| 1,024-bit addition | 0.22 s | 0.18 s | 4.5 s |
| 16,384-bit addition | 0.29 s | 0.25 s | 72 s |

Shown in FIG. 6A, is the execution time comparison of quantum ripple-carry adder (QRCA) on a nearest-neighbor architecture, and quantum carry-lookahead adder (QCLA) on QLA and MUSIQC architectures, respectively, as a function of the problem size n. All three circuits considered are implemented fault-tolerantly, using one level of Steane code. The execution time is measured in units of single qubit gate time (SQGT), assumed to be 1 μsec in the present model.

Shown in FIG. 6B is the execution time and a number of required physical qubits of running fault-tolerant modular exponentiation circuit, representative of executing the Shor algorithm.

Although the QLA architecture considered in this example is also a NN (nearest neighbor) hardware, presence of the dedicated communication units (quantum bus) allows remote gate operation with an execution time that depends only logarithmically on the distance between qubits, enabling fast execution of the QCLA.

The cost in resources, however, is significant: realization of efficient communication channels requires ~3 times as many physical qubits as used for storing and manipulating the qubits in the first level of encoding, and requires a large number of parallel operations as well as the necessary control hardware to run them. The execution time can be fast compared to the MUSIQC architecture, which is hampered by the probabilistic nature of the photonic network in establishing the entanglement.

Substantial resources in MUSIQC are dedicated to speed up the entanglement generation time as described in the previous paragraphs. Although MUSIQC architecture takes ~15-30% more time to execute the adder circuit, the resources it requires to operate the same task is only about 13% of that required in the QLA architecture. In both cases, the importance of moving qubits between different parts of a large quantum computer is noted. The speed advantage in adder circuits translate directly to faster execution of the Shor algorithm. Thus, QCLA is adapted for further analysis.

Once the execution time and resource requirements are identified for the adder circuit, the analyses provided in Van Meter, R., et al. Fast quantum modular exponentiation. *Phys. Rev. A* 71, 052320 (2005), can be adopted to estimate the performance metrics of running the Shor algorithm. The execution time and total number of physical qubits necessary to run the Shor algorithm depends strongly on the level of code concatenation required to successfully obtain the correct answer.

The number of logical qubits (Q) and the total number of logic gate operations (K) required to complete the Shor algorithm of a given size is first estimated, to obtain the product KQ. In order to obtain correct results with a probability of order unity, the individual error rate corresponding to one logic gate operation must be on the order of 1/KQ. From this consideration, the level of code concatenation to be used is determined.

Table III summarizes the comparison on the number of physical qubits and the execution time of running the Shor algorithm on MUSIQC and QLA architectures for factoring 32, 512 and 4,096 bit numbers.

Estimated Execution Time and Physical Qubits Necessary to Complete Shor Algorithm of a Given Size. The Numbers on Top (Bottom) Correspond to MUSIQC (QLA) Architecture.

TABLE III

| | | Performance Metrics | | |
| --- | --- | --- | --- | --- |
| Code Level | | n = 32<br>1 | n = 512<br>2 | n = 4,096<br>3 |
| # Physical Qubits | MUSIQC | $4.7 \times 10^4$ | $9.2 \times 10^7$ | $4.1 \times 10^{10}$ |
| | QLA | $3.7 \times 10^5$ | $7.2 \times 10^8$ | $3.2 \times 10^{11}$ |
| Execution Time | MUSIQC | 2.5 min | 2.1 days | 650 days |
| | QLA | 2.2 min | 1.5 days | 520 days |

Shown in FIG. 6B, is the execution time (in days) and the total number of necessary physical qubits for completing the modular exponentiation circuit on a MUSIQC hardware, which is a good representation of running the Shor algorithm. The discrete jumps in the resource estimate correspond to addition of another level of code concatenation, necessary for maintaining the error rates low enough to obtain a correct result as the problem size increases. Using 2 levels of concatenated Steane code it is expected to factor a 128-bit integer in less than 10 hours, with less than $6 \times 10^6$ physical qubits in the MUSIQC system. The execution time on QLA architecture is comparable to that on MUSIQC architecture (within 20%), but the number of required physical qubits is higher by about a factor of 10.

Furthermore, the total size of the single ELU necessary to implement the QLA architecture grows quickly (over $4.5 \times 10^7$ physical qubits for a machine that can factor a 128-bit number), while the ELU size in MUSIQC architecture is fixed at moderate numbers (≈58,000 ELUs with 100 qubits per ELU). Therefore, the MUSIQC architecture substantially lowers the practical technological barrier in integration levels necessary for a large-scale quantum computer.

Fault Tolerance of Probabilistic Photonic Gates

As presented in previous paragraphs, the MUSIQC architecture can be used to perform algorithms in the limit of large ELUs and low errors using Steane code. The fundamental question arises: The analysis of how slow can the creation of entanglement be to still allow for fault-tolerance given a finite coherence time is presented in the following paragraphs. In this context, it is adequate to consider a MUSIQC system where a plurality of small ELUs are connected through the photonic network. The demonstration of fault tolerant circuit construction on MUSIQC architecture, rather than quantitative analysis of the resource overhead for these schemes, is detailed in further paragraphs.

Naïvely, it would appear that the average entanglement creation time $\tau_E$ must be much smaller than the decoherence time scale $\tau_D$ to achieve fault tolerance. But that scalable fault-tolerant quantum computation is found to be possible for any ratio $\tau_E/\tau_D$, even in the presence of additional gate errors. While large values of $\tau_E/\tau_D$ would lead to impractical levels of overhead in qubits and time (similar to the case of conventional quantum fault tolerance near threshold error levels), this result is still remarkable and indicates that fault tolerance is always possible in the MUSIQC architecture. A complete description of the strategies used to secure fault tolerance in MUSIQC architecture in this limit is presented in the following paragraphs.

Analysis of Fault-Tolerance for Fast Entangling Gates

First, the case is considered where $\tau_E/\tau_D \ll 1$, where fault tolerant coding is more practical. When each ELU is large enough to accommodate several logical qubits encoded with a conventional error correcting code, full fault-tolerant procedure within an ELU can be supplemental as in the example presented in the previous paragraphs.

Opposingly, when the ELUs are too small to fit a logical qubit, fault-tolerance can be achieved by mapping to three-dimensional (3D) cluster states, one approach for supporting fault-tolerant universal quantum computation presented in Raussendorf, R., et al. A fault-tolerant one-way quantum computer. *Ann. Phys.* 321, 2242 (2006). This type of encoding is well-matched to the MUSIQC architecture, because the small degree of their interaction graph leads to small ELUs.

Scheduling.

Figure 7A:
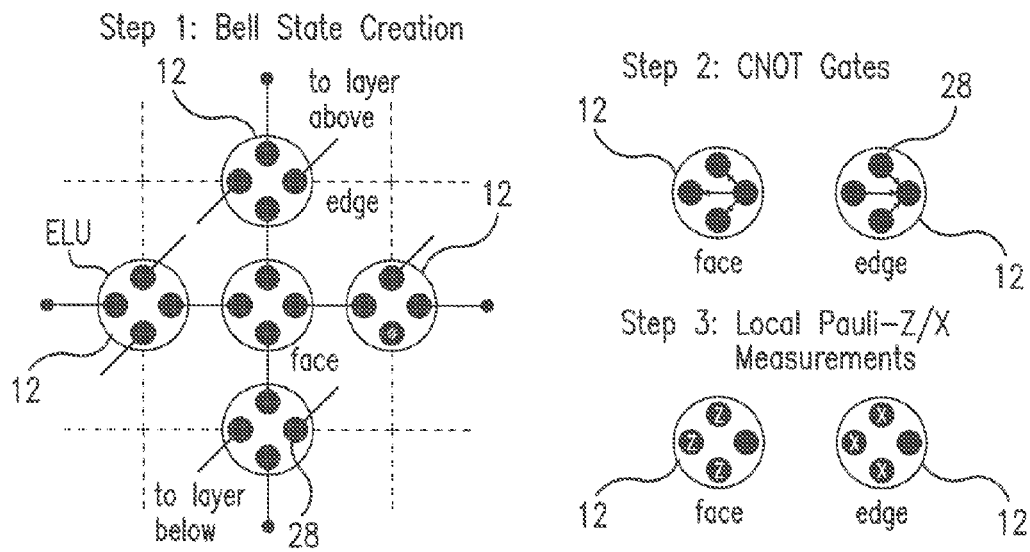
FIG. 7A is a diagram representative of three steps of creating a 3-dimensional (3-D) cluster state in the MUSIQC architecture for fast entangling gates.

For $\tau_E \ll \tau_D$, the 3D cluster state with qubits on the faces and edges of a three-dimensional lattice can be created using the procedure presented in FIG. 7A. The procedure consists of three basic steps: (1) Creation of Bell states between different ELUs (all in parallel) via the photonic link, (2) CNOT-gates (head of arrow is a target qubit; tail of arrow is a control qubit) within each ELU, and (3) local measurement of three out of four qubits in each ELU.

If the ELU represents a face (edge) qubit in the underlying lattice, the measurements are in the Z- (X-) basis. As can be easily shown using standard stabilizer arguments, the resulting state is a 3D cluster state, up to local Hadamard gates on the edge qubits.

The operations can be scheduled such that (a) qubits are never idle, and (b) no qubit is acted upon by multiple gates (even commuting ones) at the same time. The latter is required in some situations for realizing quantum gates with ion qubits.

Figure 7B:
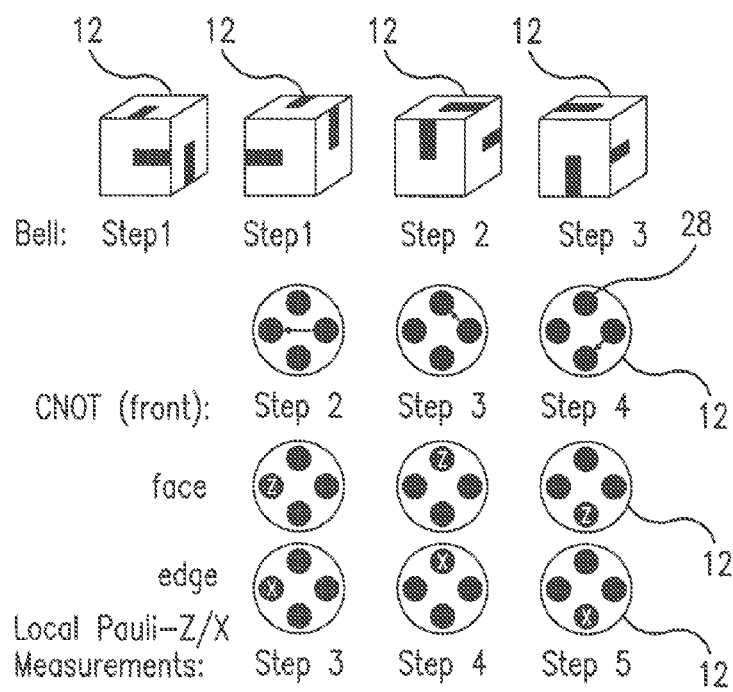
FIG. 7B is a diagram representative of the schedule for the creation of a 3-D cluster state in the MUSIQC architecture.

To this end, the schedule presented in Raussendorf, R., Harrington, J. & Goyal, K. A fault-tolerant one-way quantum computer. *Ann. Phys.* 321, 2242 (2006) for the 3D cluster state generation is adapted to the MUSIQC architecture, and the three-step sequence shown in FIG. 7A is expanded into the five-step sequence shown in FIG. 7B illustrating the schedule for the creation of a 3D cluster state in the MUSIQC architecture. The upper line represents the schedule for Bell pair production between ELUs representing face and edge qubits. The lower line represents the schedule for the CNOT gates within the ELUs corresponding to the front faces of the lattice cell. Schedules for the ELUs on other faces and on edges are similar.

As presented in Steps 1-3 in FIG. 7B, the Bell pairs across the ELUs are created. Further, in Steps 2-4 the CNOTs within each ELU are performed, and in Steps 3-5, three qubits in each ELU are measured. The sequence of operations is such that each of the three ancilla qubits in every ELU lives for only through three time steps: initialization (to half of a Bell pair), CNOT gates, and measurement. No qubit is ever idle in this protocol.

The local measurement of the 3D cluster state remains to complete the computation. All remaining measurements are performed in Step 5 of the procedure detailed in previous paragraphs. This works trivially for cluster qubits intended for topological error correction or the implementation of topologically protected encoded Clifford gates, since these measurements require no adjustment of the measurement basis.

To avoid delay in the measurement of qubits for the implementation of non-Clifford gates, it is necessary to break the 3D cluster states into overlapping slabs of bounded thickness.

Fault-Tolerance Threshold.

The following error models are considered.

(1) Every gate operation, i.e. preparation and measurement of individual qubits, gates within an ELU, and Bell pair creation between different ELUs, can all be achieved within a clock cycle of duration T. An erroneous one-qubit (two-qubit) gate is modeled by the perfect gate followed by a partially depolarizing one-qubit (two qubit) channel. In the one-qubit channel, X, Y, and Z errors each occur with probability $\epsilon/3$. In the two-qubit channel, each of the 15 possible errors $X_1, X_2, X_1X_2, \ldots, Z_1Z_2$ occurs with a probability of $\epsilon/15$. All gates have the same error $\epsilon$; and (2) In addition, the effect of decoherence per time step T is described by local probabilistic Pauli errors X, Y, Z, each happen with a probability $T/3\tau_D$.

Figure 8A:
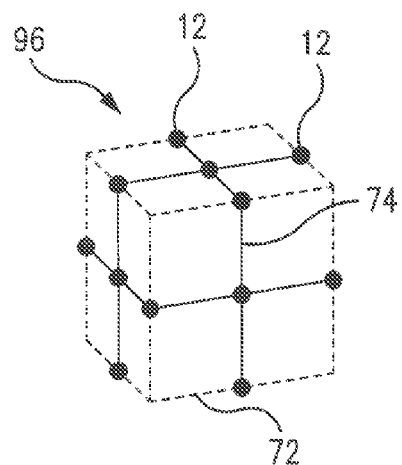
FIG. 8A is a schematic representation of a lattice cell of a 3-dimensional 4-valent cluster state.

A criterion for the error threshold of measurement-based quantum computation with cluster states that has been established numerically for a variety of error models is $$\langle K_{\partial q} \rangle (\{\text{error parameters}\}) = 0.70 \quad \text{(Eq. 19)}$$

where, $K_{\partial q}$ is a cluster state stabilizer operator associated with the boundary of a single volume q, consisting of six faces. Let f be a face of the three-dimensional cluster, and $$K_f = \sigma_x^{(f)} \otimes_{e \in \partial f} \sigma_z^{(e)} \quad \text{(Eq. 20)}$$

as shown in FIG. 8A. Then, $$K_{\partial q} = \Pi_{f \in \partial q} K_f = \otimes_{f \in \partial q} \sigma_x^{(f)} \quad \text{(Eq. 20)}$$

Furthermore, for the above criterion to apply, all errors (for preparation of local states, local and entangling unitaries, and measurement) are propagated forward or backward in time, to solely affect the 3D cluster state.

In FIG. 8A, a Hypercell construction II is shown as a Lattice cell of a three-dimensional four-valent cluster state. The dashed lines 72 represent the edges of the elementary cell and the solid lines 74 represent the edges of the connectivity graph. The three-dimensional cluster state is obtained by repeating this elementary cell in all three spatial directions.

The criterion in question applies for a phenomenological error-model with local memory error and measurement error (the threshold error probability per memory step and measurement is 2.9% (Wang, C., et al., Confinement-higgs transition in a disordered gauge theory and the accuracy threshold for quantum memory. *Ann. Phys.* 303, 31 (2003)), for a gate-based error model (the threshold error probability per gate is 0.67% (Raussendorf, R., et al., A fault-tolerant one-way quantum computer. *Ann. Phys.* 321, 2242 (2006)), and further error models with only low-order correlated error.

Specifically, the criterion (2), i.e., the effect of decoherence, has numerically been tested for cluster state creation procedures with varying relative strength of local vs 2-local gate error with excellent agreement. In all cases, the error-correction was performed using Edmonds' perfect matching algorithm.

The detailed procedure for calculating the error probability of the stabilizer measurement process for the 3D cluster state is presented in further paragraphs.

Error Probability for 3D Cluster States with Fast Entangling Gates

The total error probability of the stabilizer measurement process for the above-presented model is calculated with the assumption of independent strengths for the local errors and 2-local gate errors, where local errors with strength $T/\tau_D$, and 2-local gate errors with strength $\epsilon$ and considered.

The expectation value of the stabilizer operator $K_{\partial q}$ in Eq. (19) is $$\langle K \partial q \rangle = \prod_{E \in \text{error sources}} 1 - 2p_E, \quad \text{(Eq. 22)}$$

where $p_E$ is the total probability of those Pauli errors in the error source E which, after (forward) propagation to the endpoint of the cluster state creation procedure, anti-commute with the stabilizer operator $K_{\partial g}$. The right-hand-side of Eq. (22) is simply a product due to the statistical independence of the individual error sources. Since the cluster state creation procedure is of bounded temporal depth and built of local and nearest-neighbor gates only, errors can only propagate a finite distance. Therefore, only a finite number of error sources contribute in Eq. (22).

To simplify calculations, the following observations are considered:

(a) A Bell state preparation, 2 CNOT gates (one on either side) of the cluster, and two local measurements on the qubits of the former Bell pair (one in the Z- and one in the X basis) amount to a CNOT gate between remaining participating qubits. Therein, the qubit on the edge of the underlying lattice is the target, the qubit on the face of the lattice is the control qubit. This is called a teleported CNOT link;

(b) Errors can only propagate once from a face qubit to an edge qubit or vice versa, but never farther. To see this, consider, e.g., a face qubit. There, an X- or Y-error can be propagated (face=control of CNOTs). In either case it causes an X-error on a neighboring edge qubit. But X-errors are not propagated from edge-qubits (edge=target of all CNOTs); and (c) The stabilizer $K_{\partial q}$ has only a support on face qubits, and is not affected by X-errors.

Based on these observations, the error sources affecting $\langle K_{\partial q} \rangle$ are subdivided into three categories, namely:

Type-1: First Bell pair created on each face (according to the 5-step schedule presented in FIG. 7B);

Type-2: The CNOT links, consuming the remaining Bell pairs; and

Type-3: The final measurements of the cluster qubits (1 per ELU).

Type-2 Contributions:

For every CNOT link it is only necessary to count Z-errors (and Y≅Z) on both the control (=face) and target (=edge), because on the face qubit the Z-errors are the ones that are important [with the observation (c)], and on the edge qubit, such errors may still propagate to a neighboring face qubit [with the observation (b)] and are of importance.

With these simplifications, the effective error of each CNOT link between two neighboring ELUs is described by the probabilities $p_{ZI}$ for a Z-error on the face qubit, $p_{IZ}$ for a Z-error on the edge qubit, and $p_{ZZ}$ for the combined error; and $$p_{ZI} = 2\epsilon + \frac{10}{3}\frac{T}{\tau_D}, \; p_{IZ} = p_{ZZ} = \frac{4}{15}\epsilon + \frac{2}{3}\frac{T}{\tau_D}. \quad \text{(Eq. 23)}$$

Only contributions up to a linear order in $\epsilon$, $T/\tau_D$ are maintained. The contributions to the error come from (1) the Bell pair, (2) a first round of memory error on all qubits, (3) the CNOT gates, (4) a second round of memory error on all qubits, and (5) the two local measurements per link.

The effect of each of the above gates on $\langle K_{\partial q} \rangle$ is further presented taking into account propagation effects. For example, consider the link established between the face qubit of a front face f with its left neighboring edge qubit. The Bell pair for this link is created in a Step 1, the required CNOTs are performed in a Step 2 subsequent to the Step 1, and the local measurements in the following Step 3. The Z-error on f does not propagate further.

The Z-error on e is propagated in later steps to a neighboring face, as may be seen in FIG. 7B. Thus, the errors $Z_f$ and $Z_e$ of this gate affect $\langle K_{\partial q} \rangle$, and $Z_e Z_f$ doesn't. With Eq. (22), the gate in question reduces $\langle K_{\partial q} \rangle$ by a factor of $1-(68/15)\epsilon-8T/\tau_D$.

The following links contribution takes place in the following scenario: three for every face in ∂q from within the cell, and three more per face of ∂q from the neighboring cells (links ending in an edge belonging to the cell q can affect $\langle K_{\partial q} \rangle$ by propagation).

Contributions from within the Cell.

If a $Z_e$-error of the link propagates to an even (odd) number of neighboring faces in q, the total error probability affecting $\langle K_{\partial q} \rangle$ is $p_{ZZ}+p_{ZI}(p_{IZ}+p_{ZZ})$. But since $p_{IZ}=p_{ZZ}$, all 18 contributions from within the cell q are the same, irrespective of propagation.

Contributions from Neighboring Cells.

Each of the 18 links in question contributes an effective error probability $p_{IZ}+p_{ZZ}$ if an error on the edge qubit of the link propagates to an odd number of face qubits in ∂q. As illustrated in FIG. 7B, this occurs for 6 links. With Eq. (23), all the Type-2 errors reduce $\langle K_{\partial q} \rangle$ by a factor of $$1 - 160\frac{T}{\tau_D} - 88\epsilon. \quad \text{(Eq. 24)}$$

Type-1 Contributions:

Each of the initial Bell pair creations carries a two-qubit gate error of strength $\epsilon$, and memory error of strength $T/\tau_D$ on either qubit. Similar to the above case, the 15 possible Pauli errors are grouped into the equivalence classes I, $Z_f$ ($Z_e Z_f \equiv I$ and $Z_e \equiv Z_f$ for Bell states). The single remaining error probability, for $Z_f$, is $$p_{ZI} = \frac{8}{15}\epsilon + \frac{4}{3}\frac{T}{\tau_D}. \quad \text{(Eq. 25)}$$

For each face of ∂q, there is one Bell pair within the face that reduces $\langle K_{\partial q} \rangle$ by a factor of $1-2p_{ZI}$. Bell pairs from neighboring cells do not contribute an error here. Thus, all the Type-1 errors reduce $\langle K_{\partial q} \rangle$ by a factor of $$1 - 8\frac{T}{\tau_D} - \frac{16}{5}\epsilon. \quad \text{(Eq. 26)}$$

Again, only the contributions to linear order in $\epsilon$, $T/\tau_D$ were maintained.

Type-3 Contributions:

The only remaining error source is in the measurement of the one qubit per ELU which is part of the 3D cluster state. The strength of the effective error on each face qubit is $p_Z = \frac{2}{3}\epsilon$. Each of the six faces in ∂q is affected by this error. Thus, all the Type-3 errors reduce $\langle K_{\partial q} \rangle$ by a factor of $$1 - 8\epsilon \quad \text{(Eq. 27)}$$

Combining the contributions Eqs. (24, 26, 27) of error Types 1-3 yields $$\langle K \partial q \rangle = 1 - \frac{512}{5}\epsilon - 176\frac{T}{\tau_D}. \quad \text{(Eq. 28)}$$

for the expectation value $\langle K_{\partial q} \rangle$.

In combination with Criterion (2), the threshold condition is obtained:

$$\epsilon + \frac{55}{32}\frac{T}{\tau_D} < 2.9 \times 10^{-3}. \quad \text{(Eq. 29)}$$

The operational cost of creating a 3D cluster state and then locally measuring it for the purpose of computation is 24 gates per elementary cell in the standard setting, and 54 gates per elementary cell in MUSIQC.

Figure 8B:
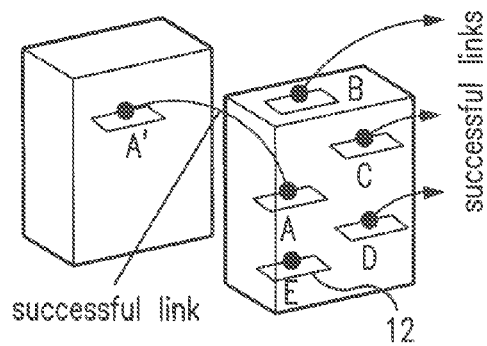
FIG. 8B is a schematic representation of creating probabilistic links between several 3-D cluster states.

Creation of probabilistic links between several 3D clusters and the elementary cell of a 3D four-valent cluster state is shown in FIG. 8B. The overhead of the MUSIQC architecture over fault-tolerant cluster state computation is thus constant. The operational overhead for fault-tolerance in the latter is poly-logarithmic.

Analysis of Fault-Tolerance for Slow Entangling Gates

The construction presented in previous paragraphs fails for $\tau_E/\tau_D \geq 1$, where decoherence occurs while waiting for Bell-pair entanglement. However, scalable fault-tolerant computing can still be achieved in the MUSIQC architecture for any ratio $\tau_E/\tau_D$, even for ELUs of only 3 qubits. Compared to the case of $\tau_E \ll \tau_D$, the operational cost of fault-tolerance is increased by a factor that depends strongly on $\tau_E/\tau_D$ but is independent of the size of the computation. Thus, while quantum computation becomes more costly when $\tau_E \geq \tau_D$, it remains scalable. This surprising result shows that there is no hard threshold for the ratio $\tau_E/\tau_D$, and opens up the possibility for efficient fault-tolerant constructions with slow entangling gates. Scalable quantum computation can be achieved for arbitrarily slow entangling gates.

The solid idea underlying the subject scalable quantum computer is to construct a "hypercell" out of several ELUs. A hypercell has the same storage capacity for quantum information as a single ELU, but with the ability to become (close to) deterministically entangled with four other hypercells. Fault-tolerant universal quantum computation can then be achieved by mapping to a 4-valent three-dimensional cluster state.

In quantum computing, a cluster state is a type of highly entangled state of multiple qubits. Cluster states are generated in the subject structure in lattices (or arrays, or grids) of qubits. A cluster 96 (FIGS. 8A-8D) or 78 (FIGS. 9A-9B) is a connected subset of a multi-dimensional lattice, and a cluster state is a pure state of the qubits located on the cluster.

Figure 8C:
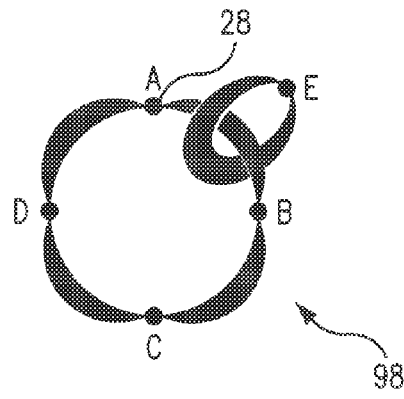
FIG. 8C is a diagram representative of a reduction of a 3-D cluster state to a 5-qubit graph state via Pauli measurements.
Figure 8D:
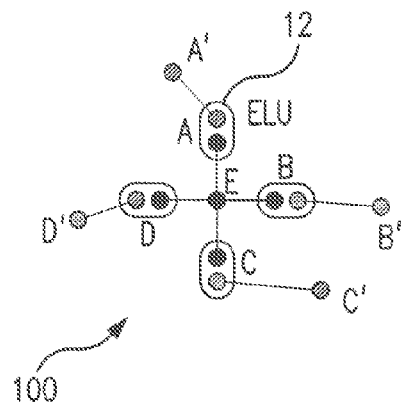
FIG. 8D is a diagram representing linking graph states by Bell measurements in the remaining ELUs.
Figure 9A:
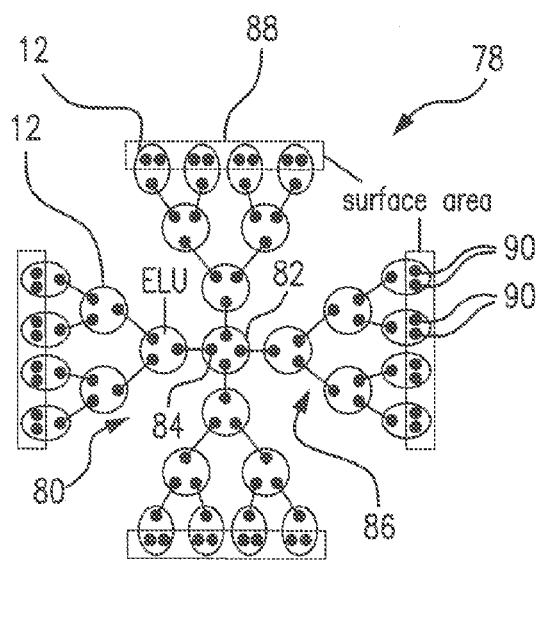
FIG. 9A is a schematic representation of the snowflake hypercell construction.
Figure 9B:
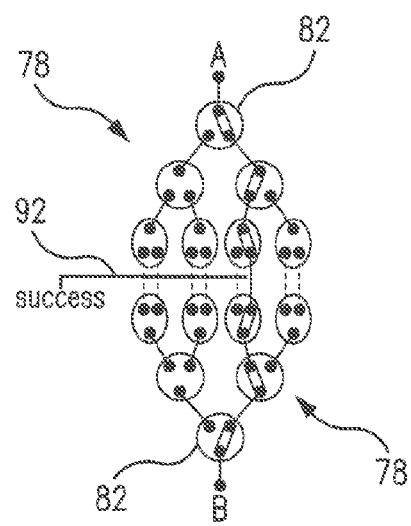
FIG. 9B is a schematic representation of a hypercell construction including two snowflake hypercells connected each to the other.
Figure 9C:
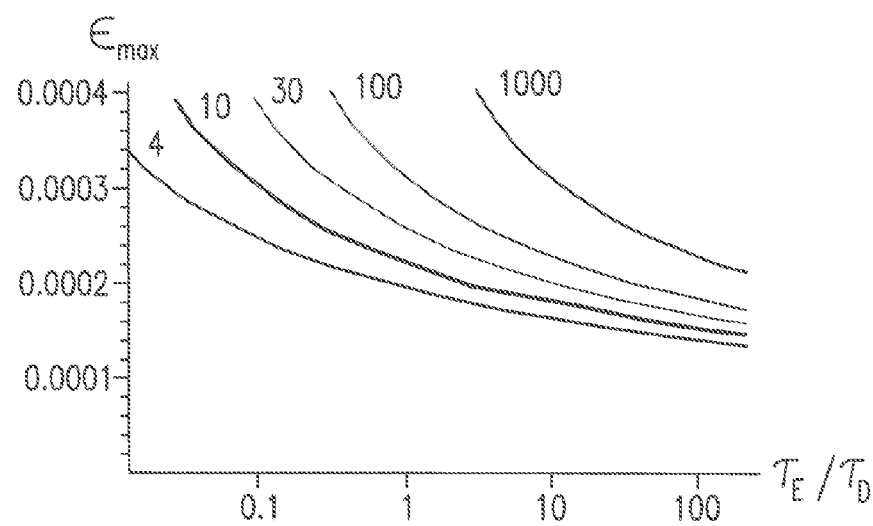
FIG. 9C is a diagram representative of the boundaries of the fault-tolerance region for gate error $\epsilon$ and ratio $\tau_e/\tau_D$, for various ELU sizes.

It is shown herein that arbitrarily large ratios $\tau_E/\tau_D$ can be tolerated in the limiting case where the gate error rate $\epsilon=0$ (Construction I shown in FIGS. 9A-9C). Then, it is shown how to tolerate arbitrarily large ratios $\tau_E/\tau_D$ with finite gate errors $\epsilon>0$ (Construction II shown in FIGS. 8A-8D).

Hypercell Construction I is based on the snowflake design where in the subject hypercell 78, each node in the connectivity tree represents an entire ELU 12. At the root of the connectivity tree 80 is an ELU 82 that contains the qubit 84 used in the computation, while multiple layers of bifurcating branches 86 lead to a large "surface area" 88 with many ports 90 from which entanglement generation between two trees can be attempted. Once a Bell pair is created, it can be converted to a Bell pair between the root qubits A and B via teleportation as shown in FIG. 9B illustrating connection of two hypercells.

The part of the hypercell needed to connect to a neighboring hypercell is called a "tree". The number m of ports 90 that are available to connect two hypercells 78 is twice the number of ELUs in the top layer of the tree.

If the surface area is large, with high probability one or more Bell pairs are created between the surface areas via the photonic link. By Bell measurements within individual ELUs 12, one such Bell pair is teleported to the roots A and B.

The links (each representing a Bell pair) within the snowflake structure 78 are created probabilistically, each with a probability p of success. The success probability of each hypercell is small, but if the surface area 92 between two neighboring hypercells is large enough, the probability of creating a Bell pair between them via a probabilistic photonic link approaches unity. Thus, the cost of entangling an entire grid of hypercells is linear in the size of the computation, as opposed to the exponential dependence that would be expected if the hypercells could not be entangled deterministically. Correspondingly, the operational cost of creating a hypercell is large, but the cost of linking this qubit into the grid is independent of the size of the computation. The hypercell 78 offers a qubit which can be near-deterministically entangled with a constant number of other qubits on demand.

A quantum computer made up of such hypercells can create a four-valent, 3D cluster state with few missing qubits, and is thus fault-tolerant.

If ELUs of size $N_q=3$ are used in the hypercells 78, resulting in hypercells of valency 3, then two such hypercells can be combined into one of valency 4.

Hypercells 78 can readily be implemented in the modular ion trap quantum computer since the probability of entanglement generation does not depend on the physical distance between the ELUs.

The probability for all m attempts to generate entanglement between two trees to fail is $P_{fail}=(1-p)^m \approx \exp(-mp)$. In practice, a constant probability of failure can be permitted which is tolerable in 3D cluster states. In addition, the number of ELUs in the top layer 88 is $2^{\# layers}$, and the path length l (number of Bell pairs between the roots) is $$l=2 \log_2 m+1. \qquad (Eq.\ 30)$$

Combining the above, it is found that $$l=2 \log_2 [c/p]+1, \text{ for } c=-\ln P_{fail}. \qquad (Eq.\ 31)$$

For simplification it is assumed that the time t for attempting entanglement generation is the same when creating the trees and when connecting the trees. Then, $p=t/\tau_E$ in both cases. From the beginning of the creation of the trees to completion of entangling two trees, a time 2t has passed. The Bell pairs within the trees have been around, on average, for a time 3t/2, and the Bell pairs between the two trees for an average time of t/2. If overall error probabilities remain small, the total probability of error for creating a Bell pair is proportional to 1. The memory error alone is $$\epsilon_{mem} = \frac{t}{\tau_D}\left[3\log_2\left(c\frac{\tau_E}{t}\right) + \frac{1}{2}\right]. \qquad (Eq.\ 32)$$

This function monotonically increases with t, and $\epsilon_{mem}$ (t=0)=0. The task now is to suppress the memory error rate $\epsilon_{mem}$ below the error threshold $\epsilon_{crit}$ that applies to fault-tolerant quantum computation with 3D cluster states. From (Eq. 19) it is known that $\epsilon_{crit}>0$.

From (Eq. 32), it is found that, for any ratio $\tau_E/\tau_D$, the t can be made small enough such that $\epsilon_{mem}<\epsilon_{crit}$.

The operational cost for creating a hypercell with sufficiently many ports is $$O(hypercell) \sim \left(\frac{1}{p}\right)^{9/2\ c/p}. \qquad (Eq.\ 33)$$

This cost is high for small $p=t/\tau_E$, but independent of the size of the computation. Thus, whenever decoherence on waiting qubits is the only source of error, scalable fault-tolerant QC is possible for arbitrarily slow entangling gates.

To analyze how the Hypercell Construction I (FIGS. 9A-9B) fares in the presence of additional gate error $\epsilon$, every noisy one-(two-) qubit operation is modeled by the perfect operation followed by a SU(2)-(SU(4)-) invariant partial depolarizing channel with strength $\epsilon$. If $\epsilon>0$ then every entanglement swap adds error to the computation. The entanglement is swapped in every ELU on the path between the roots A and B, and because there are 2 $\log_2$ m of them (m≥2), for $\epsilon \ll 1$ the total error is $$\epsilon_{total} = \frac{t}{\tau_D}\left[3\log_2\left(c\frac{\tau_E}{t}\right) + \frac{1}{2}\right] + 2\epsilon\log_2\left(c\frac{\tau_E}{t}\right). \quad \text{(Eq. 34)}$$

Now it is no longer true that for any choice of $\tau_E/\tau_D$ it is possible to realize $\epsilon_{crit} > \epsilon_{total}$.

A non-vanishing gate error sets an upper limit to the tree depth, since the accumulated gate error is proportional to the tree depth (FIG. 9B). This implies an upper bound on the size of the top layer of the tree, which further implies a lower bound on the time t needed to attempt entangling the two trees Eq. 36 and thus a lower bound on the memory error caused by decoherence during the time interval t. The accumulated memory error alone may be above or below the error threshold, depending on the ratio $\tau_E/\tau_D$.

In more detail, suppose that $\epsilon_{crit} > \epsilon_{total}$ holds. Considering only gate errors, $$\epsilon_{crit} > 2\epsilon\log_2\left(c\frac{\tau_E}{t}\right), \quad \text{(Eq. 35)}$$

and hence $$t > c\tau_E 2^{-\frac{\epsilon_{crit}}{2\epsilon}}. \quad \text{(Eq. 36)}$$

Now, recalling that $$c\frac{\tau_E}{t} = m \geq 2,$$

with Eq. 34, it is found that $$\epsilon_{crit} > 3t/\tau_D + 2\epsilon \quad \text{(Eq. 37)}$$

or $$t < \tfrac{1}{3}(\epsilon_{crit} - 2E)\tau_D. \quad \text{(Eq. 38)}$$

The two conditions Eq. 36 and 38 can be simultaneously obeyed only if $$\frac{\tau_E}{\tau_D} < \frac{\epsilon_{crit} - 2\epsilon}{3c}2^{\frac{\epsilon_{crit}}{2\epsilon}} \quad \text{(Eq. 39)}$$

It is seen that there is now an upper bound to the ratio $\tau_E/\tau_D$. Eq. 39 is a necessary but not sufficient condition for fault-tolerant quantum computation using the hypercells of FIG. 9B.

The process of constructing these hypercells for various values of the decoherence parameters $\epsilon$ and $\tau_E/\tau_D$ was numerically simulated. The boundary of the fault-tolerance region for gate error $\epsilon$ and ratio $\tau_E/\tau_D$, for various ELU sizes is shown in FIG. 9C. In the above, for simplicity, hypercells were considered in which all constituent ELUs are entangled in a single timestep t.

However, there are various possible refinements:

(1) The computational overhead can be significantly decreased by creating the hypercell in stages, starting with the leaves of the trees and iteratively combining them to create the next layers;

(2) Using numerical simulations it was found that if each of the 4 trees making up a hypercell has coordination number 4 or 5 rather then 3 (i.e., a ternary tree instead of a binary tree), the overhead can be further reduced. These optimizations were used to produce FIG. 9C, showing that the threshold for the gate error $\epsilon$ depends only weakly on $\tau_E/\tau_D$.

Hypercell Construction II, shown in FIGS. 8A-8D, allows fault-tolerance for finite gate errors $\epsilon>0$. In Construction I, the accumulated error for creating a Bell pair between the roots A and B is linear in the path length l between A and B. This limits the path length l, and thereby the surface area of the hypercell. This limitation can be overcome by invoking three-dimensional (3D) cluster states already at the level of creating the hypercell. 3D cluster states have an intrinsic capability for fault-tolerance, as presented in Raussendorf, R., et al., A fault-tolerant one-way quantum computer. Ann. Phys. 321, 2242 (2006) related to quantum error correction with surface codes (Kitaev, A. Ann. Phys. 303 (2003); Dennis, E. & et al. J. Math. Phys. 43, 4452 (2002)). For Hypercell Construction II, presented in FIGS. 8A-8D, a 3D cluster state nested within another 3D cluster state is employed.

Therein, the "outer" cluster state is created near-deterministically from the hypercells. Its purpose is to ensure fault-tolerance of the construction. The "inner" 3D cluster state is created probabilistically. Its purpose is to provide a means to connect distant qubits in such a way that the error of the operation does not grow with distance. Specifically, if the local error level is below the threshold for error-correction with 3D cluster states, the error of (quasi-) deterministically creating a Bell pair between two root qubits A and B in distinct 3D cluster states is independent of the path length between A and B.

Hypercell Construction II. Construction of the 3-D hypercell II 96 starts from a three-dimensional grid 97 with ELUs 12 on the edges and on the faces. Each ELU contains four qubits and can be linked to four neighboring ELUs. Such a grid of ELUs (of suitable size) is used to probabilistically create a 4-valent cluster state (FIG. 8A) by probabilistic generation of Bell pairs between the ELUs, post-selection and local operations within the ELUs.

After such cluster states have been successfully created, in each ELU three qubits are freed up, and can now be used for near-deterministic links between different 3D cluster states 96, as shown in FIG. 8B. After 4 probabilistic links to other clusters have succeeded (the size of the cluster states is chosen such that this is a likely event), the cluster state is transformed into a star-shaped graph state via X and Z measurements, as shown in FIG. 8C, which illustrates the reduction of a 3D cluster state to a 5-qubit graph state 98, via Pauli measurements. The shaded regions represent measurements of Z, the blank regions represent measurements of X. The qubits represented as black dots remain unmeasured. This graph state 98 contains 5 qubits 28, shared between the 4 ELUs (A, B, C, D) at which the successful links start, and an additional ELU $\epsilon$.

Due to the topological error-correction capability of 3D cluster states 96, the conversion from the 3D cluster state 96 to the star-shaped graph state 98 is fault-tolerant. By further Bell measurement in the ELUs, the graph states created in different hypercells can now be linked, e.g., to form again a 4-valent 3D cluster state 100 which is a resource for fault-tolerant quantum computation, as shown in FIG. 8D. This final linking step is prone to error. However, the error level is independent of the size of the hypercell, which was not the case for Hypercell Construction I, shown in FIGS. 9A-9B.

The only error sources remaining after error-correction in the 3D cluster state 96 are from (i) the (two) ports per link, and (ii) the two root qubits A and B, which are not protected topologically. The total error $\epsilon_{total}$ of a Bell pair created between A and B in this case is given by $$\epsilon_{total} = c_1 t/\tau_D + c_2 \epsilon \qquad \text{(Eq. 40)}$$

where t is the time spent attempting Bell pair generation, and $c_1$ and $c_2$ are algebraic constants which do not depend on the time scales $\tau_E$ and $\tau_D$, and not on the distance between the root qubits A and B.

Then, if the threshold error rate $\epsilon_{crit}$ for fault-tolerance of the outer 3D cluster state is larger than $c_2\epsilon$, we can reach an overall error $\epsilon_{total}$ below the threshold value $\epsilon_{crit}$ by making t sufficiently small. Smaller t requires larger inner 3D cluster states, but does not limit the success probability for linking Construction II hypercells. Thus, fault-tolerance is possible for all ratios $\tau_E/\tau_D$, even in the presence of small gate errors.

Optimal Quantum Control of Multimode Couplings Between Trapped Ion Qubits

Referring again to FIG. 1, in the subject quantum computer architecture 10, the scaling is enhanced by the optimal quantum control mechanism 110 by applying qubit state-dependent optical forces that simultaneously couple to multiple modes of motion. In the optimal quantum control scheme 110, laser pulse shapes are engineered to entangle pairs of ions, immersed for example, in a five-ion linear crystal to suppress the mode crosstalk within each ELU 12. The suppression of mode crosstalk provides high gate fidelity without slowing the gate.

The precalculated pulse shapes optimize theoretical gate fidelity, achieving unity for sufficiently complex pulses. The shaped gates are concatenated to entangle multiple pairs of qubits, and multiqubit entanglement in the crystal is directly measured. Extensions of this approach can be scaled to larger ion chains and also incorporate higher levels of pulse shaping to reduce sensitivity to particular experimental errors and drifts. A laser unit 112 (shown in FIG. 1) is operatively coupled to the optimal quantum control scheme 110 to produce required laser pulses for being applied to the qubits at different operational stages of the subject system. The Laser Unit 112 includes several lasers, each actuated to produce a laser pulse of specific characteristic needed at different stages of the subject computer operation, as will be detailed in the following paragraphs.

In an experiment, five $^{171}$Yb$^+$ ions were confined in a three-layer linear rf trap similar to W. K. Hensinger, et al., Appl. Phys. Lett. 88, 034101 (2006), with transverse center-of-mass (CM) frequency ranging from $\omega_x/2\pi$=2.5-4.5 MHz and axial CM frequency $\omega_z/2\pi$=310-550 kHz, with a minimal ion separation of ~5 μm. Each qubit is represented by the $^2S_{1/2}$ hyperfine "clock" states within $^{171}$Yb$^+$, denoted by $|0\rangle$ and $|1\rangle$ and having a splitting of $\omega_0/2\pi$=12.642821 GHz (S. Olmschenk, et al., Phys. Rev. A 76, 052314 (2007)).

Each qubit is initialized by optically pumping to state $|0\rangle$ using laser light produced by a laser 114 resonant with the $^2S_{1/2}\langle\ ^2P_{1/2}$ transition near 369.5 nm.

Subsequently, the qubits are coherently manipulated with a mode-locked laser 116 (or alternatively, a pair of high-power lasers) at 355 nm whose frequency comb beat notes drive stimulated Raman transitions between the qubit states and produce qubit state-dependent forces.

The Raman laser 116 may be split into two beams (or each of the high-lasers will produce a laser beam) 115, 117, one illuminating the entire chain and the other focused to a waist of ~3.5 μm for addressing any subset of adjacent ion pairs in the chain, with a wave vector difference Δk aligned along the x direction of transverse motion.

Subsequently, the state of each qubit is measured in the measurement unit 120 by applying a pulse 122 near 369.5 nm of a resonant laser 118 (shown as a part of the laser sub-system 112) that results in state-dependent fluorescence that is imaged onto a multichannel photomultiplier tube for individual qubit state detection. Each experiment is repeated at least 300 times and state populations are extracted by fitting to previously measured fluorescence histograms.

When a constant state-dependent force is applied to the ion qubits, the multiple incommensurate modes generally remain entangled with the qubits following the interaction, thereby degrading the quantum gate fidelity. However, more complex optical pulses can be created that satisfy a set of constraints for disentangling every mode of motion following the gate. This optimal control approach involves engineering a sufficiently complex laser pulse that can in principle achieve near-unit fidelity.

The qubit state-dependent optical force is applied by generating bichroinatic beat notes near the upper and lower motional sideband frequencies at $\omega_0 + \mu$ where the detuning μ is in the neighborhood of the motional mode frequencies. Using the rotating wave approximation in the Lamb-Dicke and resolved-sideband limits, the evolution operator of the dipole interaction Hamiltonian becomes $$\hat{U}(\tau) = \exp\left[\sum_i \hat{\phi}_i(\tau)\hat{\sigma}_x^{(i)} + i\sum_{i,j} x_{i,j}(\tau)\hat{\sigma}_x^{(i)}\hat{\sigma}_x^{(j)}\right] \qquad \text{(Eq. 41)}$$

The first term in Eq. 41 corresponds to the qubit-motion coupling on ion i, where $$\hat{\Phi}_i(\tau) = \Sigma_m[\alpha_{i,m}(\tau)\hat{a}_m{}' - \alpha_{i,m}{}^*(\tau)\hat{a}_m],\hat{a}_m{}'(\hat{a}_m) \qquad \text{(Eq. 42)}$$

is the raising (lowering) operator of mode m, and $\hat{\sigma}_x^{(i)}$ is the Pauli-X operator of the ith qubit, where we define the x axis of the qubit Bloch sphere according to the phase of the bichromatic beatnotes (P. J. Lee, et al., Opt. B 7, 5371 (2005)).

This is a state-dependent displacement of the ion i such that the $|0\rangle \pm |1\rangle$ states follow the trajectories $\pm\alpha_{i,m}(\tau)$ in phase space of the mth motional mode according to (S.-L Zhu, et al., Europhys. Lett. 73, 485 (2006)).

$$\alpha_{i,m}(\tau) = i\eta_{i,m}\int_0^\tau \Omega_i(t)\sin(\mu t)e^{i\omega_m t}dt \qquad \text{(Eq. 43)},$$

where, $\eta_{i,m} = b_{i,m} \cdot \Delta k\sqrt{)/2M\omega_m}$ is the Lamb-Dicke parameter, $b_{i,m}$ is the normal mode transformation matrix for ion I and mode m (D. F. V. James, Appl. Phys. B 66, 181 (1998)), $\omega_m$ is the frequency of the $m^{th}$ motional mode, and M is the mass of a single $^{171}$Yb$^+$ ion.

The second term of Eq. 41 describes the entangling interaction between qubits i and j, with $$X_{i,j}(\tau) = 2\sum_m \eta_{i,m}\eta_{j,m}\int_0^\tau\int_0^{t'} \Omega_i(t)\Omega_j(t') \times \qquad \text{(Eq. 44)}$$
$$\sin(\mu t)\sin(\mu t')\sin[\omega_m(t'-t)]dtdt'$$

as presented in S.-L Zhu, et al., Europhys. Lett. 73, 485 (2006).

In Eqs. 43-44, the time-dependent Rabi frequency $\Omega_i(t)$ on the $i^{th}$ ion is used as a control parameter for optimization of the gate and is assumed to be real without loss of generality. Alternatively the detuning $\mu$ can be varied, as presented in S. Korenblit, et al., New J. Phys. 14, 095024 (2012), or the beatnote phase can be altered over time for control.

In order to perform an entangling XX gate on two ions a and b in a chain of N ions, identical state-dependent forces are applied to just these target ions a and b and realize $$\hat{U}(\tau_g) = \exp[i\pi \hat{\sigma}_x^{(a)} \hat{\sigma}_x^{(b)}/4] \quad \text{(Eq. 45)}$$

This requires $\chi_{a,b}(\tau_g) = \pi/4$ along with the 2N conditions $\alpha_{a,m}(\tau_g) = 0$, so that the phase space trajectories of all N motional modes return to their origin and disentangle the qubits form their motion.

These constraints can be satisfied by evenly partitioning the pulse shape $\Omega_a(t) = \Omega_b(t)$ into (2N+1) segments as presented in S.-L. Zhu, et al., Phys. Rev. Lett. 97, 050505 (2006); and S.-L. Zhu, et al., Europhys. Lett. 73, 485 (2006), thus reducing the problem to a system of linear equations with a guaranteed solution. The detuning and gate duration become independent parameters, so that, the gate can be performed with near-unit fidelity at any detuning $\mu \neq \omega_m$ on any two ions in a chain, given sufficient optical power.

Figure 10A:
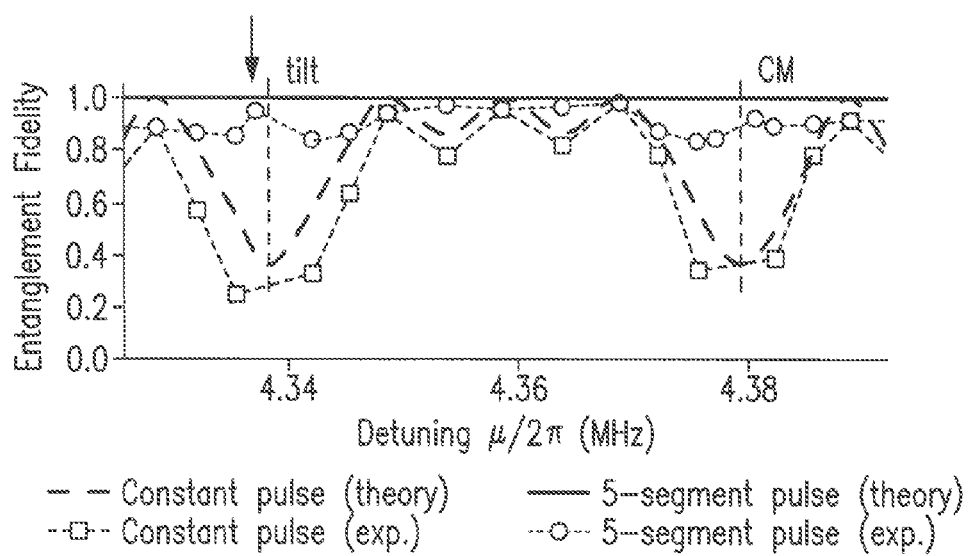
FIGS. 10A-10C are diagrams representative of the improvement of entangled state creation using pulse shaping on N=2 trapped ion qubits, where

FIG. 10A shows theoretical and measured fidelity of the entangled state $$\hat{U}(\tau_g)|00\rangle = |00\rangle + i|11\rangle \quad \text{(Eq. 46)}$$

for both a simple constant pulse and a five-segment pulse on a two-ion chain, as a function of detuning $\mu$ for a fixed gate time $\tau_g = 104$ μs.

For two ions, the five segments provide full control (2N+1=5), meaning that a pulse shape can be calculated at each detuning that should yield unit fidelity.

Figure 10B:
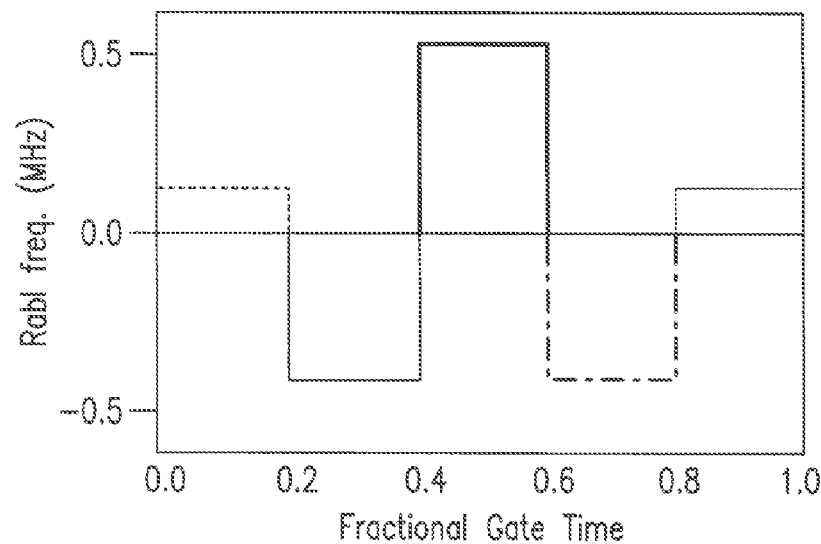
Figure 10C:
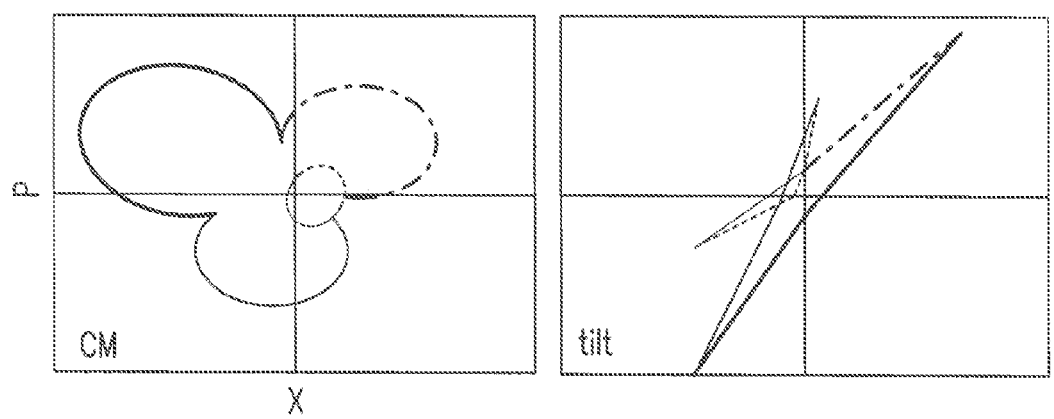

FIGS. 10A-10C illustrate the improvement of entangled state creation using pulse shaping on N=2 trapped ion qubits, where FIG. 10A is representative of comparison of Bell state entanglement fidelity for a constant pulse versus a five-segment pulse over a range of detuning $\mu$, showing significant improvement with the segmented gate, FIG. 10B is representative of the segmented pulse pattern, parameterized by the Rabi frequency $\Omega_i(t)$ with the particular detuning near the $2^{nd}$ ("tilt") motional mode (arrow in FIG. 10A) and measured state fidelity ≥94(2)%, and FIG. 10C is representative of phase space trajectories (arbitrary units) subject to pulse sequence in FIG. 10B for both CM (center-of-mass) and "tilt" modes of the two ions. The thickness of the curves from each segmented pulse is alternated to guide the trajectories. The five-segment pulse pattern brings the two trajectories back to their origins, simultaneously disentangling both modes of motion from the qubits.

As seen in FIG. 10A, a constant pulse can be optimized to achieve high fidelity, but only at detunings $\mu$ whose frequency difference from the two modes is commensurate, which in this case has many solutions spaced by $1/\tau_g$.

The observed fidelity of the constant pulse follows theory, with uniformly lower fidelities consistent with known errors in the system. On the other hand, relatively high fidelities of the 5-segment pulse are observed over a wide range of detunings for the same gate time, with the details of a particular pulse sequence shown in FIGS. 10B-10C. The fidelity was measured by first observing the populations of the $|00\rangle$ and $|11\rangle$ states, then extracting their coherence by repeating the experiment with an additional global $\pi/2$ analysis rotation $R(\pi/2, \Phi)$ and measuring the contrast in qubit parity as the phase $\Phi$ is scanned.

Figure 11A:
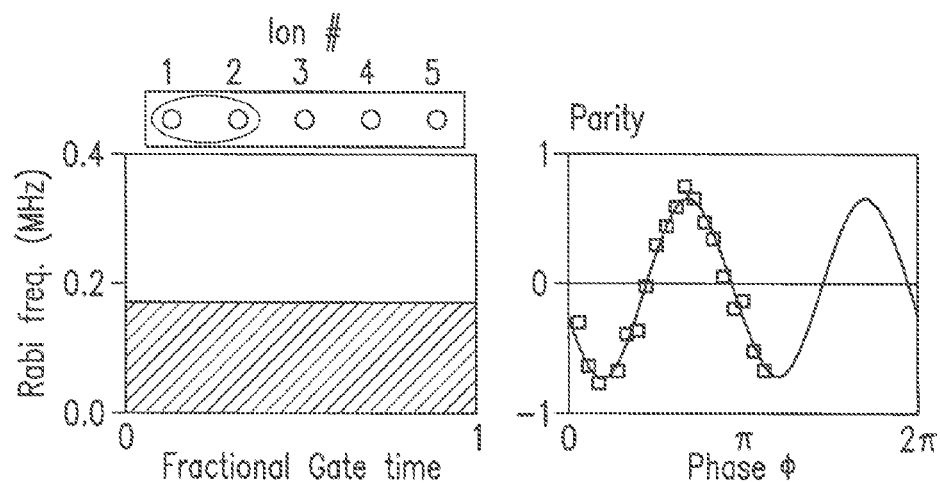
FIGS. 11A-11D illustrate entanglement of qubit pairs within a chain of N=5 trapped ions, where
Figure 11B:
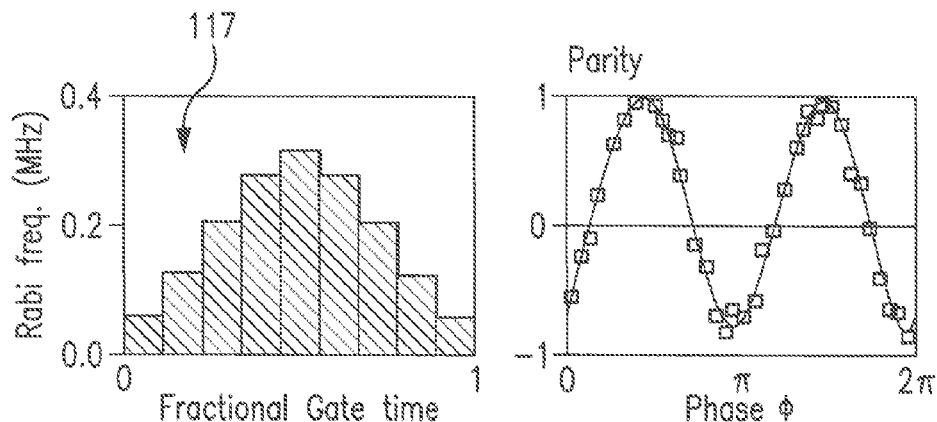
Figure 11C:
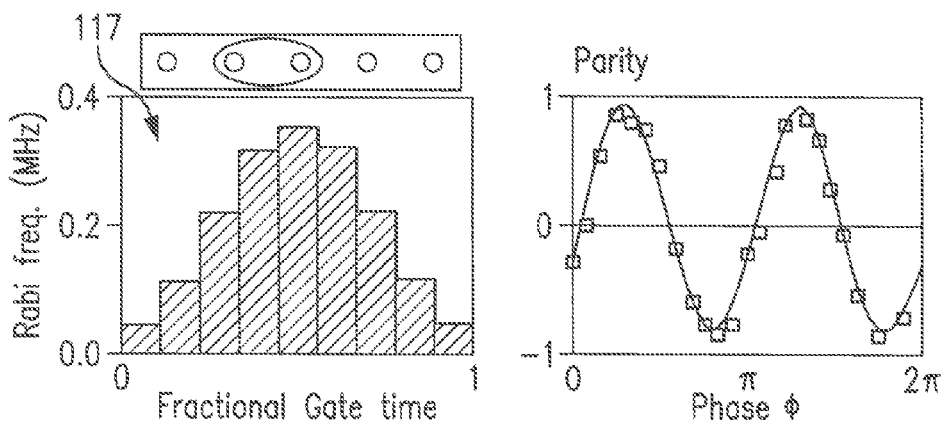
Figure 11D:
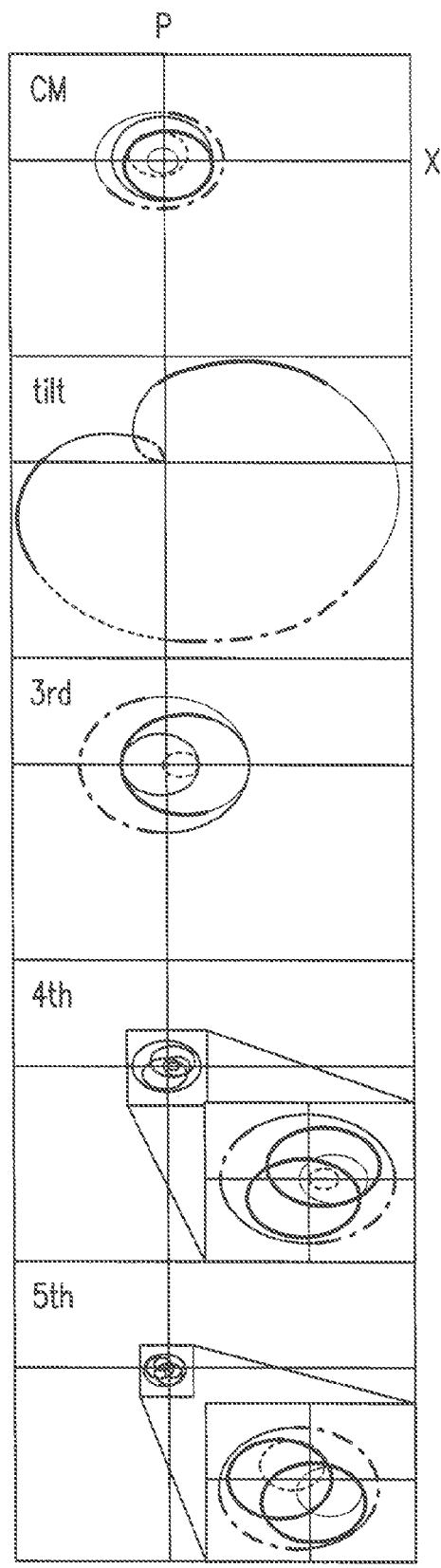

FIGS. 11A-11C are representative of entanglement of qubit pairs within a chain of N=5 trapped ions. FIG. 11A illustrates the applied pulse pattern and measured parity oscillations for a constant pulse used to entangle ions 1 and 2. The gate time is $\tau_g = 190$ μs and the detuning is set to $\mu = \omega_x + 2\pi/\tau_g$, which should exhibit the highest fidelity; we measure F=82(3)%. FIG. 11B illustrates the applied pulse pattern and measured parity oscillation with a nine-segment pulse. The gate time is $\tau_g = 190$ μs, and the detuning is set close to the tilt mode, F=95(2)%. FIG. 11C is representative of different nine-segment pulse patterns used to entangle ions 2 and 3 with same gate time as in FIGS. 11A-11B, and the detuning is set close to the $5^{th}$ mode; F=95(2)%. FIG. 11D is representative of phase space trajectories (arbitrary units but all on same scale) for the pulse pattern applied to the ion pair 1 and 2 at the detuning used in FIG. 11B.

When the number of ions in a chain increases to N>2, it becomes difficult to find detunings $\beta - \phi_m$ from all modes which are nearly commensurate, without significantly slowing the gate. FIGS. 11A-11B compare the measured parity curves using a constant versus a nine-segment pulse for performing the XX gate on an ion pair 1 and 2 within a five ion chain, while maintaining the same gate time ($\tau_g = 190$ μs). The measured state fidelity increases from 82(3)% for a constant pulse to 95(2)% for the segmented pulse, even though fewer than 2N+1=11 control parameters are utilized. Much of this gain in fidelity from the segmented pulse appears to stem from its relative insensitivity to detuning fluctuations, as discussed below.

Using a different nine-segment pulse solution, a fidelity of 95(2)% is also achieved for an ion pair 2 and 3 as seen in FIG. 11C. In this overconstrained case, the calculation becomes an optimization problem, where more weight is given to the closing of more influential phase space trajectories as seen in FIG. 11D. Therefore, a judicious choice of detuning can reduce the number of parameters required to achieve near-unit gate fidelities.

FIG. 12A shows a theoretical maximum entanglement gate fidelity using a constant, a five-segment, and a nine-segment pulse for entangling the first two ions as a function of the total number of ions in a chain. A fixed gate time $\tau_g \sim 90$ μs and minimal (central) ion spacing ~5 μm were used in the experiments. The improvement of the segmented gates becomes significant as the number of ions grows, since more modes must be considered.

A further advantage of using multisegment pulses is their relative insensitivity to fluctuations in detuning $\mu$ and trap frequency $\omega_m$. For conventional constant pulses, such noise strongly affects the simple phase space trajectories, and the fidelity degrades quickly. Segmented pulses also show errors, but because of the complex phase space trajectories (FIG. 11D), these errors are of higher order, admitting solutions that do not change rapidly with detuning.

FIG. 12B shows the theoretical entanglement gate fidelity for the first two ions as a function of detuning error $\Delta\mu$ in a chain of 5 ions. The solid line corresponds to a constant (nine-segment) pulse on the two ions, where the pulse power is optimized at each value of the detuning offset. The dashed line corresponds to a constant (nine-segment) pulse optimized for $\Delta\mu = 0$. The segmented pulse not only allows high-fidelity solutions at any detuning (solid line), but even when the detuning drifts, the segmented pulses mitigate this error (dashed line).

As seen in FIG. 12B, a constant pulse is expected to degrade the fidelity by ~15% for a 1 kHz drift in detuning, which is consistent with the measured state fidelity of 82(3)%. However, the nine-segment pulse is expected to degrade the fidelity by only 1% for the same drift, which compares to the observed fidelity of 95(2)%. Other sources of the infidelity in the experiment are Rabi frequency fluctuations from intensity noise in the tightly focused Raman laser beam (~3%), optical Raman laser beam spillover (~1%), and optical crosstalk of the multichannel photomultiplier tube used for qubit detection (~1%).

Figure 13D:
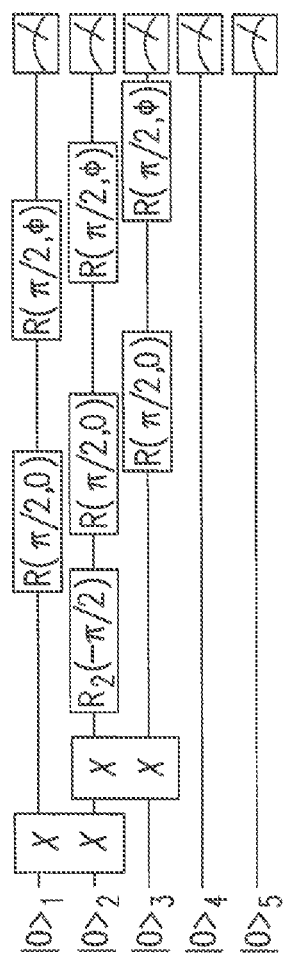
FIG. 13D is a schematic diagram for creating a GHZ cat state using two XX gates on ions 1-2 and 2-3.

FIGS. 13A-13E are representative of programmable quantum operations to create tripartite entanglement. FIG. 13A is a schematic representation of a circuit for concatenated XX gates between ions 1 and 2 and 2 and 3, and $\pi/2$ analysis rotations of ions 1 and 2 with phase $\phi$. FIG. 13B is representative of measured population after XX gates on ions 1 and 2 and 2 and 3, where $P_N$ denotes the probability of finding N ions in the $|1\rangle$ state. FIG. 13C is representative of parity oscillations of ions 1 and 2 with the phase $\phi$ of the $\pi/2$ analysis rotations, after postselecting the state of the third ion, with periods it (left) and $2\pi$ (right) for the two states $|0\rangle_3$ and $|1\rangle_3$, respectively, in accordance with Eq. 47.

Figure 13E:
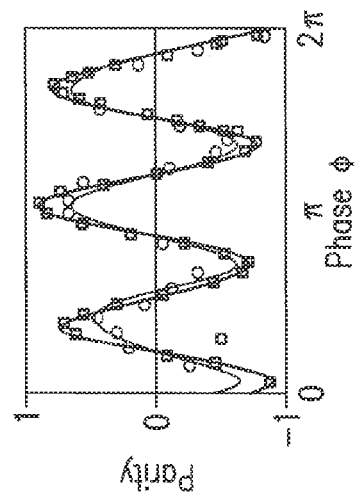
FIG. 13E is a diagram of a three-ion parity oscillation with phase φ of the π/2 analysis rotations.

FIG. 13D is representative of schematic for creating a Greenberger-Horne-Zellinger (GHZ) cat state using two XX gates on ions 1 and 2 and 2 and 3 as in FIG. 13A, with additional individual qubit rotations, followed by $\pi/2$ analysis rotations of all three ions with phase $\phi$. FIG. 13E is a diagram illustrating the three-ion parity oscillation with phase $\phi$ of the $\pi/2$ analysis rotations. The solid line is fit to the data with period $2\pi/3$, while the dashed line is the expected signal assuming a perfect "cat" state with known systematic measurement errors.

To demonstrate pulse-shaped gates on subsets of qubits in a linear crystal, tripartite entangled states were produced by concatenating two XX gates in a five ion chain, as shown in FIG. 13A.

The ions were adiabatically shuttled across the fixed laser beams in order to address nearest neighbor pairs of the three target ions and ideally create a GHZ-type state, $$|000\rangle \rightarrow |000\rangle + i|110\rangle + i|011\rangle - |101\rangle \quad \text{(Eq. 47)}$$

The measured state populations are consistent with the state, as shown in FIG. 13B.

In order to measure the coherences of the three-qubit subsystem, analysis rotations $R(\pi/2,\phi)$ was applied to any two of the three qubits, and their parity were measured. As the phase $\phi$ of the analysis rotation is scanned, the parity should oscillate with period $\pi$ or $2\pi$ when the third ion is postselected to be in state $|0\rangle$ or $|1\rangle$, respectively as seen in FIG. 13C for one of the pairs. By measuring the contrasts of the two parity curves for each of the three possible pairs conditioned upon the measured value of the third, the six coherences of the final state were obtained. Combined with the state populations FIG. 13B, a quantum state fidelity of 79(4)% with respect to Eq. 47 was calculated. This level of fidelity is consistent with the compounded XX gate fidelities (~95% each) and the discrimination efficiency (~93%) for postselection of the third qubit.

To prove genuine tripartite entanglement within the five ion chain, single qubit rotations were used to transform the state given by Eq. 47 into a GHZ "cat" state $|000\rangle + i|111\rangle$. As shown in the circuit of FIG. 13D, this is achieved by applying a Z-rotation operation $R_z(-\pi/2)=R(-\pi/2,0)R(\pi/2,\pi/2)R(\pi/2,0)$ to the middle ion only followed by $R(\pi/2,0)$ rotations to all three ions. And finally, the parity of all three qubits was measured while scanning the phases of subsequent $R(\pi/2,\phi)$ analysis pulses, and the oscillation with period $2\pi/3$ with a contrast of over 70%, as seen in FIG. 13E, verifies genuine tripartite entanglement. This is a conservative lower limit to the entanglement fidelity, given known errors and crosstalk in the rotations and the measurement process.

It was shown how a single control parameter can be used to mitigate multimode couplings between a collection of qubits, but this approach can be expanded to include additional parameters, such as spectral, phase, or spatial addressing of each qubit. This could allow for the efficient implementation of more complicated quantum circuits, such as Toffoli and other gates involving more than two qubits, or global operations for quantum simulations of particular Hamiltonian models. The optimal quantum control demonstrated here can apply to any quantum information and simulation architectures that entangle subsets of qubits through a bosonic quantum bus having multimode components, such as cavity QED and superconducting.

The success of silicon-based information processors in the past five decades hinged upon the scalability of integrated circuits (IC) technology characterized by Moore's law. IC technology integrated all the components necessary to construct a functional circuit, using the same conceptual approach over many orders of magnitude in integration levels. The subject hierarchical modular ion trap quantum computer architecture promises scalability, not only in the number of physical systems (trapped ions) that represent the qubits, but also in the entire control structure to manipulate each qubit at such integration levels.

The technology necessary to realize each and every component of the MUSIQC architecture is currently available. The recognition that ion traps can be mapped onto a two dimensional surface that can be fabricated using standard silicon microfabrication has led to a rapid development in complex surface trap technology. Present-day trap development exploits extensive electromagnetic simulation codes to design optimized trap structures and control voltages, allowing sufficient control and stability of ion positioning. Integration of optical components into such microfabricated traps enables stronger interaction between the ions and photons for better photon collection and qubit detection through the use of high numerical aperture optics or integration of an optical cavity with the ion trap. Moreover, electro-optic and MEMS-based beam steering systems allows the addressing of individual atoms in a chain with tightly focused laser beams. An optical interconnect network can be constructed using large-scale all-optical crossconnect switches. While technical challenges such as the operation of narrowband (typically ultraviolet) lasers or the presence of residual heating of ion motion still remain such are not fundamental roadblocks to scalability. Within the MUSIQC architecture an access is provided to a full suite of technologies to realize the ELU in a scalable manner, where the detailed parameters of the architecture such as the number of ions per ELU, the number of ELUs, or the number of photonic interfaces per ELU can be adapted to optimize performance of the quantum computer.

Besides the benefits of scaling to such a large number of qubits using technologies within reach, the proposed MUSIQC has unparalleled architectural advantages for efficiently implementing fully fault-tolerant quantum circuits and quantum algorithms:

The qubit registers are globally connected, as the generated entangled ion pairs, can be utilized to operate a deterministic two-qubit gate between any qubits within these registers. Moreover, the "cost" of two-qubit gate operations between ions in different qubit ELU registers is independent of their relative location within the QC. This is a unique and powerful property of the MUSIQC architecture that can be exploited to realize highly parallel implementation of quantum algorithms. An example is a carry-lookahead adder that can be used in modular exponentiation circuit, capable of computing the addition in logarithmic number of steps as the number of digits increases. MUSIQC architecture can implement arbitrary size carry-lookahead adders in an efficient way, which is expected to reduce the execution time of Shor's algorithm by many orders of magnitude over other architectures.

The MUSIQC architecture explores a novel regime in the space of architectures for QCs due to the low cost of two-qubit gates within a single ELU as compared to the high cost of gates between different ELUs, and the independence of the cost with distance within and between ELUs. This set of "islands of hundreds of qubits" has not been considered in the fault-tolerant quantum computing community and interpolates between schemes with high thresholds and high overhead costs and schemes with low thresholds and low overhead costs. Existing fault-tolerance schemes could be pasted onto the MUSIQC architecture, but we believe we can obtain significantly better fault-tolerant schemes are achieved in the subject system by exploiting the novel structure.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. Large-scale modular quantum computer architecture, comprising:
    a processor configured for receiving an input data to be computed and to control quantum computations in accordance with a quantum algorithm and to output results of the computations;
    a plurality of modular elementary logic units (ELUs), each modular ELU housing a plurality of stationary matter qubits and constituting a high performance quantum memory register;
    a photonic interconnect network propagating quantum degrees of freedom of said qubits and operatively coupled to said plurality of modular ELUs, said photonic interconnect network being configured for multiplexing, under control of said processor, said plurality of modular ELUs in a dynamically reconfigurable at least one multi-dimensional quantum computational structure supporting a scheduled realization of at last one of at least first quantum gate is being realized between qubits housed in respective distant modular ELUs arranged in said at least one multi-dimensional quantum computations structure, and wherein said at least second quantum gate is being realized between qubits housed in a respective at least one of said plurality of modular ELUs, and wherein said at least first and second quantum gates are being executed through application of predetermined qubit-state-dependent forces to respective qubits;
    a control sub-system configured to control said qubit-state-dependent forces for application of optimal control parameters to multiple modes of motion of said qubits housed in said respective at least one ELU to suppress a mode crosstalk within said respective at least one ELU, thereby enabling high fidelity operation of said at least one second quantum gate in said respective at least one ELU for enhanced scalability of said quantum computer;
    a photon detection sub-system operatively coupled to a respective at least one of said at least first and second quantum gates via said photonic interconnect network to detect realization of said respective at least one of said at least first and second quantum gates; and
    a measurement sub-system operatively coupled to said detection sub-system and said at least on first and second quantum gates to measure, upon detection of photons produced thereat, the states of qubits resulting from realization of said respective at least one of said at least first and second quantum gates, said qubit's states being supplied to said processor for processing and subsequent output in a form of computation results
    wherein said stationary matter qubits include ion qubits, further comprising a laser sub-system generating laser beams with predetermined characteristics and operatively coupled to said respective at least one ELU in a controlled manner in accordance with said quantum algorithm to realize said at least one of said at least first and second quantum gates, wherein said control sub-system is operatively coupled to said laser sub-system for shaping at least one of said laser beams to apply said optimally controlled qubit state-dependent optical forces to a respective subset of said ion qubits,
    wherein said laser sub-system includes:
    a first laser configured for initialization of each of said ion qubits in said respective at least one ELU,
    at least one second continuous-wave laser configured to simulate Raman transitions between said ion qubits and to produce said qubit state-dependent optical forces, wherein said at least one second laser generates a first laser beam for illuminating said plurality of ion qubits in said respective at least one ELU and a second laser beam for manipulating said respective subset of adjacent ion qubits of interest, and
    a third resonant laser configured to participate in said ion qubits states measurement by applying said third laser's beam to said ion qubits states,
    wherein said multiple modes of motion of said ion qubits are caused by application of at least one of said first laser's beam and said first laser beam of said at least one second laser, and
    wherein said optimal control parameters include a predetermined pulse shape of said second laser beam designed for disentanglement of said multiple modes of motion of said ion qubits housed within said respective at least one ELU.

2. The large-scale modular quantum computer architecture of claim 1, wherein said pulse shape of said second laser beam is evenly partitioned into $(2N_q+1)$ segments wherein $N_q$ is the number the ion qubits in said respective at least one ELU.

3. The large-scale modular quantum computer architecture of claim 2, wherein said optimal control parameters further include spectral phase and amplitude of said second laser beam, and a predetermined addressing of said ion qubits of interest.

4. The large-scale modular quantum computer architecture of claim 1, wherein in said at least one multi-dimensional quantum computational structure, a probabilistic connection is realized in a fault-tolerant fashion between said respective distant modular ELUs by generation of entangled Bell pairs of communication qubits in accordance with said quantum algorithm, each communication qubit residing in a respective on of said respective distant modular ELUs to perform measurement-based quantum computations.

5. The large-scale modular quantum computer architecture of claim 4, wherein said respective at least one ELU is provided with a plurality of communication ports for coupling with said photonic interconnect network, further comprising a time division multiplexing (TDM) mechanism applied to said communication ports of said distant ELUs to reduce entanglement generation time therebetween.

6. The large-scale modular quantum computer architecture of claim 5, further comprising a fault-tolerance sub-system operatively coupled to at least one of said at least first and second quantum gates resulting in reduction of a mismatch between the entanglement generation time for said distant ELUs and the entanglement generation time within said respective at least one ELU, said fault-tolerance sub-system being configured to apply a Steane quantum error correction code to multiple levels of concatenation of the Steane code followed by at least one of said first and second quantum gates realization.

7. The large-scale modular quantum computer architecture of claim 1, wherein said at least one multi-dimensional quantum computational structure is configured as at least one multi-dimensional hypercell composed of said multiplexed modular ELUs, said at least one hypercell having a storage capacity for quantum information substantially corresponding to the storage capacity of each of said ELUs, and the ability of deterministical entanglement with a plurality of hypercells.

8. The large-scale modular quantum computer architecture of claim 7, wherein said at least one hypercell includes:
a snowflake contoured connectivity tree with each of said ELUs positioned at a respective node of said snowflake's connectivity tree,
wherein said plurality of ELUs in said connectivity tree are interconnected to form a root ELU, and multiple layers of ELU branches coupled to said root ELU, and forming an extended surface area with a number of external ELU's communication ports,
wherein at least two of said snowflake hypercells are entangled at said surface areas thereof via said external communication ports thereby attaining a photons link therebetween, and
wherein a Bell pair created between said at least two hypercells is teleported to a Bell pair between the root ELUs of said hypercells.

9. The large-scale modular quantum computer architecture of claim 7, wherein said plurality of ELUs are linked through said photonic interconnect network into at least one three-dimensional (3D) hypercell,
wherein said at least one 3D hypercell includes a 3-dimensional (3D) grid with said ELUs residing on the edges and on the faces thereof, wherein for each ELU containing four qubits and linked to four neighboring ELUs, said 3D grid probabilistically creates a 4-valent 3D cluster state by probabilistically generating Bell pairs between said each and said neighboring ELUs, and
wherein, when qubits in said each of said ELUs and said neighboring ELUs form near deterministic links between different ones of said 3D cluster states, each of said 3D cluster states transforming into a fault-tolerate star-shaped graph state via measurements in said measurement sub-system.

10. The large-scale modular quantum computer architecture of claim 1, wherein said at least one ELU includes at least one chain of physical qubits, refrigerator qubits interposed between said quantum gates, and communication qubits coupled to said dynamically reconfigurable photonic interconnect network to realize said at least first quantum gate between said distant ELUs, and wherein at least one logical qubit is formed with a plurality of physical qubits residing at the same ELU or in different ELUs.

11. The large-scale modular quantum computer architecture of claim 10, wherein said refrigerator qubits are selected from different species than said physical qubits.

12. The large scale modular quantum computer architecture of claim 10, further comprising an isolating mechanism for isolating said communication qubits from said physical qubits, said isolating mechanism including shuttling of said communication qubits away from said physical qubits, and utilizing species different than said physical qubits for said communication qubits.

13. The large-scale modular quantum computer architecture of claim 1, wherein said photon detection sub-system includes an array of $N_{ELU}/2$ Bell state detectors, each comprising a first and second optic fibers and a first and a second photon counting detectors, wherein said photonic interconnect network includes an optical cross-connect (OXC) switch having $N_{ELU}$ input ports coupled to respective ELUs and $N_{ELU}$ output ports, an a plurality $N_{ELU}$ of beam splitters coupled, at an input line thereof, to a respective one of said output ports of said OXC switch, and, at an output end thereof, to a respective one of said first and second detectors,
wherein said OXC switch is configured to establish non-blocking connectivity between said plurality of ELUs, and wherein said photonic interconnect network provides entanglement generation between said distant ELUs in a respective pair thereof with up to $N_{ELU}/2$ entanglement operations performed in parallel, wherein $N_{ELU}$ is the number of ELUs in said at least one multi-dimensional computation scheme.

14. The large-scale modular quantum computer architecture of claim 1,
wherein said processor is further configured to apply entanglement swapping protocols to coordinate the entanglement generation time with communication times scaling poly-logarithmically to a communication distance, or scaling independently of said communication distance, by employing quantum buses formed by qubits interpositioned between said respective distant modular ELUs.

15. The large-scale modular quantum computer architecture of claim 1, including a quantum adder circuit configured to compute a sum of two n-bit integers and employing 6n logical qubits placed on 1.5n ELUs to compute said sum of two n-bit integers at a first concatenation level of Steane code encoding,
wherein said quantum adder circuit includes X, CNOT, and Toffoli quantum gates, wherein Toffoli quantum gate is realized between said respective distant modular ELUs, and wherein each of said X and CNOT quantum gates are realized in a respective at least one modular ELUs, wherein each of said distant modular ELUs supports at least three logical qubits, at least seven-qubit cat state, and a sufficient number of ancilla qubits to support qubit state preparation, wherein each of said logical qubits includes at least four ancilla qubits to provide realization of four-qubit cat states, wherein said Toffoli gate is realized by allocating at least one fresh ELU, preparing an initial $|\phi_+\rangle$ state, and teleporting said at least three logical qubits in at least one distant ELU into said initial $|\phi_+\rangle$ state via photon interference, and freeing and using said logical qubits from other ELUs for realizing of other Toffoli gates.

16. A method of operating a large-scale modular quantum computer, comprising:

(a) inputting data in a processor unit for being computed;

(b) interconnecting, under control of said processor unit, a plurality $N_{ELU}$ of modular elementary logic units (ELUs) into at least one multi-dimensional quantum computational structure through a dynamically reconfigurable photonic interconnect network, wherein each modular ELU hosts a plurality $N_d$ of stationary matter qubits, (c) applying predetermined laser pulses to the qubits in at last one modular ELU to set said qubits in a controlled initial state representing a computational problem to be solved, (d) controllably shaping a first laser beam, (e) illuminating, by said first laser beam, a predetermined subset of qubits in said at least one modular ELUs to realize at least one first quantum gate between said qubits in said at least one modular ELU in accordance with a quantum algorithm, wherein said optimally shaped first laser beam supports a disentanglement of modes of motion of said qubits in said at least one modular ELU, thereby suppressing modes crosstalk in said at least one modular ELU, and thereby obtaining a high fidelity said at least one first quantum gate, (f) illuminating, by a second laser beam, at least one pair of said qubits housed in at least a pair of distant modular ELUs in accordance with said quantum algorithm to realize at least one second quantum gate between said quantum algorithm to realize at least one second quantum gate between said distant modular ELUs, wherein said at least first and second quantum gates are realized in accordance with a predetermined schedule between qubits residing in said modular ELUs constitution said at least one multi-dimensional computational structure, (g) detecting the realization of a respective at least one of said at least first and second quantum gates by registering a corresponding at least one photon event heralding an entangled quantum gate between said illuminated qubits, (h) measuring the states of said qubits of said at least first and second quantum gates upon detection of the successful realization thereof, and (i) transmitting quantum information corresponding to said measured qubits states to said processor unit for further processing and output in a form of computational results.

17. The method of claim 16, further comprising:
constructing an arithmetic circuit, including a quantum adder circuit, through realizing and operatively interconnecting said at least first and second quantum gates as X, CNOT, and Toffoli quantum gates in accordance with said quantum algorithm under control of said processor unit.

18. The method of claim 17, wherein a dedicated photonic communication bus is executed between said distant modular ELUs, wherein each of said distant modular ELUs hosts at least three logical qubits, at least 7-qubit cat state, and wherein each of said distant modular ELUs accommodates the generation of an initial $|\phi_+\rangle$ state, and a number of ancilla qubits to support said initial $|\phi_+\rangle$ state preparation, further comprising:

preparing said Toffoli quantum gate by:
  allocating a fresh one of said plurality of modular ELU,
  preparing the initial $|\phi_+\rangle$ state in said fresh modular ELU,
  generating entangled states $|\phi_+\rangle$ in said distant modular ELUs via photon interference,
  providing at least three optical ports in a cross connect switch of said dynamically reconfigurable photonic interconnect network to connect to said distant modular ELUs substantially in parallel, and operating said at least three optical ports in a multiplexing regime,
  teleporting three logical qubits from the distant modular ELU in said $|\phi_+\rangle$ state, thus realizing the Toffoli gate, and
  freeing said three logical qubits from said distant modular ELU for availability for realization of another Toffoli gate.

19. The method of claim 16, further comprising:
linking said plurality of modular ELUs into at least one three-dimensional (3D) hypercell supported by a 3D lattice, wherein said modular ELUs are located on the faces and edges of said 3D lattice, wherein each modular ELU contains at least four qubits and is linked to four neighboring modular ELUs in said at least one 3D hypercell, scheduling the realization of said at least first and second quantum gates in said respective at least one modular ELU and between said distant modular ELUs in said at least one 3D hypercell through:
  creating 4-valent 3D cluster state by probabilistically generating Bell pairs between said distant modular ELUs via said dynamically reconfigurable photonic interconnect network,
  realizing CNOT gates within each said modular ELU, and
  performing local measurements of three out of said at least four qubits in said modular ELU.

20. The method of claim 16, wherein said at least one multi-dimensional quantum computational circuit is reconfigured by multiplexing said plurality of modular ELUs into at least one hypercell having a storage capacity for quantum information as each of said modular ELUs, and the ability of deterministical entanglement with a plurality of said hypercells.

21. The method of claim 20, wherein said at least one hypercell includes:
a snowflake connectivity tree with each said modular ELU positioned at a respective node of said snowflake's connectivity tree,
wherein said plurality of modular ELUs in said connectivity tree are interconnected to form a root modular ELU, multiple layers of modular ELU branches coupled to said root modular ELU, and forming an extended surface area with a number of external modular ELU's communication ports, wherein at least two of said snowflake hypercells are entangled at said surface areas thereof via said external communication ports thereby attaining a photons link, and wherein a Bell pair created between said at least two hypercells is teleported to Bell pair between the root modular ELUs of said hypercells.

22. The method of claim 21, further comprising:

forming said at least one hypercell in stages, starting with external ELUs at said surface area, and iteratively coupling underlying layers of modular ELUs to superposed layers of modular ELUs.

23. The method of claim 16, wherein said stationary matter qubits include quantum systems featuring strong optical transitions.

24. The method of claim 23, wherein said quantum systems include trapped ions, quantum dots, neutral atoms, and nitrogen-vacancy (NV) color centers in diamond.

\* \* \* \* \*